(12) United States Patent
Senno

(10) Patent No.: US 8,385,176 B2
(45) Date of Patent: Feb. 26, 2013

(54) READ-ONLY OPTICAL DISC AND METHOD OF MANUFACTURING A READ-ONLY OPTICAL DISC

(75) Inventor: Toshihiko Senno, Kanagawa (JP)

(73) Assignees: Sony Corporation, Tokyo (JP); Sony DADC Corporation, Tokyo (JP)

( * ) Notice: Subject to any disclaimer, the term of this patent is extended or adjusted under 35 U.S.C. 154(b) by 0 days.

(21) Appl. No.: 13/380,350

(22) PCT Filed: Jun. 21, 2010

(86) PCT No.: PCT/JP2010/004118
§ 371 (c)(1),
(2), (4) Date: Dec. 22, 2011

(87) PCT Pub. No.: WO2011/001627
PCT Pub. Date: Jan. 6, 2011

(65) Prior Publication Data
US 2012/0099415 A1    Apr. 26, 2012

(30) Foreign Application Priority Data

Jun. 30, 2009 (JP) .................................. 2009-154930

(51) Int. Cl.
*G11B 20/10* (2006.01)
(52) U.S. Cl. .................................. 369/59.25; 369/275.3
(58) Field of Classification Search .................. None
See application file for complete search history.

(56) References Cited

U.S. PATENT DOCUMENTS

| | | |
|---|---|---|
| 6,349,077 B1 | 2/2002 | Smelt |
| 6,788,635 B1 | 9/2004 | Aratani et al. |
| 2003/0152009 A1 | 8/2003 | Usui et al. |
| 2007/0294473 A1 | 12/2007 | De Haan |
| 2008/0310265 A1 | 12/2008 | Senno et al. |

FOREIGN PATENT DOCUMENTS

| | | |
|---|---|---|
| EP | 1 953 744 A2 | 8/2008 |
| EP | 2 053 602 A1 | 4/2009 |
| JP | 10-322640 A | 12/1998 |
| JP | 2000-163932 A | 6/2000 |
| JP | 2001-135021 A | 5/2001 |
| JP | 2007-512646 A | 5/2007 |
| JP | 2008-310847 A | 12/2008 |
| WO | WO 01/08145 | 2/2001 |
| WO | WO 02/101733 | 12/2002 |
| WO | WO 2004/038886 | 5/2004 |
| WO | WO 2005/052933 A1 | 6/2005 |

OTHER PUBLICATIONS

Labarge et al., Chapter 6: Professional DVD Authoring. In *DVD Authoring & Production*. CMP Books. 2001; 183-234.

*Primary Examiner* — Paul Huber
(74) *Attorney, Agent, or Firm* — Wolf, Greenfield & Sacks, P.C.

(57) ABSTRACT

[Object] To enable additional supplementary information such as PID to be utilized in a generally-used DVD player.
[Solving Means] Additional supplementary information recorded with additional recording mark rows of the additional recording mark rows and pit rows is set to be previously recorded in a format of command information for instructing a normal DVD player to read. Similar to a so-called navigation command in a DVD system, in recording information that can be handled by the reproduction device, the additional supplementary information can be used, to thereby utilize the additional supplementary information in the current reproduction device.

6 Claims, 39 Drawing Sheets

(a) Sector structure
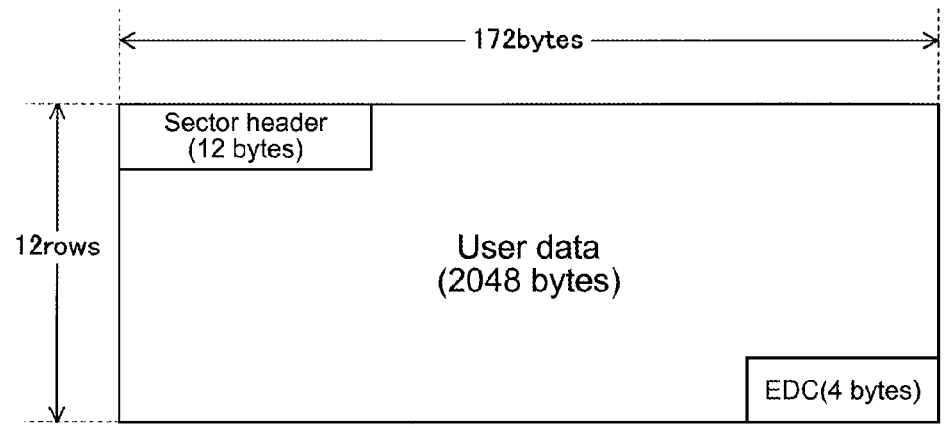
(b) ECC block structure
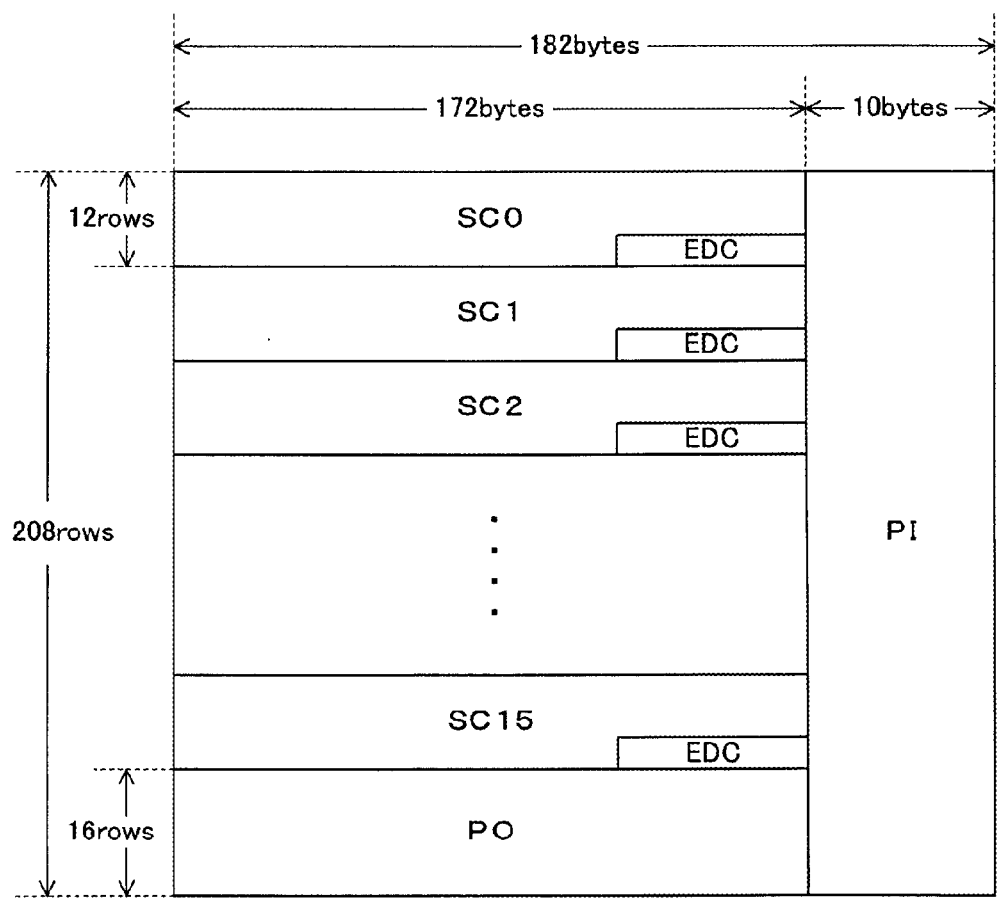
FIG.8

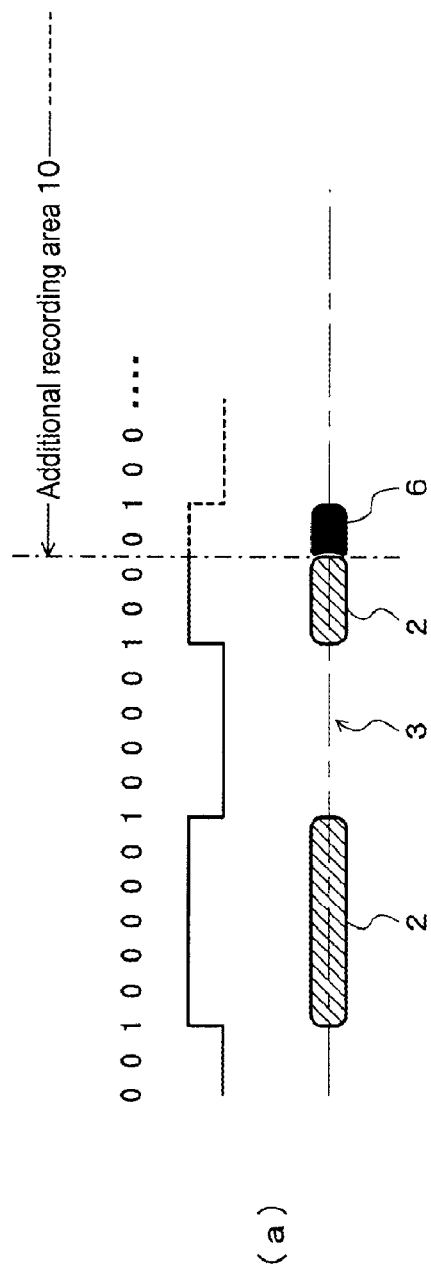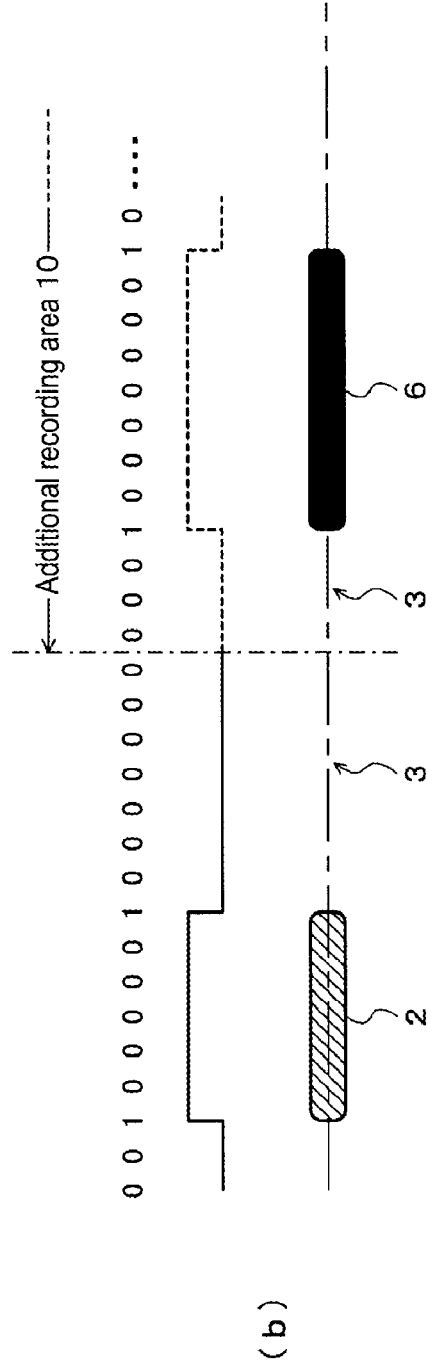
FIG.12

FIG.14

EFM+ main conversion table

| Data Symbol | STATE 1 Code Word MSB — LSB | Next state | STATE 2 Code Word MSB — LSB | Next state | STATE 3 Code Word MSB — LSB | Next state | STATE 4 Code Word MSB — LSB | Next state |
|---|---|---|---|---|---|---|---|---|
| 0 | 0010000000001001 | 1 | 0100000100100000 | 2 | 0010000000001001 | 1 | 0100000100100000 | 2 |
| 1 | 0010000000010010 | 1 | 0010000000010010 | 1 | 1000000100100000 | 3 | 1000000100100000 | 3 |
| 2 | 0010000100100000 | 2 | 0010000100100010 | 2 | 0000000000010010 | 1 | 1000000000010010 | 1 |
| 3 | 0010000010010000 | 2 | 0100010010000000 | 4 | 0010000010010000 | 2 | 0100010010000000 | 4 |
| 4 | 0010000001001000 | 2 | 0010000001000000 | 2 | 1000000101001000 | 2 | 1000000101001000 | 2 |
| 5 | 0010000000100100 | 2 | 0010000000100100 | 2 | 1001001000000000 | 4 | 1001001000000000 | 4 |
| 6 | 0010000000010100 | 3 | 0010000000100100 | 3 | 1000100100000000 | 4 | 1000100100000000 | 4 |
| 7 | 0010000001001000 | 3 | 0100000000010010 | 1 | 0010000001001000 | 3 | 0100000000010010 | 1 |
| ... | ... | ... | ... | ... | ... | ... | ... | ... |
| 46 | 0010010010000010 | 1 | 0010010010000010 | 1 | 1000001000100000 | 1 | 1000001000100001 | 1 |
| 47 | 0010000010001001 | 1 | 0100000010010001 | 1 | 0010000010001001 | 1 | 0100000010001001 | 1 |
| 48 | 0010010001000001 | 1 | 0010010001000001 | 1 | 1000000100010000 | 2 | 1000000100010000 | 2 |
| 49 | 0010010010000010 | 1 | 0010010010000010 | 1 | 1000001001000000 | 2 | 1000000100001000 | 2 |
| 50 | 0010010001000001 | 1 | 0010010001000001 | 1 | 1000001000100000 | 3 | 1000000100010000 | 3 |
| 51 | 0010010000100001 | 1 | 0100010010100001 | 1 | 0010010000100001 | 1 | 0100010010100001 | 1 |
| 52 | 0010000100100010 | 1 | 0010000100100010 | 1 | 1000000100100010 | 1 | 1000000100100010 | 1 |
| 53 | 0010000100010001 | 1 | 0010000100010001 | 1 | 1000000100010001 | 1 | 1000000100010001 | 1 |
| 54 | 0010000010010010 | 1 | 0100000010010010 | 1 | 1000000010010010 | 1 | 1000000010010010 | 1 |
| ... | ... | ... | ... | ... | ... | ... | ... | ... |
| 86 | 0001000001000100 | 3 | 0001000001000100 | 3 | 1001001000100100 | 2 | 1001001000100100 | 2 |
| 87 | 0001000010001000 | 3 | 0100010001000000 | 3 | 0001000010001000 | 3 | 0100010001000000 | 3 |
| 88 | 0001001000100010 | 3 | 0001001000100010 | 3 | 1001001001001000 | 3 | 1001001001001000 | 3 |
| 89 | 0001010010010000 | 3 | 0001010010010000 | 3 | 1001000010000001 | 1 | 1001000010000001 | 1 |
| ... | ... | ... | ... | ... | ... | ... | ... | ... |
| 254 | 0000000010001001 | 2 | 0100001000010001 | 2 | 1001000000010000 | 2 | 0100001000010001 | 2 |
| 255 | 0000000100001000 | 2 | 0100001000001000 | 2 | 1000100100010000 | 2 | 0100001000010010 | 3 |

With sub-conversion table

FIG.15

EFM+ sub-conversion table

| Data Symbol | STATE 1 Code Word MSB LSB | Next state | STATE 2 Code Word MSB LSB | Next state | STATE 3 Code Word MSB LSB | Next state | STATE 4 Code Word MSB LSB | Next state |
|---|---|---|---|---|---|---|---|---|
| 0 | 000001001000000 | 4 | 000001001000000 | 4 | 0100100001001000 | 2 | 0100100001001000 | 2 |
| 1 | 000010010000000 | 4 | 000010010000000 | 4 | 0100100010001000 | 3 | 0100100010001000 | 3 |
| 2 | 000100100000000 | 4 | 000100100000000 | 4 | 0100100000001001 | 1 | 0100100000001001 | 1 |
| 3 | 000000101000000 | 4 | 010001000000001 | 1 | 1000010000000000 | 1 | 0100010000000001 | 1 |
| 4 | 000000100100000 | 3 | 010000000000010 | 4 | 0010000000000100 | 4 | 0100010000000010 | 1 |
| 5 | 000000001010000 | 3 | 010000100010000 | 3 | 1000000000000100 | 3 | 0100001000000000 | 4 |
| 6 | 000000001001000 | 3 | 010000000001000 | 3 | 1000000001001000 | 3 | 0100010000000100 | 2 |
| 7 | 000000000101000 | 2 | 010000001000000 | 2 | 1000000000000100 | 2 | 0100000100000000 | 4 |
| ... | ... | ... | ... | ... | ... | ... | ... | ... |
| 46 | 0001001000000010 | 1 | 0001001000000010 | 1 | 1001001000010000 | 3 | 1001001000010000 | 3 |
| 47 | 0010001000000001 | 1 | 0010001000000001 | 1 | 1000100000010010 | 1 | 1000100000010010 | 1 |
| 48 | 0010010000000010 | 1 | 0010010000000010 | 1 | 0100010000001000 | 3 | 0100010000001000 | 3 |
| 49 | 0000000001000000 | 1 | 0100100010010001 | 1 | 1001000000010001 | 1 | 0100100010010001 | 1 |
| 50 | 0000000100001001 | 1 | 0100100001000100 | 1 | 1001000000100010 | 3 | 0100100001000100 | 3 |
| 51 | 0000000010010010 | 1 | 0100100010010010 | 1 | 1001000010010001 | 3 | 0100010010010000 | 3 |
| 52 | 0000001000100001 | 1 | 0100100100010000 | 1 | 1001000010010001 | 2 | 0100010010010000 | 2 |
| 53 | 0000000100100010 | 1 | 0100100001000100 | 1 | 1001000100010001 | 2 | 0100100001000100 | 2 |
| 54 | 0000001000100001 | 1 | 0100100100100001 | 1 | 1001001001000001 | 1 | 0100100100100001 | 1 |
| ... | ... | ... | ... | ... | ... | ... | ... | ... |
| 86 | 0000001000000100 | 2 | 0100000100000100 | 2 | 1000100000100100 | 2 | 0100001000000100 | 2 |
| 87 | 0000000100000100 | 2 | 0100010001000100 | 2 | 1000100100001000 | 2 | 0100001000000100 | 2 |

[When Next state "1" or "2" is designated by immediately preceding code word (Next state of SYNC is "1")]

Primary SYNC codes

| | (MSB) | (LSB) |
|---|---|---|
| SY0 = | 0001001001 | 0001000000000000010001 |
| SY1 = | 0000010000 | 0001000000000000010001 |
| SY2 = | 0001000000 | 0001000000000000010001 |
| SY3 = | 0000100000 | 0001000000000000010001 |
| SY4 = | 0010000001 | 0001000000000000010001 |
| SY5 = | 0001000100 | 0001000000000000010001 |
| SY6 = | 0010010010 | 0001000000000000010001 |
| SY7 = | 0010010001 | 0001000000000000010001 |

SYNC ID

Secondary SYNC codes

| | (MSB) | (LSB) |
|---|---|---|
| | 0001001000 | 0001000000000000010001 |
| | 0000100001 | 0001000000000000010001 |
| | 0010000010 | 0001000000000000010001 |
| | 0000100010 | 0001000000000000010001 |
| | 0010000100 | 0001000000000000010001 |
| | 0010001000 | 0001000000000000010001 |
| | 0010000001 | 0001000000000000010001 |
| | 0010010000 | 0001000000000000010001 |

SYNC ID

[When Next state "3" or "4" is designated by immediately preceding code word (Next state of SYNC is "1")]

Primary SYNC codes

| | (MSB) | (LSB) |
|---|---|---|
| SY0 = | 1001001000 | 0001000000000000010001 |
| SY1 = | 1000010000 | 0001000000000000010001 |
| SY2 = | 1001000001 | 0001000000000000010001 |
| SY3 = | 1000100001 | 0001000000000000010001 |
| SY4 = | 1000010001 | 0001000000000000010001 |
| SY5 = | 1001001001 | 0001000000000000010001 |
| SY6 = | 1001000100 | 0001000000000000010001 |
| SY7 = | 1000100010 | 0001000000000000010001 |

SYNC ID

Secondary SYNC codes

| | (MSB) | (LSB) |
|---|---|---|
| | 1001001001 | 0001000000000000010001 |
| | 1000010001 | 0001000000000000010001 |
| | 1001000010 | 0001000000000000010001 |
| | 1000010010 | 0001000000000000010001 |
| | 1000100010 | 0001000000000000010001 |
| | 1000001001 | 0001000000000000010001 |
| | 1000000100 | 0001000000000000010001 |
| | 1000100100 | 0001000000000000010001 |

SYNC ID

FIG.17

「54」: Polarity control symbol
「X」: PO compensation symbol
▨ : Additional-recording-mark recording part

READ-ONLY OPTICAL DISC AND METHOD OF MANUFACTURING A READ-ONLY OPTICAL DISC

CROSS REFERENCE TO RELATED APPLICATIONS

This application claims the benefit under 35 U.S.C. §371 as a U.S. national stage entry of International Patent Application Serial No. PCT/JP2010/004118 ("the '118 application"), filed on Jun. 21, 2010, the entire contents of which is incorporated herein by reference. The '118 application claims priority to Japanese Priority Patent Application JP 2009-154930, filed in the Japan Patent Office on Jun. 30, 2009, the entire contents of which is incorporated herein by reference.

TECHNICAL FIELD

The present invention relates to a read-only optical disc and a method of manufacturing a read-only optical disc. Specifically, the present invention relates to a technology that enables provision of additional supplementary information in a read-only optical disc medium to be manufactured.

BACKGROUND ART

In read-only optical disc media such as ROM (Read Only Memory) type CD (Compact Disc), DVD (Digital Versatile Disc), and BD (Blu-ray disc: Registered Trademark), a lead-in area, a main data area, and a lead-out area are formed from the inner circumference side toward the outer circumference side on the optical disc.

Information data of music, images, games, application programs, etc. is recorded in the main data area according to a predetermined recording modulation method. Further, in the lead-in area, various kinds of management information such as information for reproduction management of information data recorded in the main data area and physical information of the disc are recorded.

For example, these read-only optical disc media are utilized as means for providing content by many content holders because of low production cost from their excellent mass productivity.

By taking DVDs (DVD-ROMs) as an example, the manufacturing process of read-only optical disc media is roughly divided into a mastering step of fabricating a master of optical discs with a laser beam, a molding and film-forming step of fabricating many disc substrates using a stamper fabricated from the optical disc master and forming films on the disc substrates, and a bonding step of bonding paired two 0.6-mm-thick optical discs with an adhesive having a predetermined thickness to form 1.2-mm-thick DVD disc media.

At the molding and film-forming step, a concavo-convex pattern formed on the stamper is transferred onto the disc substrates in mass-production using the stamper. That is, recording data rows (pit rows) of embossed pits/lands as a concavo-concave shaped pattern are formed in a part as an information recording surface, and the recording data rows are formed in spiraled or coaxial recording tracks. On the information recording surface on which the pits/lands have been formed, the concavo-concave shape is coated with a metal alloy reflecting film.

After the disc is completed, a laser beam applied by a reproduction device is reflected by the reflecting film in the pits/lands part.

CITED DOCUMENT

Patent Document

Patent Document 1: Japanese Patent Application Laid-open No. 2008-310847
Patent Document 2: Japanese Patent Application Laid-open No. 2001-135021
Patent Document 3: International Patent Application Laid-Open Publication No. WO2001/008145
Patent Document 4: International Patent Application Laid-Open Publication No. WO2002/101733

DISCLOSURE OF THE INVENTION

Problem to be Solved by the Invention

The read-only optical discs are not intended for additional information recording after manufactured. However, in recent years, for management of read-only optical discs in which predetermined information data has been recorded or the like, a method of recording additional information (additional supplementary information) such as unique identification numbers with respect to each manufactured read-only optical disc and identification information according to the recorded content has been desired.

Here, for additional information recording, it is conceivable that an area in which pits are not formed is provided as an additional recording area on the optical disc, an additional recording mark is formed in the additional recording area, and information is recorded thereon. However, it is impossible to realize additional recording simply by recording additional supplementary information such as identification information.

In a DVD-ROM, the status in which additional supplementary information is recorded in the additional recording area should be adapted to the data format of the DVD-ROM.

For example, in the data format of the DVD-ROM, an error correction block (ECC block) is considered. The error correction block includes a plurality of sector data, and column-wise parity (hereinafter, referred to as "PO parity") and row-wise parity (hereinafter, referred to as "PI parity") as error correction codes. Further, the sector data includes main data (user data) and an error detection code (EDC) for the main data.

Here, the case where an area on the optical disc corresponding to a partial area of user data within a sector is used as an additional recording area and additional supplementary information is recorded in the additional recording area is considered.

When the additional supplementary information is written, the value of EDC within the sector naturally changes from the value before writing. Further, with respect to each ECC block, values of the PI parity and PO parity also change.

Since the read-only optical disc in which data is recorded with pit rows is obviously not rewritable, and thus, the EDC, PI parity, PO parity taking values that change when the additional supplementary information is written should be written when the additional supplementary information is written.

That is, in the case where additional information is written on the optical disc after pit rows are formed, additional information to be written includes not only additional supplementary information such as identification information but also EDC, PI parity, PO parity affected by the additional supplementary information.

Accordingly, it is desired that the efficient additional recording is executed in consideration of error detection code, error correction parity, and the like.

In addition, it is desired that a proper additional recording mark is formed while constrains are overcome on the data format such that the data rows corresponding to the additional recording mark written in the additional recording area satisfy the run length condition specified in the DVD system.

In view of this, the inventors of the present invention have developed the method shown in the above Patent Document 1. According to the invention of the above Patent Document 1, in view of the above-mentioned points, additional supplementary information such as individual identification information can be properly recorded on the read-only optical disc.

On the other hand, in view of the fact that the additional recording area is formed in a part of an embossed pit row to additionally record the additional supplementary information, the necessity of additional recording with respect to the EDC, the parities, and the like as described above, and the like, additional recording is preferably performed in such an area that original content to be recorded on a DVD is not affected. Accordingly, it is conceivable that the additional recording area is formed in an area that is not managed by a file system of the DVD.

However, generally-used DVD players distributed at present have no function of reading and processing additional supplementary information that is not managed by such a file system.

That is, although a dedicated apparatus that is allowed to access information that is not managed by the file system, a personal computer installing a dedicated program, and the like can utilize the additional supplementary information, the normal DVD players cannot widely utilize the additional supplementary information.

In view of this, it is an object of the present invention to enable even a generally-used reproduction device such as a normal DVD player to read the additional supplementary information so that the additional supplementary information can be utilized in more various ways.

Means for Solving the Problem

A read-only optical disc according to the present invention is a read-only optical disc including a pit row including embossed pits and lands with which information is recorded. Further, regarding recording data in a data format in which error correction blocks with n rows and m columns including at least main data, an error detection code, and an error correction parity are formed, in a certain error correction block, the pit row is formed based on the recording data in which an allocated location of additional supplementary information is set in a location in the same column as an allocated location of the error detection code as a location within the error correction block. In an area in which the pit row is not formed, additional information including at least the additional supplementary information and the error detection code and the error correction parity, which need to be recorded according to the recording of the additional supplementary information, is recorded with an additional recording mark row including additional recording marks and lands. In addition, with the additional recording mark row and the pit row, command information for instructing a reproduction device to read the additional supplementary information recorded with the additional recording mark row is recorded.

Further, the data format is a data format of a read-only optical disc of a DVD system, and the command information is a navigation command for instructing a DVD reproduction device to read the additional supplementary information.

Further, the error correction block in which the additional recording mark row is formed is an error correction block included in a data file to be recorded at a fixed radial position on the disc.

A method of manufacturing a read-only optical disc according to the present invention is a method of manufacturing a read-only optical disc including a pit row including embossed pits and lands with which information is recorded. Further, there are performed a disc-before-additional-recording manufacturing step of setting, within a certain error correction block in a data format in which error correction blocks with n rows and m columns including at least main data, an error detection code, and an error correction parity are formed, an allocated location of additional supplementary information in a location in the same column as an allocated location of the error detection code, and manufacturing a disc before additional recording in which the pit row is formed in such a state that an additional recording area for recording additional information including the additional supplementary information and an error detection code and an error correction parity, which need to be recorded according to the recording of the additional supplementary information, is formed, and an additional recording step of recording the additional information in the additional recording area in the disc before additional recording, which is manufactured at the disc-before-additional-recording manufacturing step, and manufacturing the read-only optical disc on which with the additional recording mark row and the pit row, command information for instructing a reproduction device to read the additional supplementary information recorded with the additional recording mark row is recorded.

Further, in the disc-before-additional-recording manufacturing step, a part of the command information is formed with the pit row so that when the additional supplementary information is recorded in the additional recording area, a recording data row of the command information is formed.

Further, in the disc-before-additional-recording manufacturing step, the pit row is formed to have a concavo-concave shape coated with a reflecting film on the optical disc, and the additional recording area is formed as a flat shape area coated with a reflecting film, and in the additional recording step, the additional information is recorded with the additional recording mark row of additional recording marks formed by eliminating or reducing the reflecting film in the additional recording area and of lands as flat portions coated with the reflecting film.

In the present invention as described above, with the additional recording mark row and the pit row, the command information for instructing the reproduction device (e.g., the normal DVD player) to read the additional supplementary information recorded with the additional recording mark row is set to be recorded.

Similar to a so-called navigation command in a DVD system, by using the additional supplementary information when recording information that can be handled by the reproduction device, the additional supplementary information is enabled to be utilized in the current reproduction device.

It should be noted that the additional supplementary information is information of unique identification numbers with respect to each read-only optical disc, identification information according to the recorded content, and the like.

Further, the additional information is used as a term including, in addition to the additional supplementary information such as the identification information, EDC, PI parity, PO parity, and the like to be recorded along with recording the additional supplementary information.

Effects of the Invention

According to the read-only optical disc of the present invention, the additional supplementary information such as individual identification information, which is additionally recorded on the read-only optical disc, can be read and utilized in a generally-used reproduction device (DVD player or the like). Thus, in the DVD player or the like, operation using the additional supplementary information can be executed, and the additional supplementary information can be efficiently used.

Further, according to the method of manufacturing the read-only optical disc of the present invention, such a read-only optical disc can be manufactured properly.

BRIEF DESCRIPTION OF DRAWINGS

FIG. 8 Diagrams for explanation of a sector structure and an ECC block structure of a DVD.

FIG. 12 Diagrams for explanation of an improper situation of a head part of the additional recording area following a pit row.

FIG. 14 A diagram for explanation of a main conversion table for EFM+ modulation.

FIG. 15 A diagram for explanation of a sub-conversion table for EFM+ modulation.

FIG. 17 A diagram for explanation of SYNC codes of a DVD depending on the kinds.

BEST MODE FOR CARRYING OUT THE INVENTION

An embodiment of the present invention will be explained by taking a DVD-system read-only optical disc as an example. Specifically, regarding a read-only optical disc as a DVD-ROM, the case where information having relatively small size such as an individual ID is recorded as additional supplementary information will be described. The explanation will be made in the following order:
[1. Manufacturing Process of Read-only Optical Disc and Additional Recording with Additional Recording Marks]
[2. ECC Block Configuration and Allocation of Additional Supplementary Information]
[3. Matching at Starting Part of Additional Recording Area]
[4. Matching at Ending Part of Additional Recording Area]
[5. Allocation of PO Compensation Symbols]
[6. Application to Navigation Commands of DVD]
[7. Processing at Disc Manufacturing Stage regarding additional recording]
[1. Manufacturing Process of Read-Only Optical Disc and Additional Recording with Additional Recording Marks]

First, a manufacturing process of a read-only optical disc 90 of the embodiment will be described with reference to FIG. 1.

Figure 1:
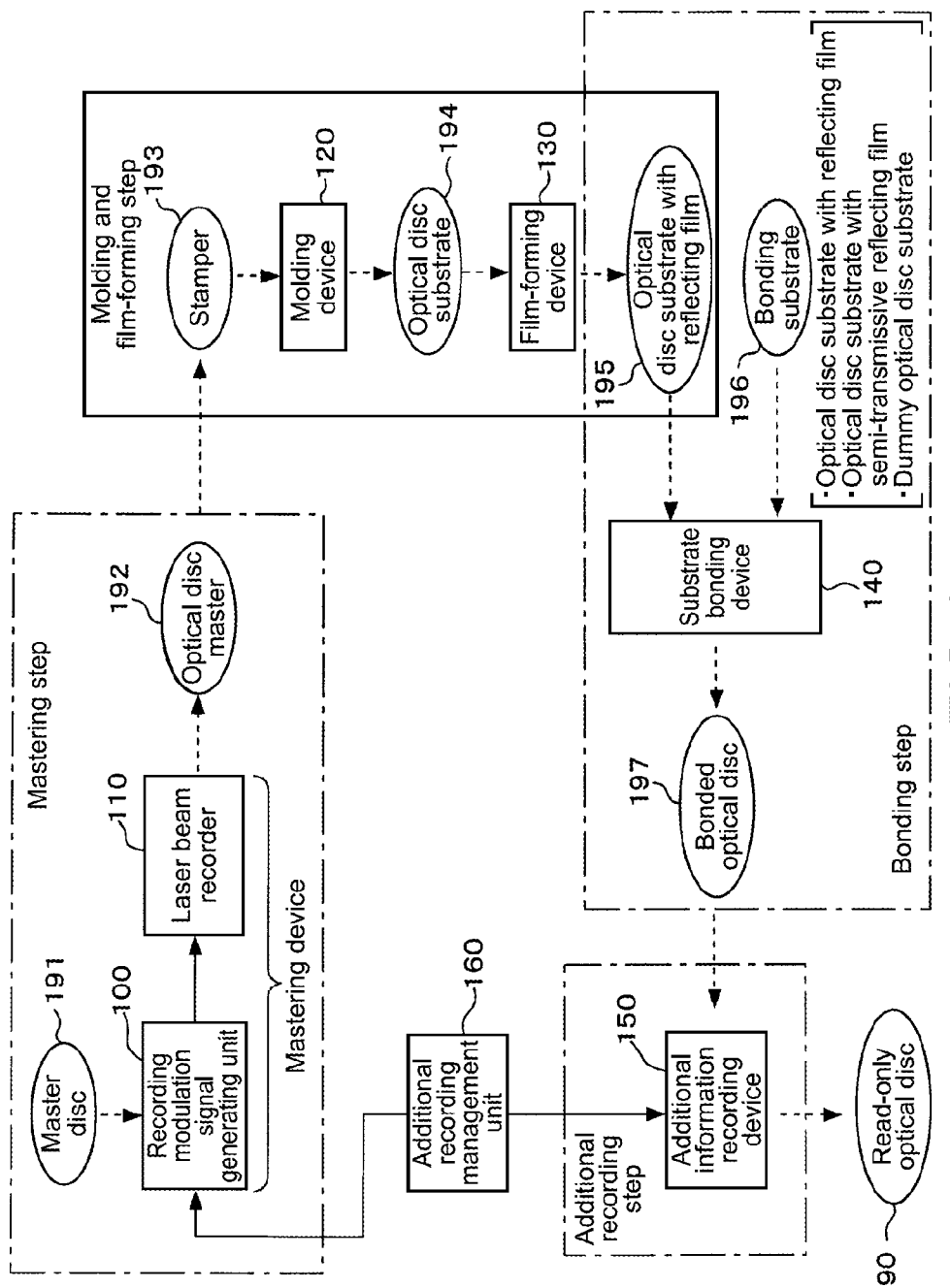
FIG. 1 A diagram for explanation of a manufacturing process of a disc of an embodiment of the present invention.

FIG. 1 shows a manufacturing process of a read-only optical disc as a DVD of the embodiment. The disc manufacturing process in this example is roughly divided as shown in the chart into a mastering step, a molding and film-forming step, a bonding step, and an additional recording step.

The mastering step fabricates an optical disc master with a laser beam. The molding and film-forming step fabricates many disc substrates using a stamper formed from the optical disc master and forms films on the disc substrates. The bonding step bonds paired two 0.6-mm-thick optical discs with an adhesive having a predetermined thickness to form 1.2-mm-thick optical discs. The additional recording step records additional information on the individual bonded optical discs.

The additional information includes additional supplementary information as information desired to be individually added to discs such as identification information, for example, and error detection code (EDC) and error correction parity necessary to be recorded according to the recording of the additional supplementary information.

In the following, the respective steps will be explained.

The mastering step is a step of manufacturing an optical disc master 192 based on information data recorded on a master disc 191. At the step, a mastering device having a recording modulation signal generating unit 100 and a laser beam recorder 110 is used.

The recording modulation signal generating unit 100 reproduces the master disc 191 and reads information data (master data) to be recorded. Then, the recording modulation signal generating unit 100 scrambles and EFM+ (Eight to Fourteen Modulation plus)-modulates signals of the read information data, and outputs the generated EFM+ signals to the laser beam recorder 110.

The optical disc master 192 is formed by applying a photoresist as a photosensitive material on a glass plate. The laser beam recorder 110 applies a laser beam onto the optical disc master 192 according to the supplied EFM+ signals for exposure of a pit pattern based on the EFM+ signals. Then, the photoresist film is developed, and, with a positive resist, the exposed portions are melted and a concavo-convex pattern is formed on the photoresist film. Specifically, a pit pattern (concavo-convex shapes of pits/lands) according to a predetermined format is formed on the surface of the optical disc master 192.

It should be noted that as described above, the recording modulation signal generating unit 100 generates EFM+ signals based on the signals read out from the master disc 191 and sends them to the laser beam recorder 110, and further, unmodulated signals are inserted into certain durations of part of the continuously sent EFM+ signals according to instructions from an additional recording management unit 160.

During the durations of unmodulated signals, the laser beam in the laser beam recorder 110 is off. That is, through insertion of unmodulated signals into the EFM+ signals, unexposed sections are formed on the optical disc master 192. All of the sections become lands and flat shape areas on which no concavo-convex shape is formed, and the areas are used as additional recording areas, which will be described later.

On the basis of the optical disc master 192, a mold called a stamper 193 onto which the pit pattern of the optical disc master 192 has been reversely transferred is fabricated. Naturally, the flat shape areas as additional recording areas are also formed on the stamper 193.

Then, at the molding and film-forming step, a molding device 120 first fabricates an optical disc substrate 194 using the stamper 193. On the optical disc substrate 194, the concavo-convex pattern formed on the optical disc master 192 is transferred and the pit pattern is formed.

As a method of fabricating the optical disc substrate 194, compression molding, injection molding, light curing, etc. are known.

On the optical disc substrate 194 onto which the pit pattern has been transferred from the stamper 193, a film forming device 130 sequentially deposits a coating film such as a reflecting film, and thereby, an optical disc substrate with reflecting film 195 is formed.

Then, at the bonding step, the above optical disc substrate with reflecting film 195 and a bonding substrate 196 are bonded.

As the bonding substrate 196, the optical disc substrate with reflecting film fabricated in the same process as described above, an optical disc substrate on which a semi-transmissive reflecting film has been formed, or a dummy optical disc substrate with no reflecting film coating is used.

A substrate bonding device 140 bonds one of the above-mentioned bonding substrates 196 to the optical disc substrate with reflecting film 195 to manufacture a bonded optical disc 197.

As an adhesion technique when bonding, a technique using an ultraviolet curing resin, a technique using a sheet with adhesive, etc. are known.

In a DVD of the related art, the bonded optical disc 197 is a DVD as a completed product. However, in this example, additional recording areas with no pit pattern are provided on the partial sections on the recording track on which the pit pattern (pit rows including embossed pits and lands) has been formed.

Figure 2:
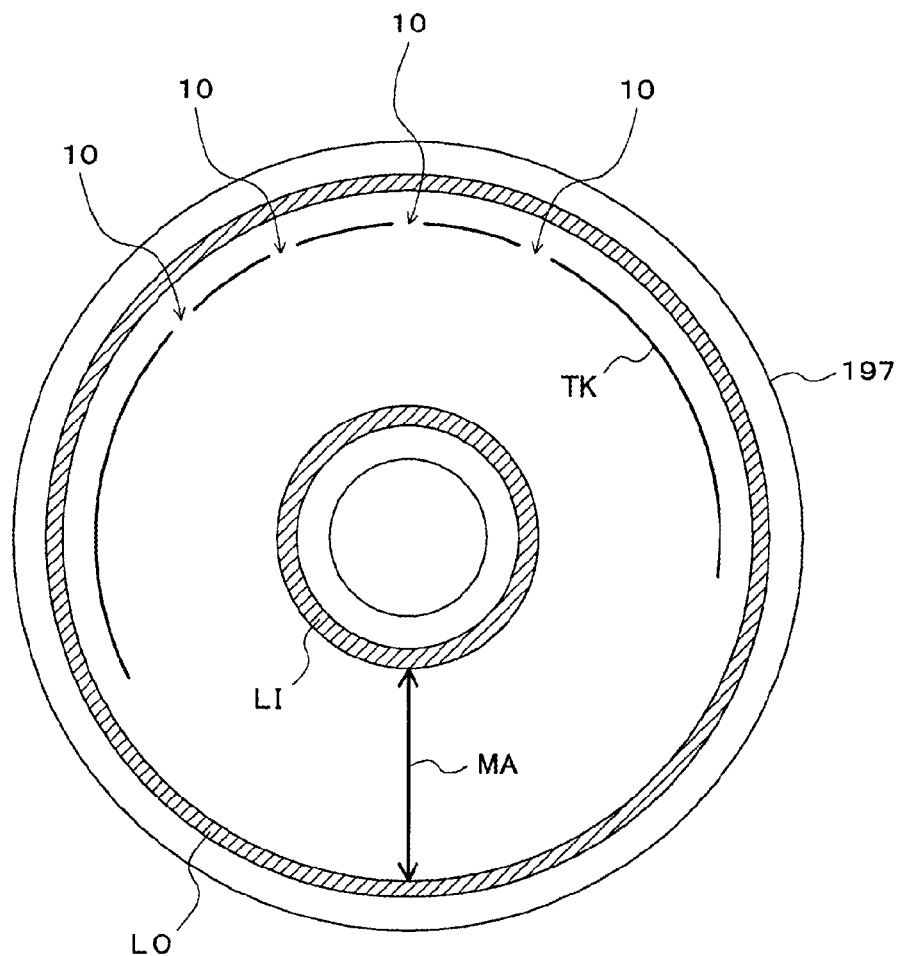
FIG. 2 A diagram for explanation of a stage of a bonded optical disc in the manufacturing process of an embodiment.

FIG. 2 schematically shows the bonded optical disc 197. As the area configuration on the disc, from the inner circumference side, a lead-in area L1 in which management information has been recorded, a main data area MA in which content data has been recorded, and a lead-out area LO are formed.

These lead-in area L1, main data area MA, and lead-out area LO are areas in which information is basically recorded with pit rows including embossed pits and lands. That is, a recording data row of pits/lands according to the EFM+ signals is formed as a spiral recording track, for example.

Here, a certain track TK within the main data area MA in which additional recording areas 10 are partially formed is shown. Although the schematic view is only for explanation and the practical allocation and size along the line of the additional recording areas 10 are not necessarily the same as those shown in the drawing, the additional recording areas 10 are formed as flat shape areas with reflecting film in part of the recording track of the pit rows.

It should be noted that in which area within the main data area MA the additional recording areas 10 are formed is not especially limited. Further, the additional recording areas 10 may be formed within the lead-in area L1 or the lead-out area LO. In addition, it is also conceivable that the additional recording areas 10 are provided at the inner circumference side of the lead-in area L1, or at the outer circumference side of the lead-out area LO.

It should be noted that in the example of FIG. 26, which will be described later, a PID area including the additional recording areas 10 is set at a radial position near the lead-out area LO within the main data area MA.

In the case of the example, the bonded optical disc 197 is not a completed DVD because unrecorded areas are left as the additional recording areas 10 as described above. Accordingly, the additional recording step is executed on the bonded optical disc 197.

At the additional recording step, an additional information recording device 150 writes additional information in the additional recording areas on the bonded optical disc 197. For example, additional supplementary information (PID) such as identification information, error detection code, error correction parity, etc. different from one optical disc to another are written as additional information.

In this case, the additional information recording device 150 is instructed on location information (address) of the additional recording areas from the additional recording management unit 160 and provided with additional information to write, and writes the additional information.

The additional information recording device 150 performs writing by the method of EFM+-modulating the additional information, applying high-power laser pulse for recording according to the EFM+ signal, and eliminating or reducing the reflecting film in the additional recording areas to form an additional recording mark.

It should be noted that the configuration of the additional information recording device 150 will be described later with reference to FIG. 7.

When the additional recording step is completed, the manufacturing of the read-only optical disc 90 is completed. The read-only optical discs 90 mass-produced in the above-mentioned process are optical discs in which the same content (music, images, games, application programs, etc.) are recorded, but unique additional supplementary information (PID) is individually recorded.

It should be noted that the additional recording step may be performed within the manufacturing factory where the molding and film-forming step and the bonding step are executed, or in another facility, store, etc.

For example, a content holder (a dealer who provides content and requests fabrication of discs or the like) may request delivery of the bonded optical discs 197 and the content holder may record additional information using their additional information recording device 150.

Further, it is also conceivable that, in a store, the bonded optical discs 197 are displayed for sale and, when a customer buys the discs, additional information are written therein by the additional information recording device 150 installed in the store and the discs are handed to the customer.

The embossed pit rows and additional recording marks formed on the read-only optical disc 90 manufactured in the above-mentioned manner will be explained.

Figure 3:
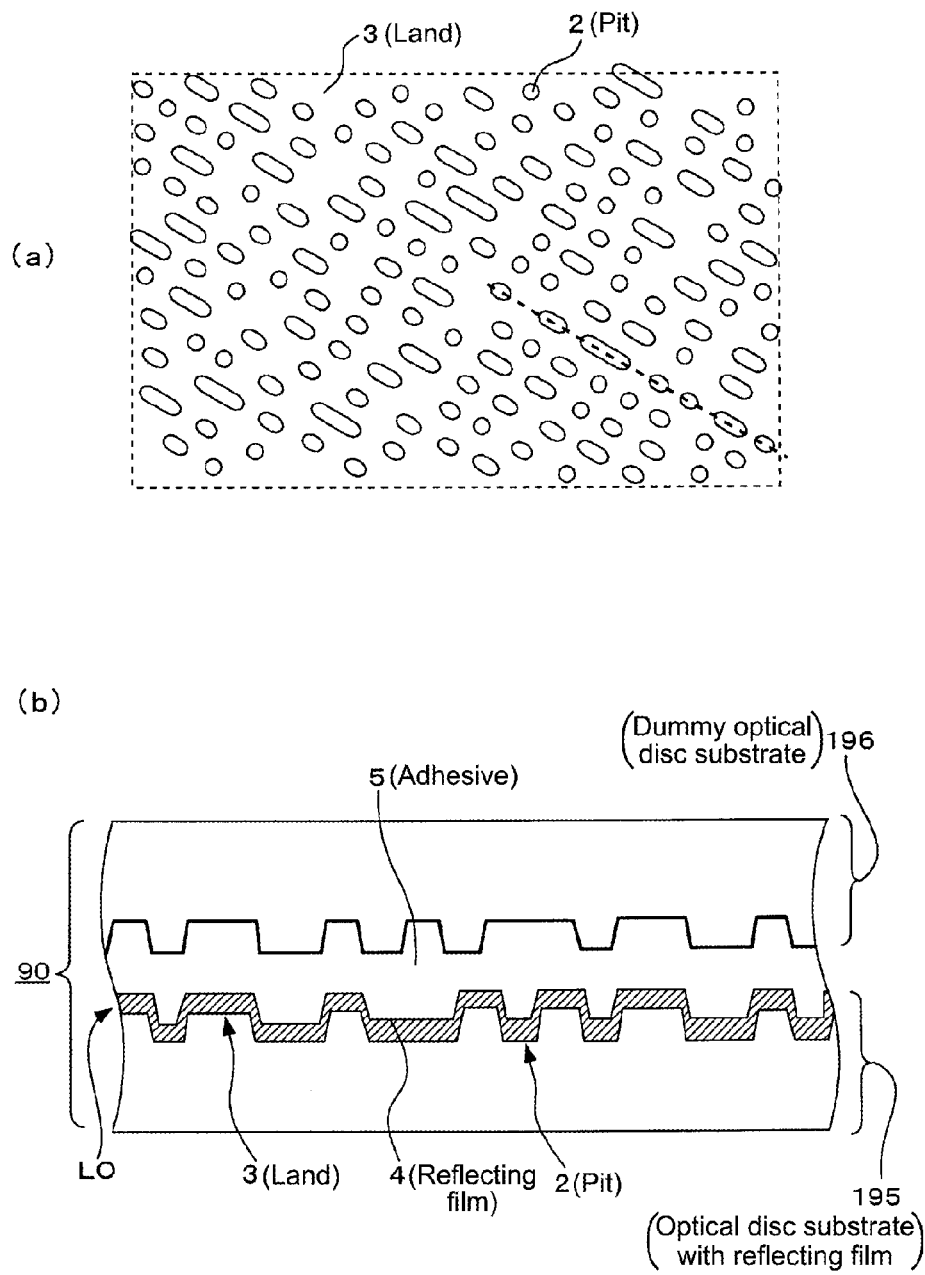
FIG. 3 A partially enlarged view and a schematic sectional view of a read-only optical disc of an embodiment.

FIG. 3(*a*) is a partially enlarged view showing a part of a recording surface of the disc in which recording tracks are produced as typical pit rows of embossed pits/lands, and further, FIG. 3(*b*) is a schematic sectional view of the part shown by the broken line in FIG. 3(*a*).

As seen from FIG. 3(*b*), each read-only optical disc 90 is formed by bonding the optical disc substrate with reflecting film 195 made of polycarbonate having a thickness of 0.6 mm and the bonding substrate (dummy optical disc substrate) 196 with an adhesive 5, for example, and has a thickness of 1.2 mm. As the adhesive 5, for example, an ultraviolet curing resin or adhesive sheet is used.

In this case, one principal surface of the optical disc substrate with reflecting film 195 is used as an information recording surface L0, and the information recording surface L0 is formed as a concavo-convex pattern of pits 2 and lands 3. Further, reflecting films 4 are formed on the surface of the pits 2 and lands 3.

It should be noted that the concavo-concave relation between the pits 2 and lands 3 may be opposite.

The bonding substrate 196 to be bonded to the optical disc substrate with reflecting film 195 is a dummy optical disc substrate (a disc substrate with no reflecting film coating) in FIG. 3(*b*). However, as described above, an optical disc substrate on which a reflecting film has been formed or an optical disc on which a semi-transmissive reflecting film has been formed may be used as the bonding substrate 196.

The adhesive 5 is generally transmissive, but does not need to be transmissive depending on the structure. When the bonding substrate 196 bonded to the optical disc substrate with reflecting film 195 has a reflecting film or semi-transmissive reflecting film, the bonding surface becomes a surface having the reflecting film or semi-transmissive reflecting film formed thereon.

Figure 4:
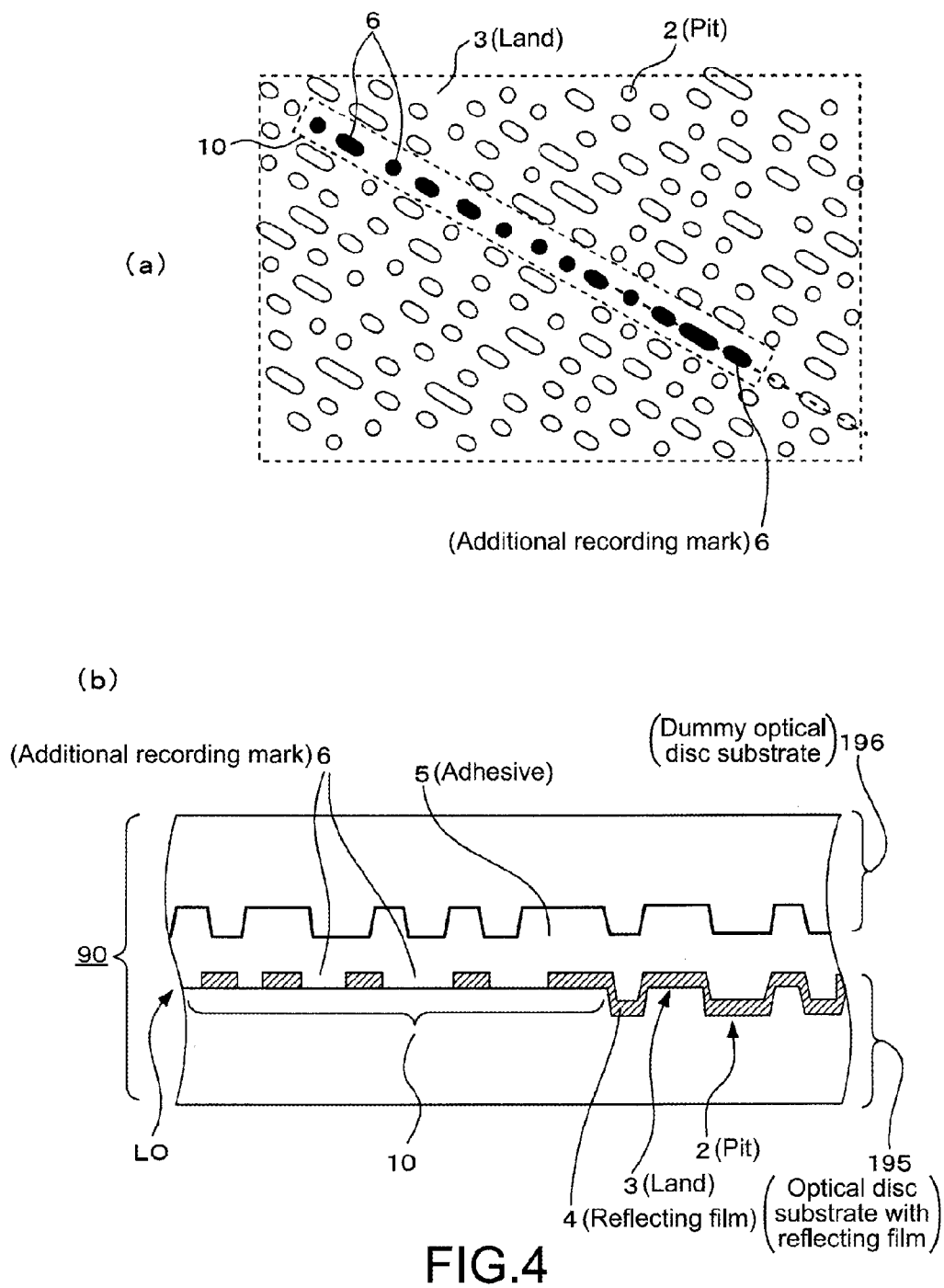
FIG. 4 A partially enlarged view and a schematic sectional view, each of which includes an additional recording area of the read-only optical disc of an embodiment.

FIG. 4(*a*) is an enlarged view of a part in which additional recording marks are formed, and further, FIG. 4(*b*) is a schematic sectional view of the part shown by the broken line in FIG. 4(*a*).

In the example of FIG. 4(*a*), a partial area within one track formed by a pit row of embossed pits and lands is used as an additional recording area 10, and a recording data row of additional recording marks 6 formed at the above-mentioned additional recording step is formed therein. That is, additional information such as the additional supplementary information unique to the disc is recorded as the recording data row of the additional recording marks 6.

It should be noted that for convenience of explanation, the recording data row of the additional recording marks 6 and the lands 3 is referred to as "additional recording mark row" for distinction from the pit row of the embossed pits 2 and the lands 3.

As shown in FIG. 4(*b*), the part where the additional recording mark row is formed basically has the same layer structure as that shown in FIG. 3(*b*), but the additional recording marks 6 are formed on part of the information recording surface L0. That is, the additional recording marks 6 are formed with little reflecting films existing thereon by elimination or reduction of the metal alloy reflecting films 4.

Figure 5:
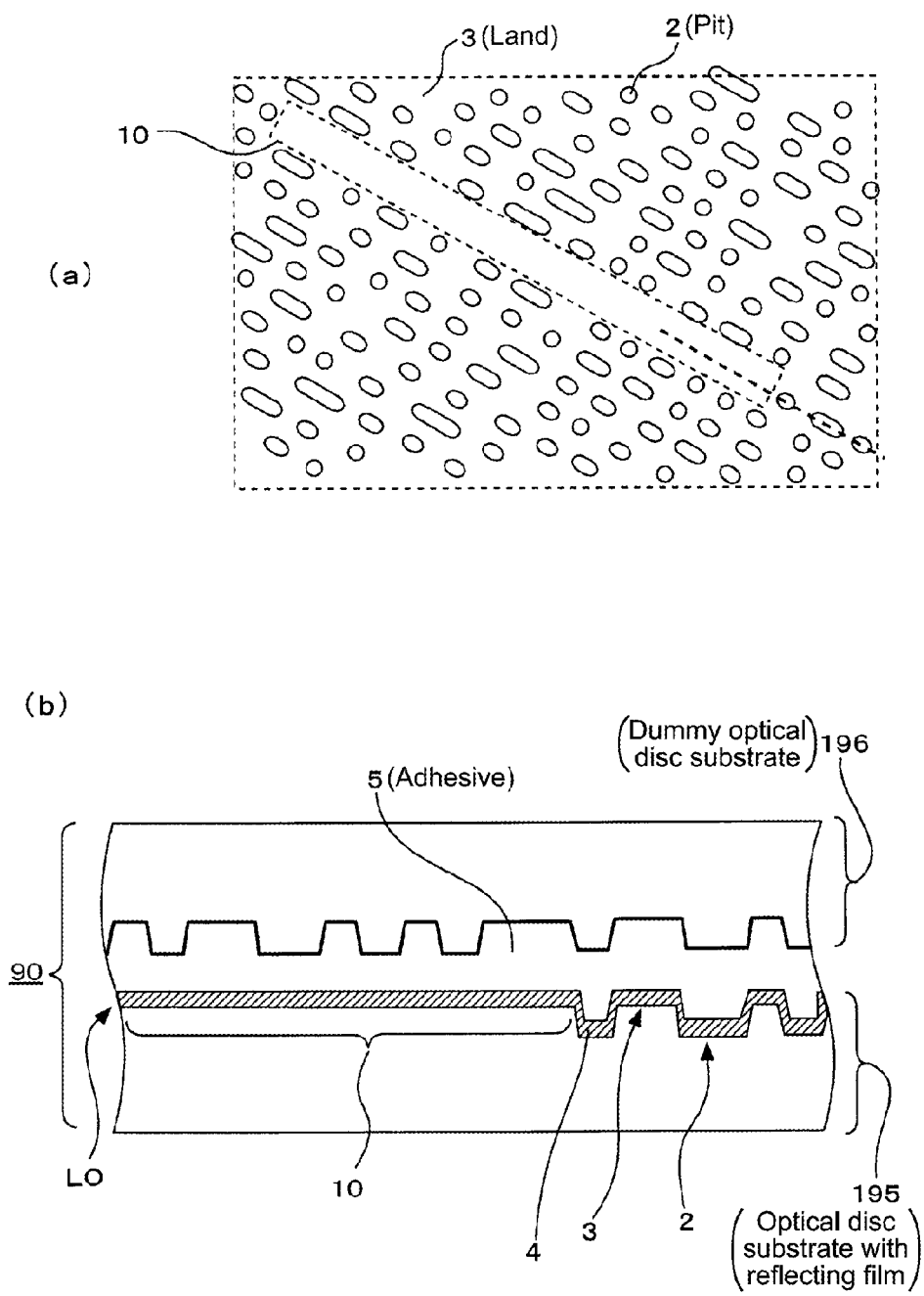
FIG. 5 A partially enlarged view and a schematic sectional view, each of which includes the additional recording area before additional information recording of the read-only optical disc of an embodiment.

FIGS. 5(*a*) and 5(*b*) show the status corresponding to FIGS. 4(*a*) and 4(*b*) before additional information is recorded at the above-mentioned additional recording step.

As shown in FIG. 5(*a*), the additional recording area 10 is a flat shape area as an unmodulated section in which no concavo-concave pattern of pits 2 and lands 3 is formed. As seen from FIG. 5(*b*), the additional recording area 10 exists in the same plane as that of the lands 3 and forms a so-called mirror portion coated with the reflecting film 4.

In the additional recording area 10, additional information is recorded at the additional recording step.

The above-mentioned additional information recording device 150 is prepared as a dedicated recording device using a high-power red semiconductor laser, for example, and has a function of emitting high-power laser pulse for recording in a desired section. The additional information recording device 150 performs recording in the additional recording area 10 in the status of FIG. 5 and forms additional recording marks 6 as in FIG. 4. For the modulation of light emission pattern in this regard, EFM+ signals are used as the same modulation method as the modulation corresponding to the embossed pit rows.

Figure 6:
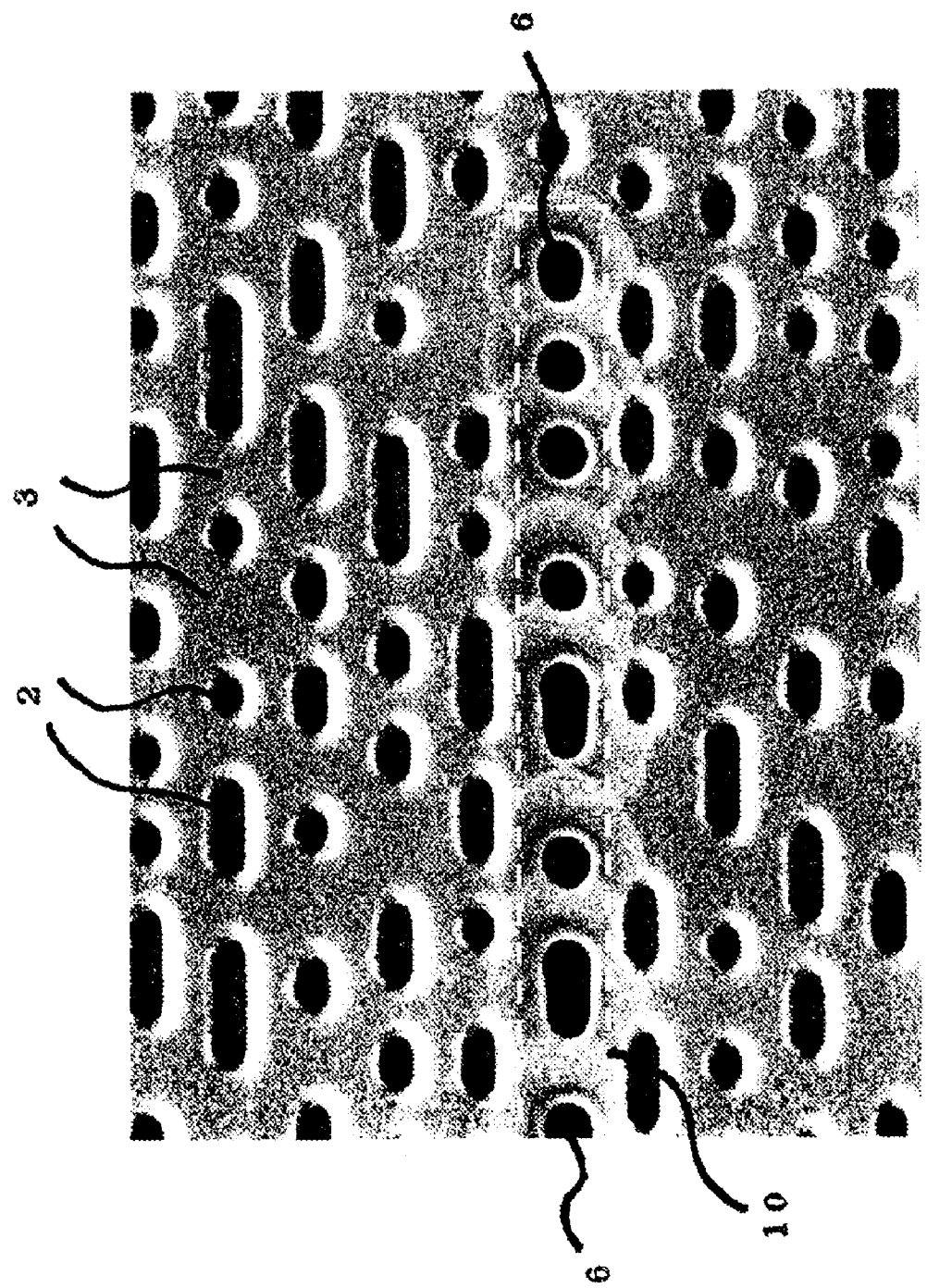
FIG. 6 A diagram for explanation using an SEM photograph of an additional information recording part of the read-only optical disc of an embodiment.

FIG. 6 shows a sample on which additional recording marks 6 are formed as recording of additional information in the additional recording area 10 in the read-only optical disc 90 by entering a high-power laser. This is an SEM (scanning electron microscopic) observation photograph of the additional recording area 10 with the additional recording marks 6 formed therein.

For SEM observation, the optical disc substrate with reflecting film 195 and the bonding substrate 196 (dummy optical disc substrate) are separated at the bonding surface and an electron beam is entered into the part where the reflecting films 4 are bared. For the reflecting film 4, an Al alloy of an Al-base alloy containing about 1 atomic percent Fe and about 5 atomic percent Ti is used.

As seen from FIG. 6, the metal alloy reflecting films formed in the additional recording area 10 are eliminated or reduced according to the modulated signals of the additional information and oval holes are perforated, and additional recording marks 6 corresponding to the pits are neatly formed.

A configuration example of the additional information recording device 150 that records an additional recording mark row of the additional recording marks 6 will be explained with reference to FIG. 7.

Figure 7:
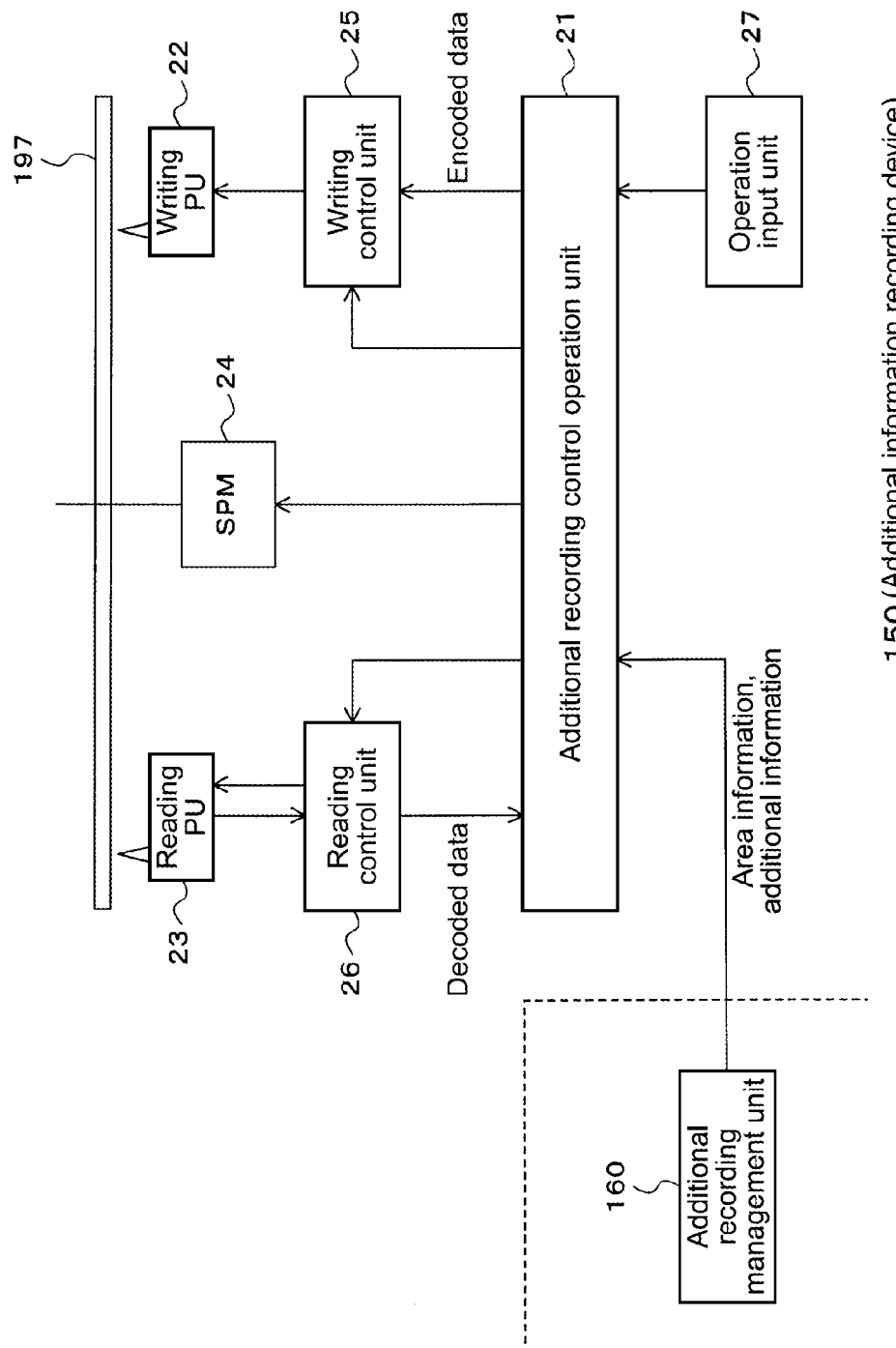
FIG. 7 A block diagram of an additional information recording device of an embodiment.

FIG. 7 is a block diagram of the additional information recording device. The additional information recording device 150 has an additional recording control operation unit 21, a writing pickup 22, a reading pickup 23, a spindle motor 24, a writing control unit 25, a reading control unit 26, and an operation input unit 27.

The bonded optical disc 197 in which additional information is to be written at the additional recording step is mounted on a turntable (not shown) and rotationally driven by the spindle motor 24.

In and from the bonded optical disc 197, the additional information is recorded by the writing pickup 22 and the recorded data is read by the reading pickup 23.

The writing pickup 22 outputs a laser having a wavelength of 660 nm, for example. The laser power can be changed according to the instruction from the writing control unit 25, and the maximum output is about 100 mW, for example. By the laser from the writing pickup 22, the additional recording marks 6 with eliminated or reduced reflecting films 4 are formed on the bonded optical disc 197.

The reading pickup 23 outputs a laser having a wavelength of 635 or 650 nm, for example. The laser power is about 0.2 mW. The reading pickup 23 receives the reflected light of the output laser and obtains signals of the information read from the bonded optical disc 197 from the received reflected light information.

The writing control unit 25 controls the operation of the writing pickup 22 to write the supplied data in the bonded optical disc 197 by the writing pickup 22. That is, the writing control unit 25 generates a laser drive signal based on the supplied data (encoded data of the additional information) and executes the laser output of the writing pickup 22. Further, simultaneously, the writing control unit 25 controls the laser power according to the instruction from the additional recording control operation unit 21. Further, the writing control unit 25 controls writing position, focus, and the like of the writing pickup 22 and executes recording of additional recording marks 6 in predetermined positions according to the instruction from the additional recording control operation unit 21.

The reading control unit 26 allows the reading pickup 23 to execute laser output for reading information from the bonded optical disc 197, performs decoding processing of the information read as reflected light information, and thereby, obtains decoded data as additional information. Further, the reading control unit 26 controls reading position, focus, and the like of the reading pickup 23 and executes reading of information from the bonded optical disc 197.

The additional recording control operation unit 21 performs drive control of the spindle motor 24, operation control on the writing control unit 25, and operation control on the reading control unit 26 as control of trial writing and additional information recording operation executed as the additional information recording device 150.

As described above with reference to FIG. 1, the additional information and area information to be written in the additional recording area 10 are supplied from the additional recording management unit 160, and the additional recording control operation unit 21 loads them and controls execution of the operation at the additional recording step. In this case, the area information is location information (address) of the additional recording area 10.

The additional recording control operation unit 21 controls execution of the trial writing recording and additional information recording operation according to the information from the additional recording management unit 160 and operation input of an operator using the operation input unit 27.

When recording the additional information, the additional recording control operation unit 21 instructs the writing control unit 25 to access the additional recording area 10 and moves the writing pickup 22 to the additional recording area 10. Then, the additional recording control operation unit 21 encodes the additional information and supplies the encoded data to the writing control unit 25, and also gives an instruction for recording conditions of the laser power for writing or the like. With this, the writing control unit 25 drives the writing pickup 22 to form the additional recording marks 6 in the additional recording area 10 based on the encoded data as the additional information.

Further, when recording the additional information, the additional recording control operation unit 21 also instructs the reading control unit 26 to access the additional recording area 10 and instructs reproduction by the reading pickup 23. That is, the additional recording control operation unit 21 gives an instruction for reproduction of the part of the additional recording marks 6 recorded by the writing pickup 22. With this, the additional information is read by the reading pickup 23 and the decoded data is loaded in the additional recording control operation unit 21 by the reading control unit 26. The additional recording control operation unit 21 makes evaluations of the decoded data by detecting the error rate or the like, and determines whether the additional information has been properly recorded or not.

[2. ECC Block Configuration and Allocation of Additional Supplementary Information]

As described above, the read-only optical disc is manufactured as a DVD in which additional information is recorded. In the following, a method for properly realizing the additional information recording will be described in view of the data format of the DVD system.

First, here, ECC block configuration and allocation of additional supplementary information will be explained.

FIG. 8(a) shows a structure of a sector as the minimum unit of a data structure in the DVD data format.

The sector is a data unit of 2064 bytes in 172 bytes×12 rows. One sector includes a sector header of 12 bytes, user data of 2048 bytes, and EDC (error detection code) of four bytes.

In the sector header of 12 bytes, attribute information such as sector format type, tracking system, area information (distinction among lead-in area L1, main data area MA, and lead-out area LO), data type, and layer number, address information, etc. are recorded.

The user data area of 2048 is used for recording main recording data.

The EDC of four bytes is an error detection code within the sector.

An ECC block as one recording unit is formed by gathering 16 of such sectors. FIG. 8(b) shows an ECC block structure.

To 16 sectors of sectors SC0, SC1 . . . SC15, PO parity of 172 bytes×16 rows is added as column-wise parity.

In addition, to sectors SC0, SC1 . . . SC15 and the respective rows of the PO parity, row-wise parity (PI parity) of 10 bytes for each is added.

The 182 bytes×208 rows form the ECC block.

Figure 9:
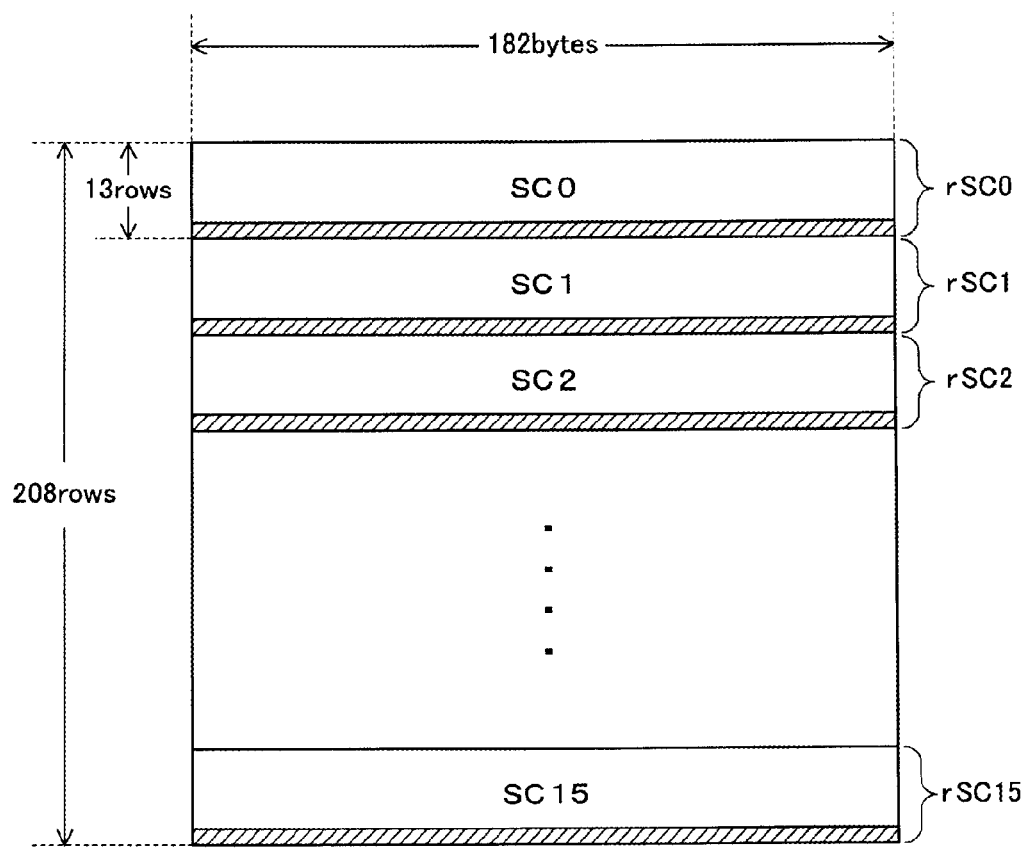
FIG. 9 A diagram for explanation of the ECC block structure after interleaving.

The ECC block is interleaved as shown in FIG. 9. That is, the respective 16 rows of the PO parity are incorporated into the last rows of the respective sectors SC0 to SC15 as shown by the shaded parts in the drawing. The respective sectors of 182 bytes×13 rows in which the rows of the PO parity have been incorporated are used as recording sectors rSC0, rSC1 . . . rSC15.

Figure 11:
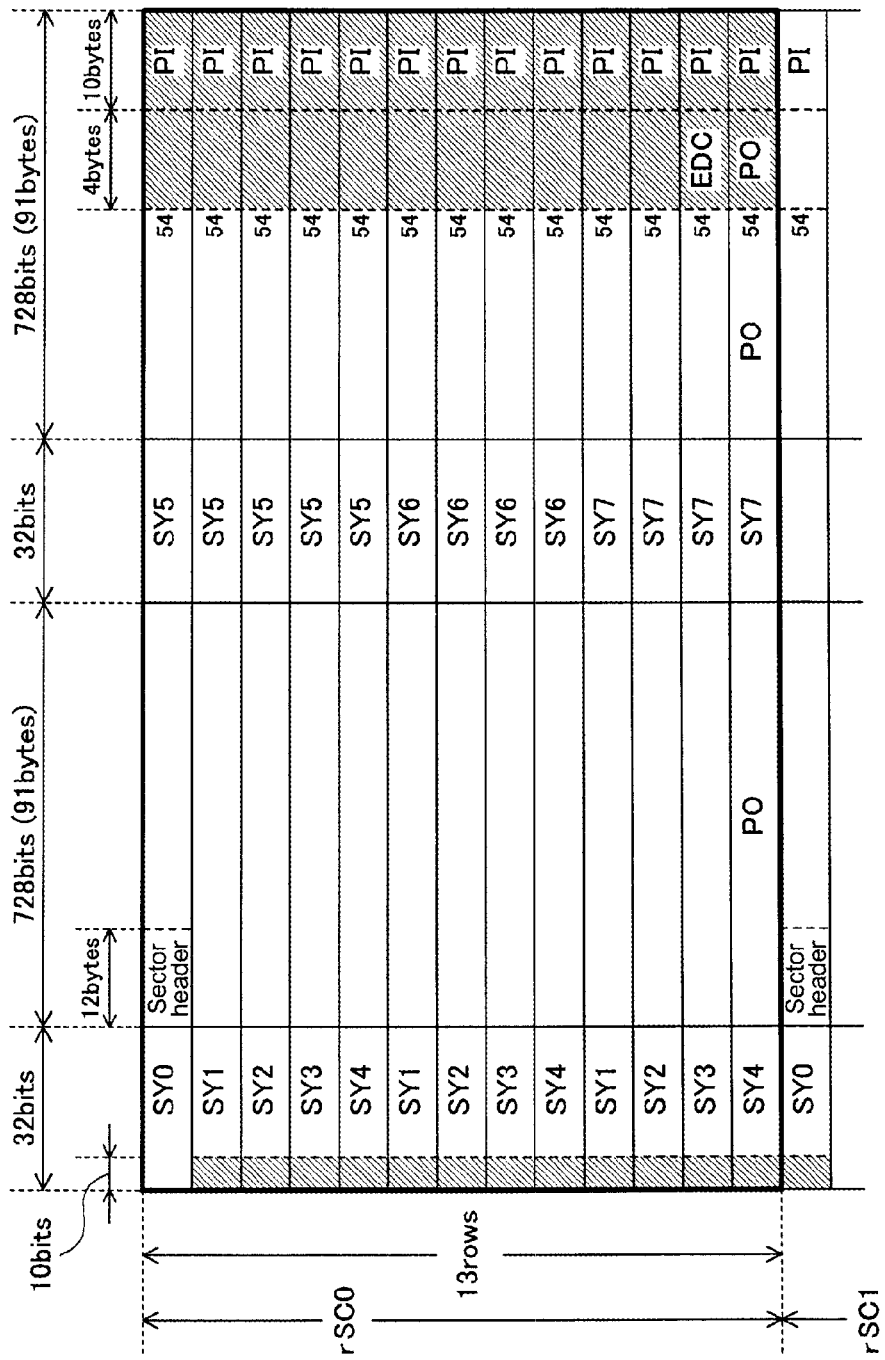
FIG. 11 A diagram for explanation of an additional recording area in a recording sector of an embodiment.

In addition, FIG. 11 shows a part of the recording sector rSC0. In the respective recording sectors rSC0, rSC1 . . . rSC15, one row of 182 bytes is divided into groups of 91 bytes, and 32-bit synchronization signals SY (SY0 to SY7) are added to the units of 91 bytes.

The status in FIG. 11 is a data structure to be finally recorded in a disc. That is, each one byte (8-bit) data symbol of the data structure in FIG. 11 is converted into 16 bits by EFM+ modulation, and pit rows are formed based on logic inversion of NRZI format of the EFM+ modulation signals.

It should be noted that the structure in FIG. 11 includes the respective rows sequentially continuous in the track line direction on the optical disc. That is, on the optical disc, data is recorded in the track line direction in the sequence that the synchronization signal SY0 in the first row→91 bytes containing the sector header of the first row→the synchronization signal SY5 in the first row→91 bytes containing the PI parity of the first row→the synchronization signal SY1 in the second row→91 bytes of the second row→the synchronization signal SY5 in the second row→91 bytes containing the PI parity of the second row→the synchronization signal SY2 in the third row→ . . . .

Figure 10:
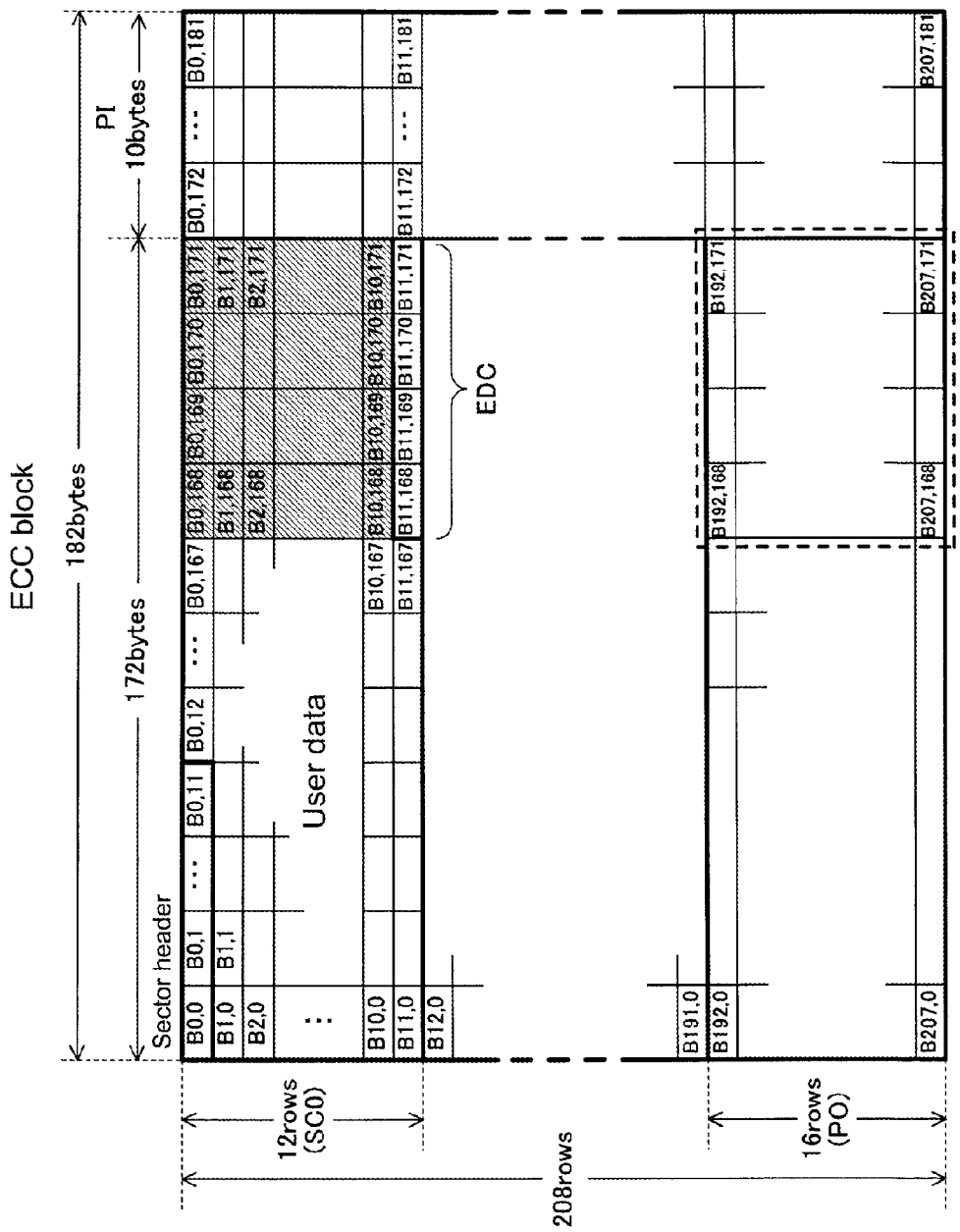
FIG. 10 A diagram for explanation of an allocated location of additional supplementary information within the ECC block of an embodiment.

Here, the allocation of additional supplementary information within the ECC block in this example will be described. FIG. 10 shows the ECC block configuration in FIG. 8(b) by byte locations.

The ECC block of 182 bytes×208 rows has byte locations of B0, 0 to B207, 181.

The data of the first sector SC0 within the ECC block is allocated in the byte locations B0, 0 to B11, 181 including the PI parity.

The B0, 0 to B0, 11 are used for the sector header.

Further, 2048 bytes of B0, 12 to B0, 171, B1, 0 to B1, 171, B2, 0 to B2, 171, . . . B10, 0 to B10, 171, B11, 0 to B11, 167 are used for user data.

Further, B11, 168 to B11, 171 are used for EDC.

Then, each 10 bytes of PI parity are allocated as B0, 172 to B11, 181 in the respective rows.

In the byte locations from B12, 0, the sectors SC1 to SC15 are allocated in the same structure. Further, each 16 bytes of PO parity are allocated in byte locations B192, 0 to B207, and 171 in the respective columns.

In this example, the recording area for additional supplementary information is secured within the user data of one or more certain sectors. In this case, the recording area for additional supplementary information is secured within the shaded part in FIG. 10. The shaded part is a range from 168-column to 171-column, and locations in the same columns in which EDCs (error detection codes) are respectively allocated in the respective sectors (SC0 to SC15) within the ECC block.

The additional supplementary information is recorded within the shaded part for the following reasons.

First, because of the structure of the ECC block, arbitrary data can be recorded in the user data area.

However, even if the additional supplementary information to be recorded is about 100-byte data (not limited to about 100-byte data as a matter of course), it is actually necessary to rewrite EDC, error correction parity PI, PO according to the recording of the additional supplementary information. As a matter of course, if an embossed pit pattern is once formed, rewriting is no longer enabled. Accordingly, if the additional supplementary information is to be recorded, the parity etc. affected by the recording is recorded with the above-mentioned additional recording marks 6 as additional records.

For example, the case where additional supplementary information is additionally recorded in a certain byte location as user data within a certain sector is considered.

Then, four-byte EDC of the sector is affected. Accordingly, it is necessary to set the part of four-byte EDC in the additional recording area (without forming an embossed pit pattern) and records the EDC as an additional record.

Further, since the PO parity in the same columns as those of the byte location where the additional supplementary information has been recorded and the EDC is also affected, it is also necessary to record them as additional records.

In addition, since the PI parity in the same rows as those of the byte location where the additional supplementary information has been recorded and the EDC, and the PI parity in the rows of the PO parity are also affected, it is also necessary to record them as additional records.

As described above, when the additional supplementary information is recorded with additional recording marks using a part corresponding to a part of the user data as an additional recording area 10, it is necessary to form the affected parts of EDC, PO parity, and PI parity of the sector as additional areas 10 and record them with additional recording marks in addition to the additional supplementary information.

Here, minimization of portions for additional recording is considered.

Hypothetically, the case where additional recording is performed in the byte location B2, 0, for example, other than the shaded part within the sector SC0 in FIG. 10 is considered.

Then, regarding the PO parity, it is necessary to record the 16 bytes in the 0-column (B192, 0 to B207, 0) that is the same row as that of the byte location B2, 0 as additional records. Further, also the EDC of the sector SC0 becomes an additional record, and thereby, the respective 16 bites of 168-column to 171-column of the PO parity become additional records.

That is, regarding the PO parity, the same column as that of the recording location of additional supplementary information and the same columns as those of the EDC are affected and it is necessary to additionally record the columns with additional recording marks. However, from the opposite point of view, if the recording location of additional supplementary information is allocated in the same column as the EDC column, only the 168-column to 171-column of the PO parity in the same columns as those of the EDC are affected. That is, as shown by the shaded part, when the recording area of additional supplementary information is set within the range in the same columns as those of the EDC, the affected range of the PO parity can be minimized. Specifically, the affected range of the PO parity can be held within only the 4×16 bytes of B192, 168 . . . B207, 171 surrounded by the broken line as the range in the same columns as those of the EDC of the sector.

That is, in the sector for recording of additional supplementary information, the affected portions within the ECC block can be reduced by recording the information in the same columns as those of the EDC.

In this case, within one sector, additional supplementary information of 44 bytes of 4 bytes×11 rows as the shaded part can be recorded at the maximum.

With respect to one ECC block, additional supplementary information of 704 bytes of 44×16 sectors can be recorded at the maximum.

It should be noted that practically, the allocated location of additional supplementary information may be set according to the data size (number of bytes) of identification information and the like to be recorded as the additional supplementary information, and it is not necessary to allocate all 44 bytes of the shaded part within one sector for recording of the additional supplementary information. For example, only four bytes (one row) may be allocated for recording of additional supplementary information within one sector, and 64 bytes of the 16 sectors may be used for recording in one ECC block.

As a matter of course, the number of sectors for recording of additional supplementary information may be arbitrary within an ECC block. Further, additional supplementary information may be recorded across plural ECC blocks.

The data size of additional supplementary information and the way of using sectors for recording are completely arbitrary. In any case, additional supplementary information may be recorded using a byte location in the same column range as that of EDC in each sector.

[3. Matching at Starting Part of Additional Recording Area]

Next, matching at the starting part of the additional recording area 10 is considered.

As described above, the pit row as an embossed pit pattern has already been formed on the bonded optical disc 197 to be supplied for the additional recording step, and a part of the row is a flat shape area as the additional recording area 10.

Here, what should be considered is how the data of additional recording information is formed in order that an arbitrary additional recording mark is additionally recorded without problem regardless of the status of the pit row already provided adjacently to the additional recording area 10 (e.g., whether the adjacent part immediately preceding the additional recording area 10 is a land or pit, or a changing point of land/pit).

FIG. 11 shows locations corresponding to the additional recording area 10 in the case where all of four bytes in the respective rows in the same columns as those of EDC are used for recording of additional supplementary information in a certain recording sector rSC0.

In this case, the area on the optical disc (bonded optical disc 197) corresponding to the shaded part in FIG. 11 is used as the additional recording area 10.

That is, the parts of four bytes in the same columns as those of the EDC of the user data in the respective rows from the first row to the 12th row, four-byte EDC in the 12th row, four-byte PO parity in the same columns as those of the EDC of the PO parity in the 13th row formed by interleaving, and 10-byte PI parity of the respective rows from the first row to 13th row are contained in the additional recording area 10, and these are recorded in the additional recording mark row with additional recording marks 6.

It should be noted that as will be described later, the location of a part of the synchronization signal SY (10-bit SYNC ID) immediately following the PI parity may be contained in the additional recording area 10, and the 10-bit data is recorded with additional recording marks 6.

Therefore, one additional recording area 10 is an area for recording four-byte user data (or EDC or PO parity), 10-byte PI parity, and 10-bit SYNC ID, and, because one symbol (one byte within the sector structure) is recorded as 16 bits because of EFM+ modulation, becomes a 234-bit area on the optical disc.

Here, the locations immediately preceding the starting part of the additional recording area 10 are locations with "54" in the drawing.

In this example, the pit row immediately preceding the additional recording area 10, i.e., the last pit pattern of the part from the pit row to the additional recording area 10 is defined by a code word of the data symbol "54" or "47". Accordingly, although "54" is written immediately before the additional recording area 10 as the shaded part in the drawing, "47" may be replaced.

In the following, the reason for this will be explained.

First, in the case of additional recording in the additional recording area 10, it is desired that the immediately preceding embossed pit row ends at the land 3 and recording of additional recording mark row is started with connection to the land 3.

Hypothetically, a situation as in FIG. 12(a) is considered.

In FIG. 12(a), it is assumed that a code word "0010000010000100" formed by EFM+ modulation of a data symbol is an end of a pit row as an embossed pit pattern, and the pit row including pits 2 and lands 3 is formed as shown in the drawing.

Here, it is also assumed that recording is started from a certain code word "0100 . . . " in the additional recording area 10.

In this case, on the basis of logic inversion of NRZI format, an additional recording mark 6 continuing from the pit 2 should be formed at the head of the additional recording area 10 as in the drawing. Further, for logic inversion at "1", the additional recording mark 6 should have a length of 2 T.

For example, in such a situation, an additional recording mark 6 continuing from the immediately preceding pit 2 is formed at the start of writing of the additional recording area 10.

In the example in FIG. 12(a), the first additional recording mark 6 has a length of 2 T. Even if the length is less than 2 T or 3 T or more, when the additional recording mark 6 continuing from the pit 2 is formed, it is necessary to well-treat the connection part. For example, it is necessary to prepare a special write strategy that starts laser emission slightly earlier for producing an overlapping portion between the mark and the immediately preceding pit 2.

However, good connection between the pit 2 and the additional recording mark 6 may not completely be ensured due to the complication in processing because the special write strategy should be executed at the start of writing in the additional recording area 10 and the writing for producing an overlapping portion.

Further, as in FIG. 12(a), in the case where the first additional recording mark 6 should be formed to have a length of 2 T, laser emission of 2 T or less is necessary at the start of writing in the additional recording area 10. However, it is difficult to accurately control the formation of additional recording mark/land in a short time such as 1 T or 2 T in additional recording.

If any laser emission of 2 T or less is not allowed to be generated at the start of writing in the additional recording area 10, it is necessary to select one that is not inversed at the leading three bits as a symbol at the start of writing. However, very complicated processing is necessary for this.

For the reasons, it is desired to avoid recording starting from the additional recording mark 6 in the additional recording area 10. Therefore, in the case of additional recording in the additional recording area 10, it is desired that the immediately preceding embossed pit row ends at the land 3 and recording of additional recording mark row is started with connection to the land 3. For example, as shown in FIG. 12(*b*), if the immediately preceding row of the additional recording area 10 ends at the land 3, the writing of the additional recording area 10 can be started with the land 3.

For example, if there is such land connection, it is not necessary to prepare the special write strategy or select one that is not inversed at the leading three bits as a symbol at the start of writing of the additional recording area 10.

Accordingly, next, the case where the head of the additional recording area 10 starts with land connection is considered. In other words, the case where the pit row immediately preceding the additional recording area 10 ends at the land 3 is considered.

In still other words, a situation that the pit row ends at the land 3 can be selected as the last code word of the embossed pit row immediately preceding the additional recording area 10.

In order to start the additional recording area 10 at the land 3, the pit row according to the code word of the data symbol, which immediately precedes the additional recording area 10, may end at the land 3. However, the way of ending of the code word immediately preceding the additional recording area 10 is affected by the way of ending of the further immediately preceding code word of the data symbol. That is, because of NRZI format that H/L logic is inverted at "1", depending on whether the initial part of the code word immediately preceding the additional recording area 10 is "H" or "L" (i.e., whether the further immediately preceding code word ends with "H" or "L"), whether the last part is the pit 2 or land 3 is uncertain. This is because numbers of reversal of polarity of code word vary from one data symbol to another and the polarity at the end may change depending on whether the number is odd or even.

In this case, in order to ensure that the row immediately preceding the additional recording area 10 ends at the land 3, it is proper that the data symbol immediately preceding the additional recording area 10 has a code word in which whether the number of reversal of polarity is odd or even can be selected according to the further preceding data symbol. That is, it is necessary that whether the data symbol has a code word with an even number of reversal of polarity or a code word with an odd number of reversal of polarity can be arbitrarily selected (polarity can be manipulated) at the time of EFM+ modulation.

Here, a conversion table of EFM+ modulation is considered.

In the DVD data format, regarding EFM+ modulation, a main conversion table partially excerpted and shown in FIG. 14 and a sub-conversion table partially excerpted and shown in FIG. 15 are specified.

First, the main conversion table in FIG. 14 will be explained.

In the main conversion table, 16-bit code words for converting data symbols "0" to "255" as 8-bit (1-byte) data values by EFM+ modulation are defined.

Further, four kinds of code words of state 1, state 2, state 3, and state 4 are defined as code words corresponding to one data symbol.

In addition, one of "1" to "4" is determined as the next state for each code word.

The next state indicates which state of code word is used for the next data symbol.

For example, the case where a data row of data symbols of "0", "88", "49" and "255" is EFM+-modulated is considered.

First, the data symbol "0" is converted into the code word in state 1 "0010000000001001" for example. It should be noted that which state of code word is used is arbitrary for the first data symbol of recording data.

"1" is the next state of the code word in state 1 of the data symbol "0". Accordingly, the next data symbol "88" is converted into the code word in state 1 "0001000100010000."

Further, "3" is the next state of the code word in state 1 of the data symbol "88". Accordingly, the next data symbol "49" is converted into the code word in state 3 "1000000010001000."

Further, "2" is the next state of the code word in state 3 of the data symbol "49". Accordingly, the next data symbol "255" is converted into the code word in state 2 "010001000010010."

As described above, in EFM+ modulation, a code word of each data symbol is selected in the state determined by the next state. This is for adapting the connection part of the respective data symbols to run length limitation.

Here, regarding data symbols "0" to "87", a sub-conversion table shown in FIG. 15 is specified.

In the sub-conversion table, four kinds of code words of state 1, state 2, state 3, and state 4 are also defined as code words corresponding to one data symbol.

In addition, one of "1" to "4" is determined as the next state for each code word.

Regarding data symbols "0" to "87", the sub-conversion table is provided and a total of eight code words are selectable. The code words in the sub-conversion table may be used together with the main conversion table.

For example, as described above, when the next state "3" is designated by the cord word of the data symbol "88" and the next data symbol is "49", not only the code word in state 3 "1000000010001000" of the main conversion table but also the code word in state 3 "1001000000010001" of the sub-conversion table may be selected.

The sub-conversion table is provided for adjusting an average ratio of pit/land to regulate the DC offset component of a reproduction RF signal.

That is, with respect to the same data symbol and the same state, the number of inversions (the number of "1") are surely different in even or odd number between the main conversion table and the sub-conversion table. With this, for the recording data in which there are more areas of pits 2 than areas of lands 3 on the recording track using only the main conversion table, for example, the land part and pit part may be made equal by partially utilizing the sub-conversion table to adjust the number of logic inversions.

EFM+ modulation is performed using the main conversion table and the sub-conversion table. Here, the above-mentioned data symbols on which polarity manipulation can be performed are considered.

In order that the pit row immediately preceding the additional recording area 10 ends at the land 3, it is sufficient that the last code word of the immediately preceding pit row has the number of logic inversions (the number of "1") that can be selected from an even number or odd number. This means that it is sufficient that the code word is selected from the main conversion table and the sub-conversion table.

Therefore, the last data symbol of the immediately preceding pit row may be a value within a range from "0" to "87."

Here, the state information is further considered.

As described above, in EFM+ conversion, the state of the code word of the data symbol is determined and selected by the next state of the immediately preceding code word.

Naturally, this should be applied to the last code word of the embossed pit row, the additional recording mark 6, and the first code word.

Then, if writing is to be performed in the additional recording area 10, the additional information recording device 150 should grasp information of the next state of the last code word in the immediately preceding embossed pit row that has been already formed, and select the state based thereon and perform EFM+ conversion. This makes the processing in the entire manufacturing system complicated and makes the versatile usage that the additional information recording device 150 is used not within the factory for manufacturing process in FIG. 1 but in another place and at another time difficult.

However, if the state of the first code word of the additional recording area 10 may be surely set to a certain state, it is no longer necessary for the additional information recording device 150 to consider the information of the next state of the last code word of the immediately preceding embossed pit row.

This means that there should be eight states that have the same next state in the main conversion table and the sub-conversion table.

"47" and "54" framed in FIGS. 14 and 15 satisfy the condition. Regarding the "47" and "54", the next state "1" is designated in all of the code words shown in the main conversion table and the sub-conversion table.

If the data symbol immediately preceding the additional recording area 10 is "47" or "54", state 1 may surely be selected as the state of the code word of the start of writing in the additional recording area 10.

As described above, when the state at the start of the additional recording area 10 is unified into state 1, it becomes unnecessary to transmit the state information at the starting part of each additional recording area 10 to the additional information recording device 150. For example, if the last symbol of the pit row immediately preceding the additional recording area 10 is other than "47" or "54", the additional information recording device 150 can properly select the state only after acquiring the information of the next state of the last code word of the pit row. However, the state is unified as state 1, and it is not necessary for the device to receive the designation information of the next state from the additional recording management unit 160.

This is preferable not only for simplification of the processing of the additional information recording device 150 but also for system expansion.

Consequently, when the last symbol of the pit row immediately preceding the additional recording area 10 is "47" or "54", data recording matching with the immediately preceding pit row at the starting part of the additional recording area 10 can be performed without especially complicated processing or transfer of state information, and the additional recording mark row having stable shapes can be formed with the land 3 as its head.

It should be noted that in the main conversion table and the sub-conversion table of EFM+ conversion, the code words in state 1 of all data symbols have first 2 bits of "00", and thereby, the head of the additional recording area 10 is surely started from the land 3 having a length of 2 T or more.

Figure 13:
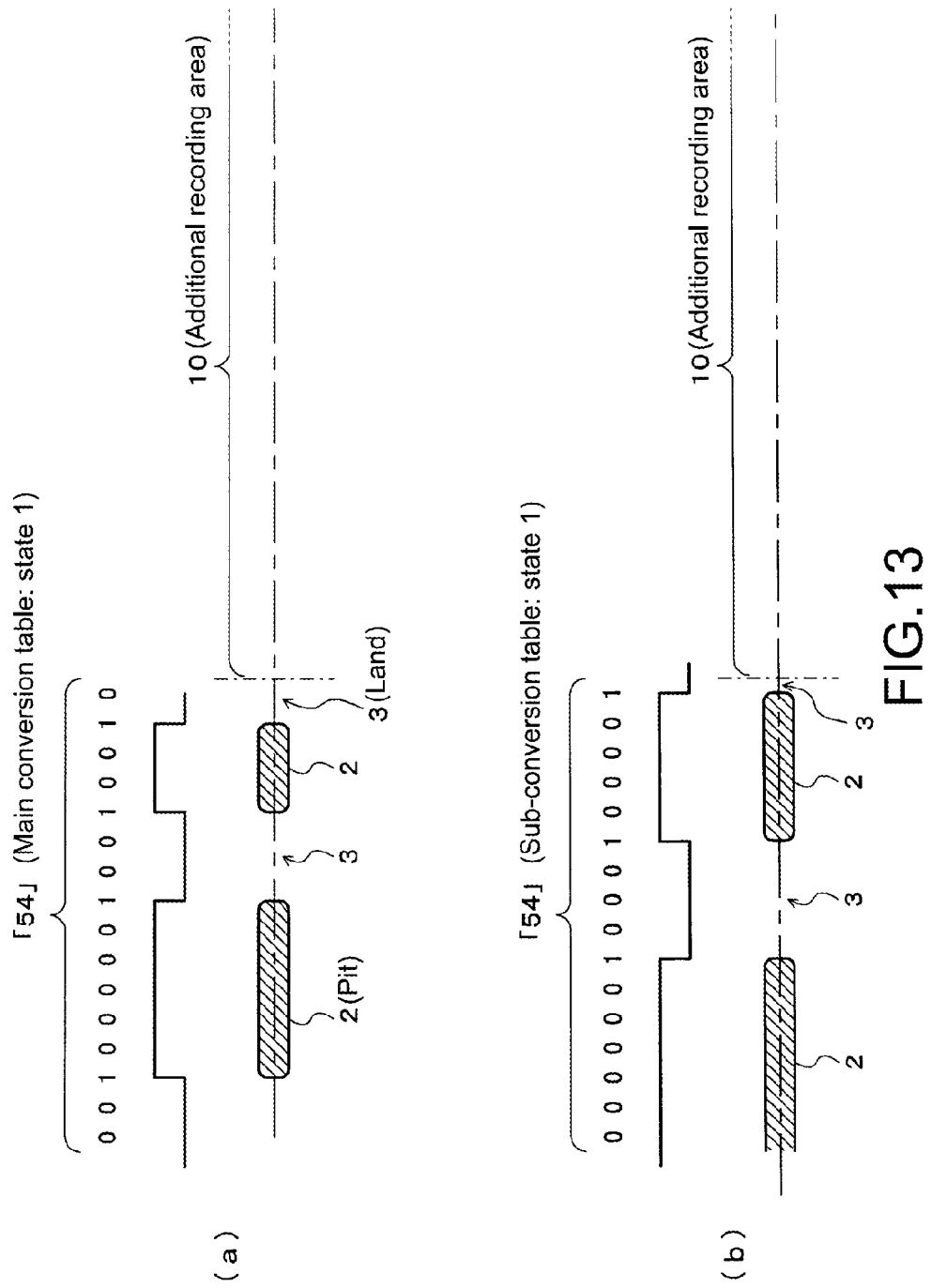
FIG. 13 Diagrams for explanation of the case where a data symbol "54" is recorded immediately preceding the additional recording area in an embodiment.

FIGS. 13(*a*) and 13(*b*) show statuses when the code word of the data symbol "54" is the last code word of the pit row immediately preceding the additional recording area 10.

FIGS. 13(*a*) and 13(*b*) show cases where the code word in state 1 is selected for the data symbol "54". These are the cases where the state 1 has been designated in the further preceding code word. As a matter of course, a code word in state 2 to state 4 may be selected for the "54."

Here, FIG. 13(*a*) shows the case where the code word of "54" is started by "L" logic because the last of the further preceding code word is "L."

On the other hand, FIG. 13(*b*) shows the case where the code word of "54" is started by "H" logic because the last of the further preceding code word is "H."

If started by "L" logic, in order to end the pit row at land 3, it is sufficient that the code word of "54" is selected from the main conversion table. The code word in state 1 of "54" in the main conversion table is "0010000010010010", and the number of inversions is an even number. Accordingly, as shown in the drawing, the pits 2 and lands 3 are formed and the ending part is the land 3.

On the other hand, if started by "H" logic, in order to end the pit row at land 3, the code word of "54" may be selected from the sub-conversion table. The code word in state 1 of "54" in the sub-conversion table is "0000001000100001", and the number of inversions is an odd number. Accordingly, as shown in the drawing, the pits 2 and lands 3 are formed and the ending part is the land 3.

For the data symbol on which polarity manipulation can be performed, the main conversion table or the sub-conversion table is selectable and the even/odd number of inversions is also selectable. With this, regardless the preceding data symbol, the pit row may be ended at the land 3 (i.e., recording in the additional recording area 10 can be started with land connection).

As a matter of course, even when the state 2, state 3, or state 4 is designated according to the immediately preceding code word for the "54", it is sufficient that the code word is selected from the main conversion table and the sub-conversion table according to the starting logic for ending the ending part at the land 3.

Here, the data symbol 54 has been illustrated, and the same applies to the "47."

Therefore, as shown in FIG. 11, when the immediately preceding pit row of the additional recording area 10 shown by the shaded part is a data symbol "54" or "47", proper additional recording can be performed at the starting part of the additional recording area 10.

More specifically, in the case where the head of the additional recording area 10 is the byte location B0, 168 or B1, 168 in FIG. 10, for example, the sector data may be set so that the immediately preceding byte location B0, 167 or B1, 167 may be the data symbol "54" or "47."

Further, in the case where the additional recording mark 6 is recorded by the light emission of a laser or the like in the additional recording area 10, if the polarity of the data symbol starts from a land, the light emission of 2 T or less is suppressed, and thus, advantages such that ranges of the frequency characteristic of the laser drive circuit of the additional information recording device 150 and the MTF design of the optical system become wider, and the consideration for write strategy of 1 T and 2 T is no longer necessary are obtained.

[4. Matching at Ending Part of Additional Recording Area]

Subsequently, matching at the ending part of the additional recording area 10 will be described.

As shown in FIG. 11, in the structure of the recording sector, synchronization signal SY is added with respect to each 91 bytes.

Eight kinds of synchronization signals SY of SY0 to SY7 are defined, and the synchronization signal SY is added to each data of 91 bytes in the sequence (SY0→SY5→SY1→SY5→SY3→SY5→SY4→ . . . ) shown in FIG. 11.

The sequence of the respective synchronization signals SY0 to SY7 is unique within a sector. For example, the respective sequences of "SY0→SY5", "SY5→SY1", and "SY1→SY5" appear at once within the sector. Accordingly, the position within the sector can be detected according to the anterior and posterior sequence of the synchronization signals SY.

Here, when additional supplementary information and EDC, and affected PO parity, PI parity are written as additional information within the sector, the shaded part in FIG. 11 is the additional recording area 10 as described above.

Since the synchronization signal SY is allocated subsequently to the PI parity, the synchronization signal SY immediately follows each additional recording area 10. Here, in this example, the first 10-bit part of the synchronization signal SY is contained in the additional recording area 10 as shown by the shaded part in FIG. 11 and recorded with the additional recording mark row, and thus, proper matching at the ending part of the additional recording area 10 may be obtained.

Here, the synchronization signal SY in the DVD data format will be explained.

Figure 16:
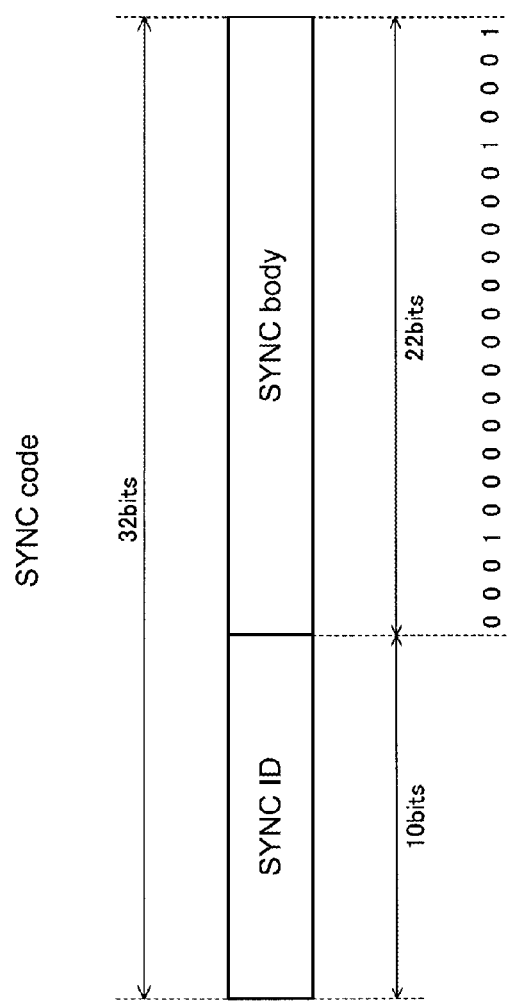
FIG. 16 A diagram for explanation of a SYNC code of a DVD.

The synchronization signal SY is formed by a 32-bit SYNC code as shown in FIG. 16. Further, the first 10 bits of the 32 bits are used as a SYNC ID and the other 22 bits are used as a SYNC body.

The SYNC ID is an identification code for identifying the synchronization signals SY1 to SY7. Further, the SYNC body is a 22-bit pattern "0001000000000000010001" that is common among the synchronization signals SY1 to SY7, i.e., a code containing a 14 T pattern specific to the synchronization signal.

Four patterns are defined for the respective synchronization signals SY1 to SY7 as shown in FIG. 17.

First, for the code word immediately preceding the synchronization signal SY, when the next state of "1" or "2" is designated, the primary SYNC code or secondary SYNC code in the upper half of FIG. 17 is used.

Further, for the code word immediately preceding the synchronization signal SY, when the next state of "3" or "4" is designated, the primary SYNC code or secondary SYNC code in the lower half of FIG. 17 is used.

Regarding the relation between the primary SYNC code and the secondary SYNC code, as in the above-mentioned case of the relation between the main conversion table and the sub-conversion table, the number of logic inversions may be selected as an odd number or even number.

As also seen from FIG. 17, the 22-bit SYNC body is common among all SYNC codes and the respective synchronization signals SY1 to SY7 are defined in four patterns with the first 10-bit SYNC IDs.

In the case where the ending part of the additional recording area 10 is properly connected to the pit row, it is preferable that the SYNC ID and the SYNC body are separately considered.

That is, since the part of SYNC ID is to be selected according to the designation of the next state of the immediately preceding code word, it is not selectable until the additional information is recorded.

On the other hand, the part of SYNC body has the same code pattern regardless of the selected SYNC code.

On this account, it is understood that the thing to do is to end the additional recording area 10 at the SYNC ID and start the pit row continuing to the additional recording area 10 from the part of SYNC body.

That is, at the stage of the bonded optical disc 197 in FIG. 1, the additional recording area 10 is formed to include the part of the SYNC ID as a flat shape area, and the embossed pit pattern of the SYNC body is formed to continue from the flat shape area.

It should be noted that in this case, although it may be impossible to form the SYNC body if it is unknown whether the embossed pit row of the SYNC body starts with a land 3 or pit 2, to put it other way around, if whether the head of the SYNC body is a land 3 or pit 2 is determined in advance, matching can be obtained by the selection of the pattern of the SYNC ID (the selection between the primary SYNC code and the secondary SYNC code).

For example, when the head of the SYNC body immediately following the additional recording area 10 (i.e., the 11th bit of the SYNC code) is determined to be a land 3, regarding the SYNC body from 11th bit to 32nd bit, the 14th bit to 27th bit may be created as a 14 T pit.

On the other hand, when the head of the SYNC body immediately following the additional recording area 10 is determined to be a pit 2, regarding the SYNC body from 11th bit to 32nd bit, the 14th bit to 27th bit may be created as a 14 T land.

Figure 18:
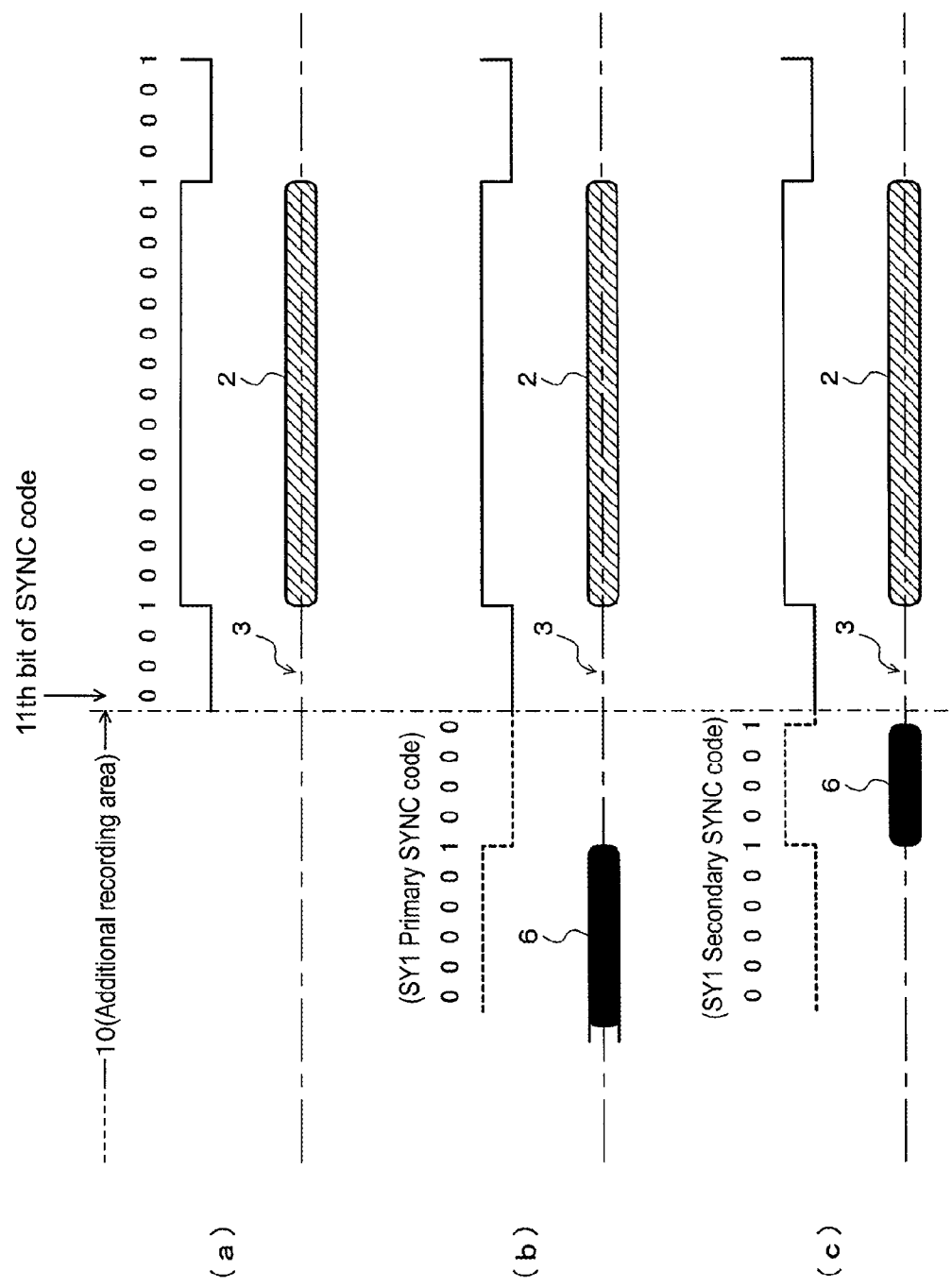
FIG. 18 Diagrams for explanation of a recording status at the ending part of the additional recording area of an embodiment.

Regarding the case where the SYNC body immediately following the additional recording area 10 is determined to start from a land, the statuses of the ending part of the additional recording area 10 are shown in FIG. 18.

FIG. 18(a) shows a status in which recording is not yet performed in the additional recording area 10 (i.e., the stage of the bonded optical disc 197), and, as the pit row following the additional recording area 10, the 11th and subsequent bits of the SYNC code start from the land 3 and the pit 2 of 14 T is formed.

In this case, it is assumed that the additional recording mark row is recorded in the additional recording area 10 and the SYNC ID of the synchronization signal SY1 is recorded in the ending part thereof.

Further, it is also assumed that the next state is "1" or "2" for the code word additionally recorded immediately before the synchronization signal SY1. Then, the SYNC code of the synchronization signal SY1 in the upper half of FIG. 17 is selected. Here, the pit row has been already formed to start with the land 3, and the part of the SYNC ID may be continued to the SYNC body at the land 3.

That is, if the SYNC ID starts with "H" logic, as shown in FIG. 18(b), the primary SYNC code "0000010000" of the synchronization signal SY1 is selected. With this, the additional recording mark 6 and the land 3 are formed as shown in the drawing and connected to the immediately following SYNC body without logic inconsistency.

On the other hand, if the SYNC ID starts with "L" logic, as shown in FIG. 18(c), the secondary SYNC code "0000010001" of the synchronization signal SY1 is selected. With this, also in this case, the additional recording mark 6 and the land 3 are formed as shown in the drawing and connected to the immediately following SYNC body without logic inconsistency.

Figure 19:
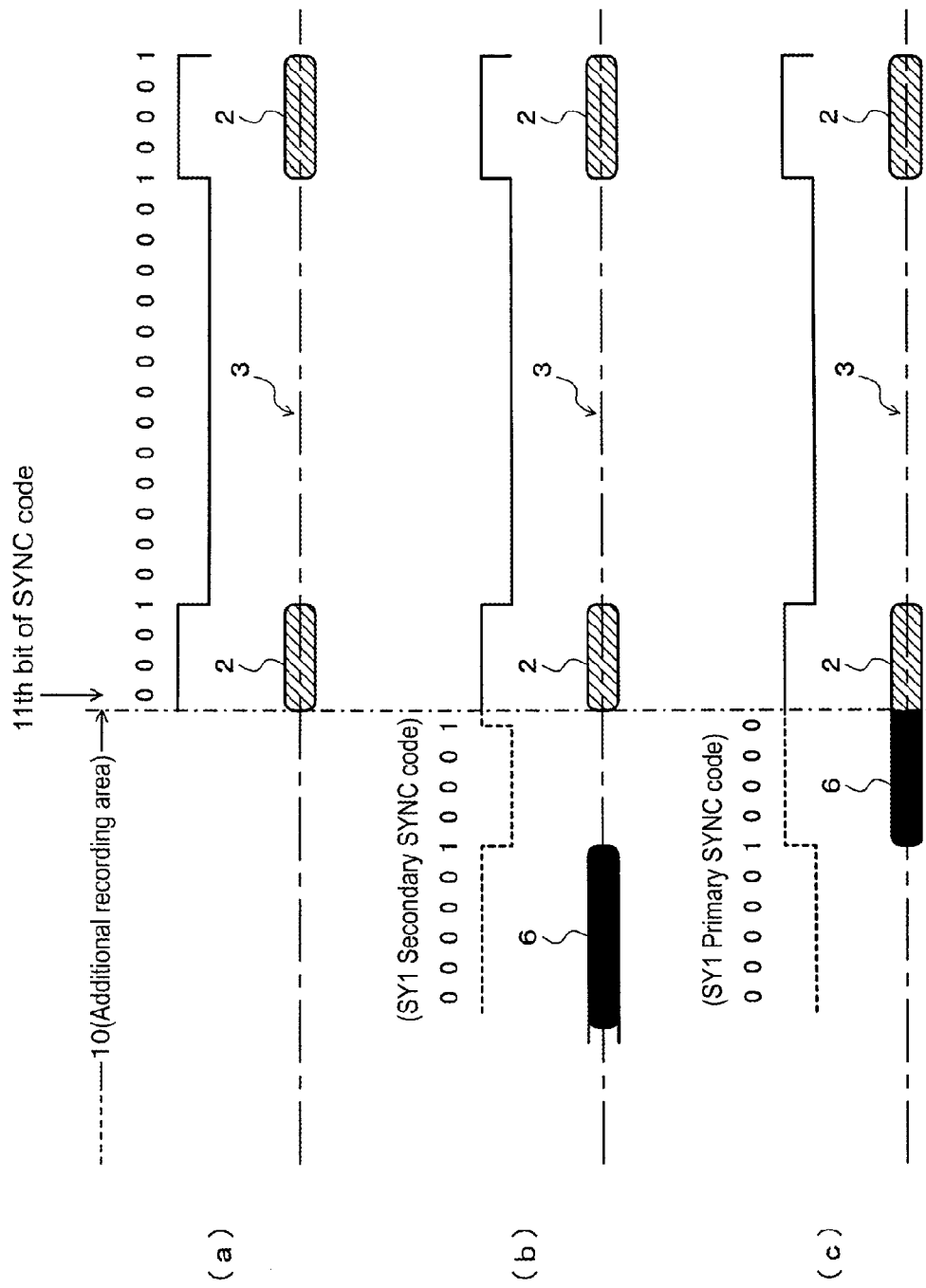
FIG. 19 Diagrams for explanation of a recording status at the ending part of the additional recording area of an embodiment.

Alternatively, the SYNC body immediately following the additional recording area 10 may be determined to start from a pit, and the statuses of the ending part of the additional recording area 10 are shown in FIG. 19.

FIG. 19(a) shows a status in which recording is not yet performed in the additional recording area 10 (i.e., the stage of the bonded optical disc 197), and, as the pit row following the additional recording area 10, the 11th and subsequent bits of the SYNC code start from the pit 2 and the land 3 of 14 T is formed.

In this case, it is assumed that the SYNC ID of the synchronization signal SY1 is recorded at the ending part of the additional recording area 10 as is the case shown in FIG. 18. Further, it is also assumed that the next state is "1" or "2" for the code word additionally recorded immediately before the synchronization signal SY1 and the SYNC code of the synchronization signal SY1 in the upper half of FIG. 17 is selected.

In this case, since the pit row has been already formed to start with the pit 2, and it is sufficient that the part of the SYNC ID is continued to the SYNC body at the pit 2.

That is, if the SYNC ID starts with "H" logic, as shown in FIG. 19(b), the secondary SYNC code "0000010001" of the synchronization signal SY1 is selected. With this, the additional recording mark 6 and the land 3 are formed as shown in the drawing and connected to the immediately following SYNC body without logic inconsistency.

On the other hand, if the SYNC ID starts with "L" logic, as shown in FIG. 19(c), the primary SYNC code "0000010000" of the synchronization signal SY1 is selected. With this, the additional recording mark 6 and the land 3 are formed as shown in the drawing and connected to the immediately following SYNC body without logic inconsistency.

That is, the SYNC ID is to be additionally recorded in the additional recording area 10 and whether the immediately following SYNC body as the pit row starts with a land or pit is determined, and thereby, the SYNC body can be formed in an embossed pit pattern in advance and, at the time of additional recording, matching between the ending part of the additional recording area 10 and the following pit row can be obtained by properly selecting the SYNC ID at the ending part of the additional recording area 10.

[5. Allocation of PO Compensation Symbols]

Next, PO compensation symbols are explained.

As described above, immediately preceding the additional recording area 10, the code word "54" or "47" of the embossed pit row is allocated. Hereinafter, the code word "54" or "47" is referred to as "polarity control symbol."

The PO compensation symbol is a symbol necessary for matching the PO parity correspondingly to allocation of the polarity control symbol.

FIGS. 20 to 25 show various PO compensation symbol allocation examples in the ECC block.

FIGS. 20 to 25 show the ECC block in the case where the PID (the identification information for each disc) is additionally recorded as the additional supplementary information in four bytes in the same columns as those of the EDC.

The shaded parts are recording parts of the additional information with the additional recording marks, which includes the PID, EDC, PO parity, PI parity, and the like.

The polarity control symbols are denoted by "54." It should be noted that although in the following description, all of the polarity control symbols are denoted by "54," it may be replaced by the cord word "47" as described above.

Further, "X" denotes the PO compensation symbols.

Figure 20:
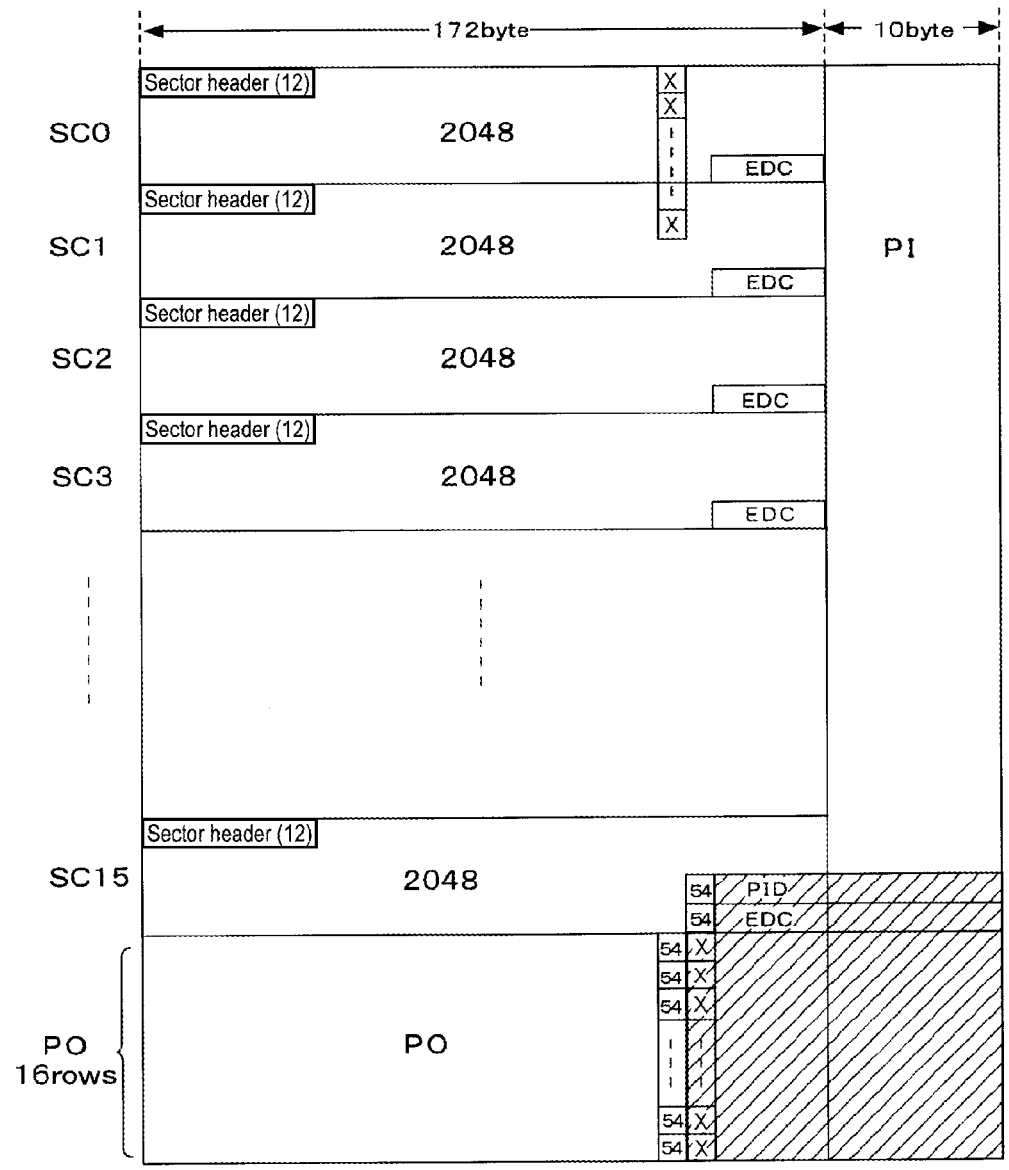
FIG. 20 A diagram for explanation of a symbol allocation example for additional recording of an embodiment.

FIG. 20 shows an example in which the PID is recorded in four bytes in the same columns as those of the EDC in a sector SC15. That is, the PID is allocated upward from the last sector. In order to record additional supplementary information of five or more bytes, four bytes in the same columns as those of the EDC are used sequentially upward.

Immediately preceding all shaded additional-recording-mark recording parts, the polarity control symbols "54" are allocated.

In this case, within the ECC block, the PO compensation symbols are allocated at 16 locations in the same column as that of the polarity control symbols.

For example, in the PO parity part having a 16-row range, for each row, immediately preceding the additional-recording-mark recording part, the polarity control symbol "54" is allocated. That is, in this column, 16 PO parities are adversely fixed to "54." Therefore, the PO parities should be compensated to have such a value. Accordingly, 16 PO compensation symbols "X" are allocated in the same column.

In this case, from the sector SC0 to a middle point of the sector SC1, 16 PO compensation symbols "X" are continuously allocated.

It should be noted that in the case of FIG. 20, according to the polarity control symbols "54" immediately preceding the additional recording parts of the PID and EDC, the PO compensation symbols "X" are formed as the PO parities in the same column, and they are recorded as the additional recording marks.

In the case of the example of FIG. 20, the PO compensation symbols "X" in the sectors SC0 and SC1 are allocated in the column just before the column in which the polarity control symbol "54" immediately preceding the PID is allocated, and hence the additional supplementary information of 704 bytes, such as PID, can be recorded at the maximum. That is, one sector is constituted of 12 rows, and in 11 rows except the EDC, the respective four bytes can be used for additional recording. Thus, 11×4(byte)×16(sector)=704 bytes.

Figure 21:
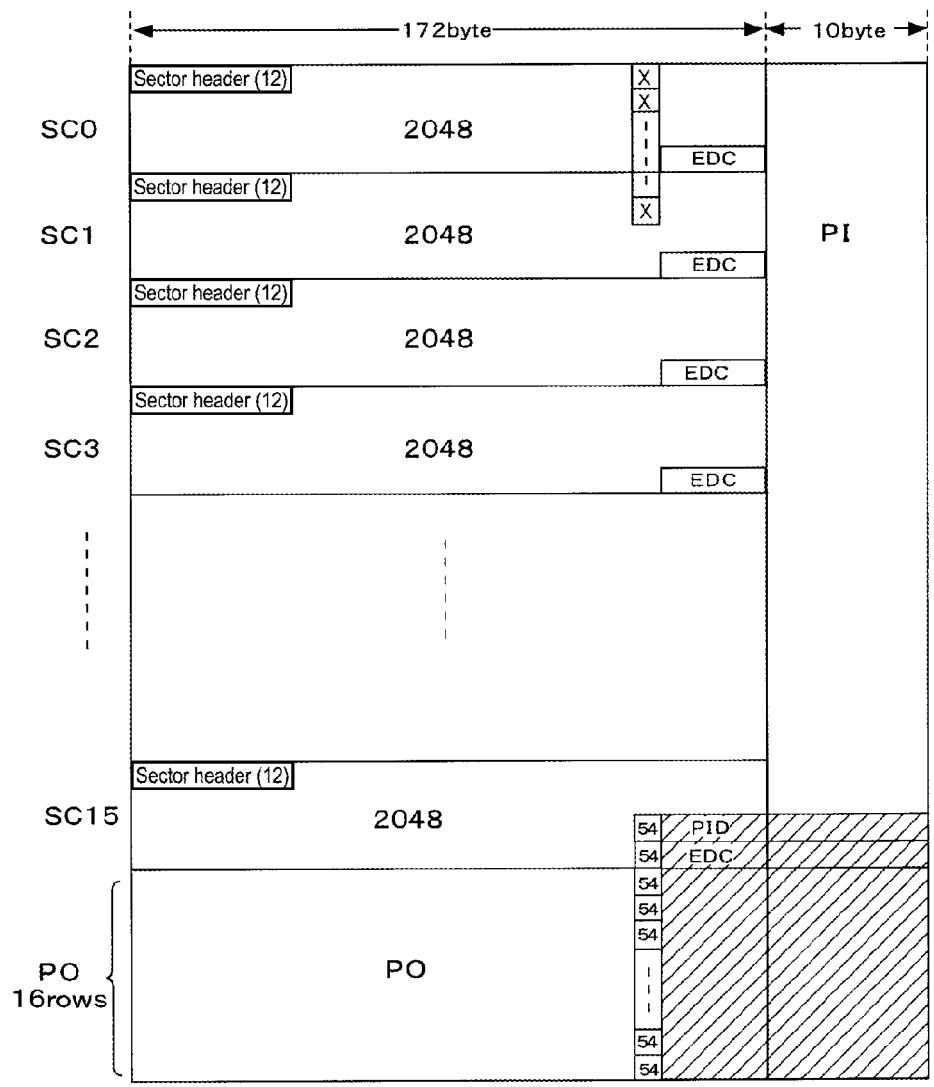
FIG. 21 A diagram for explanation of a symbol allocation example for additional recording of an embodiment.

FIG. 21 shows an example in which the PO compensation symbols "X" are allocated in the same column as that of the polarity control symbols "54" immediately preceding the PID and the like.

Immediately preceding the respective additional recording parts of the PID, EDC, and PO parity, the polarity control symbols "54" are allocated. In the same column as that of the polarity control symbols "54," within a range of from the head sector SC0 to the sector SC1, 16 PO compensation symbols "X" are continuously allocated.

In this case, regarding each row of the sectors SC0 to SC1, in which the PO compensation symbols "X" are allocated, four bytes cannot be secured as the additional recording area. Since one byte has to be secured as the polarity control symbol "54," three bytes are secured at the maximum in each of 11 rows of the sector SC1 and 4 rows of the sector SC2. Therefore, the additional supplementary information of 689 bytes is recorded at the maximum.

Figure 22:
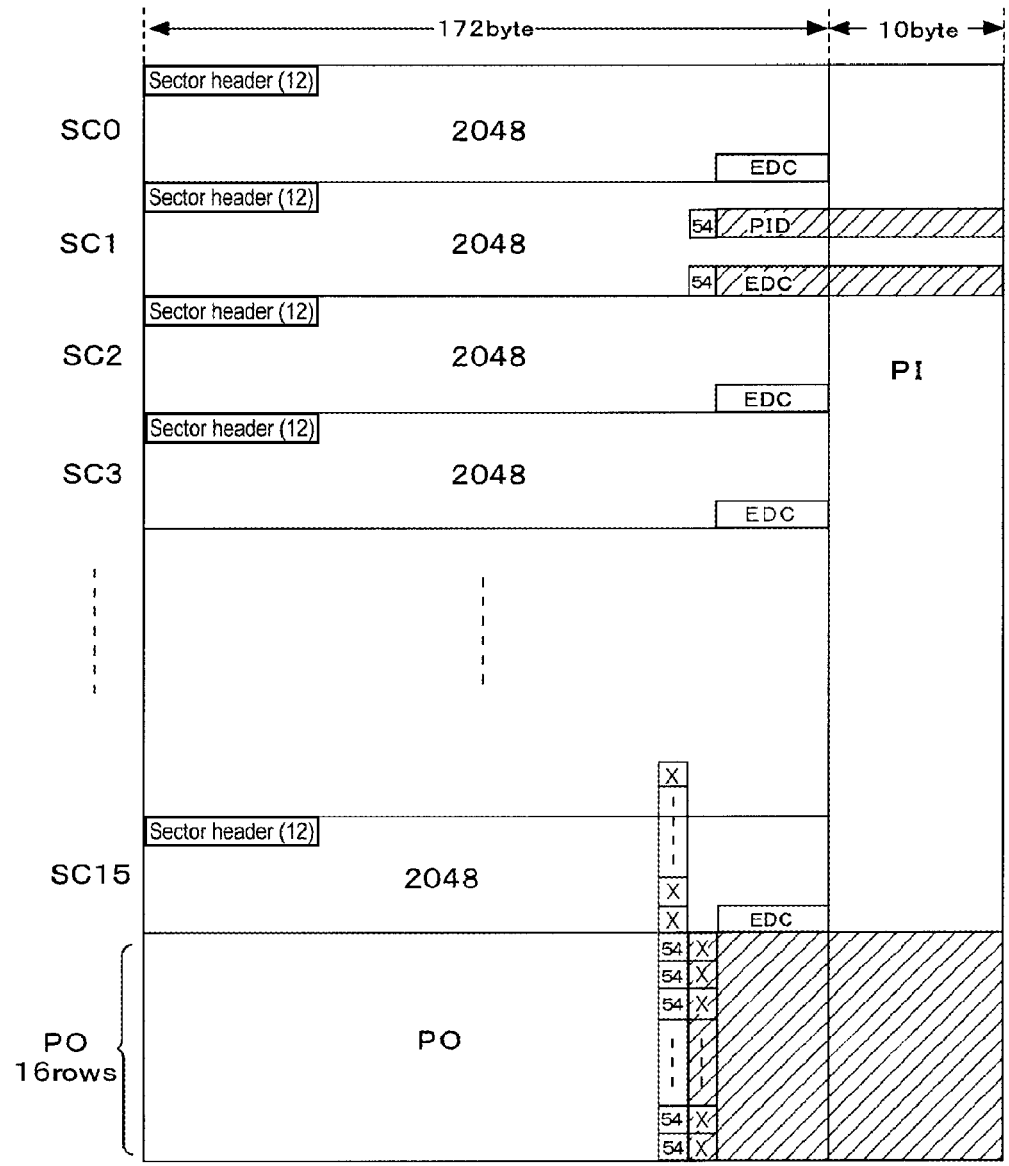
FIG. 22 A diagram for explanation of a symbol allocation example for additional recording of an embodiment.

FIG. 22 shows an example in which the PID is recorded in an arbitrary sector. Here, the example in which the PID is written in a certain row of the sector SC1 is shown.

Sixteen PO compensation symbols "X" are, from the last sector SC15 to a middle point of the sector SC14, allocated continuously.

The additional supplementary information of 704 bytes, such as the PID, can be recorded at the maximum.

Figure 23:
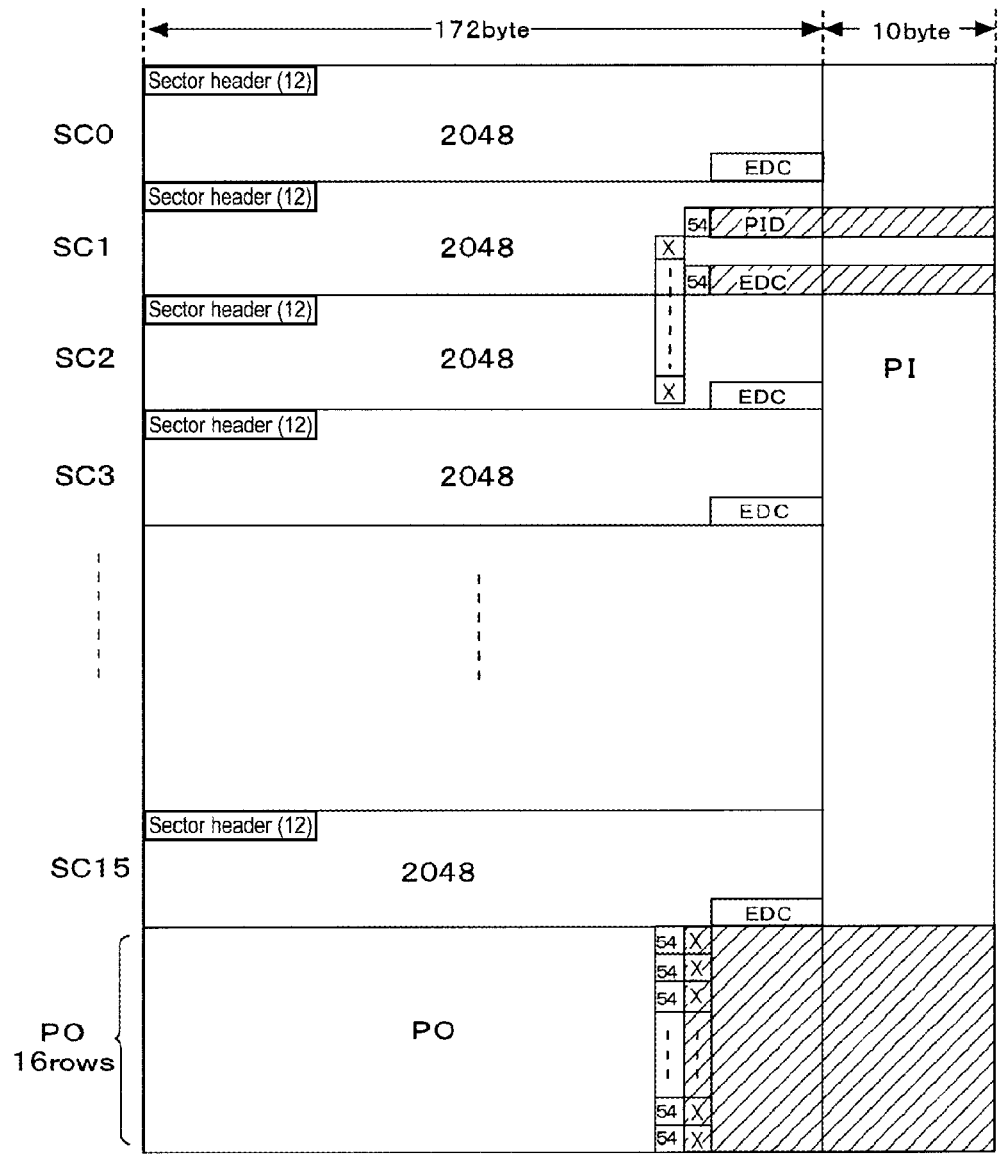
FIG. 23 A diagram for explanation of a symbol allocation example for additional recording of an embodiment.

FIG. 23 shows an example in which the PID is recorded in an arbitrary sector and 16 PO compensation symbols "X" are continuously allocated in not the starting end nor ending end, but a middle portion of a column. As one example, the PO compensation symbols "X" are allocated also in the sector SC1 in which the PID is recorded.

Figure 24:
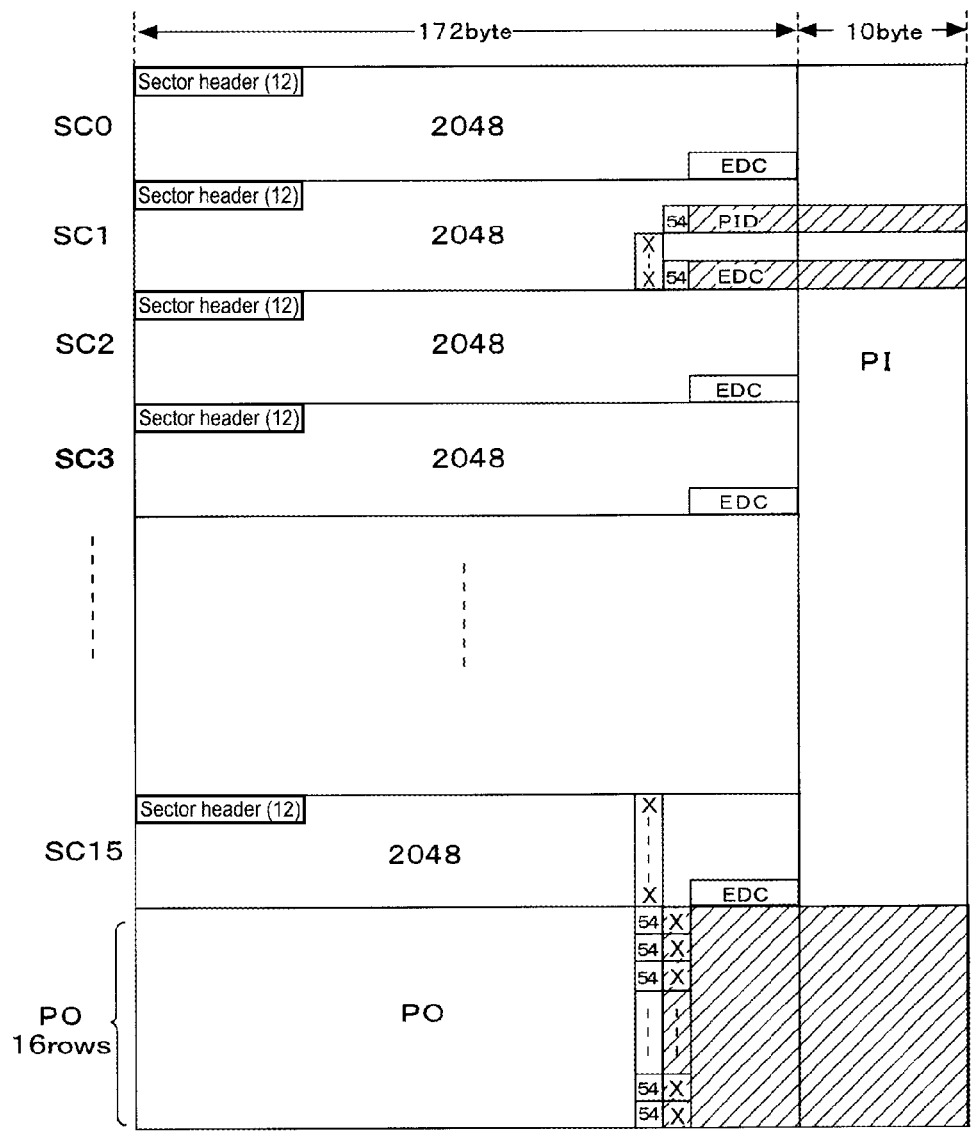
FIG. 24 A diagram for explanation of a symbol allocation example for additional recording of an embodiment.

FIG. 24 shows an example in which 16 PO compensation symbols "X" are divided and allocated.

For example, they are divided into a plurality of groups and allocated in the sector SC1 and the sector SC15.

Figure 25:
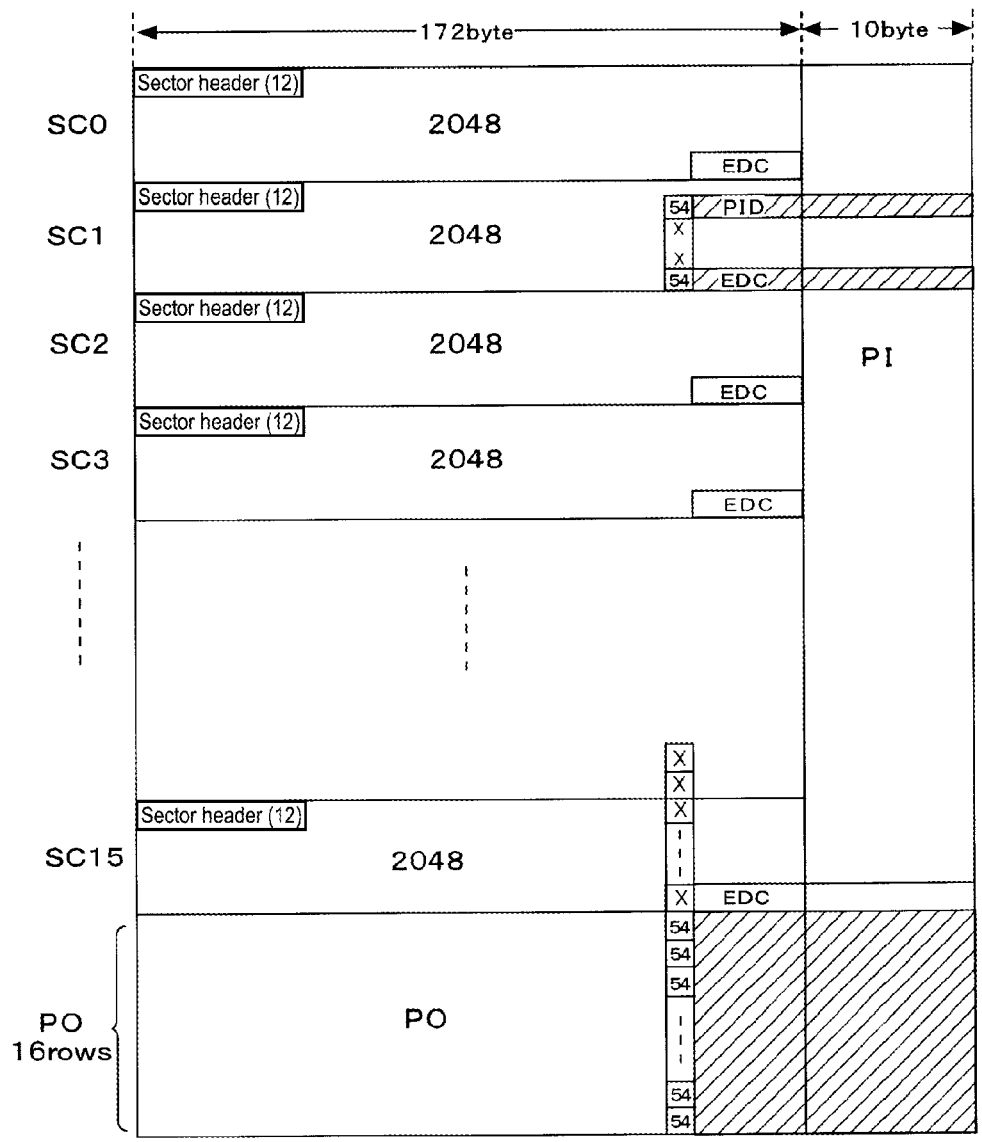
FIG. 25 A diagram for explanation of a symbol allocation example for additional recording of an embodiment.

FIG. 25 shows an example in which 16 PO compensation symbols "X" are divided into a plurality of groups and allocated in the same column as that of the polarity control symbols "54."

For example, various allocation examples of the PO compensation symbols "X" are conceivable as described above. As a matter of course, various examples other than those examples can be envisaged.

Since the polarity control symbol "54" needs to be allocated immediately before the additional recording area (especially, the PO parity part) as described above, the PO compensation symbols "X" have to be allocated in the same column. This means that it is proper that the ECC block is the ECC block allocated only for recording the additional supplementary information such as the PID, that is, the ECC block other than the area to be used for recording original content recorded on a DVD.

[6. Application to Navigation Commands of DVD]

When recording of the additional supplementary information with the additional recording marks is performed on a read-only DVD, it is desirable that the additional supplementary information such as the PID can be utilized in a generally-used DVD player. For example, when a DVD is inserted into the player, the player reads the PID so as to perform various processing so that proper operation and new reproduction mode can be provided to a user.

For example, operation for copy right protection based on the PID, reproduction operation of special titles with respect to discs including particular PIDs, and the like are conceivable.

In order to realize such operations, a navigation command in the DVD system can be utilized.

In this embodiment, the PID as the additional supplementary information is incorporated into the structure of the navigation command, to thereby enable the DVD player to read the PID from the disc.

Figure 26:
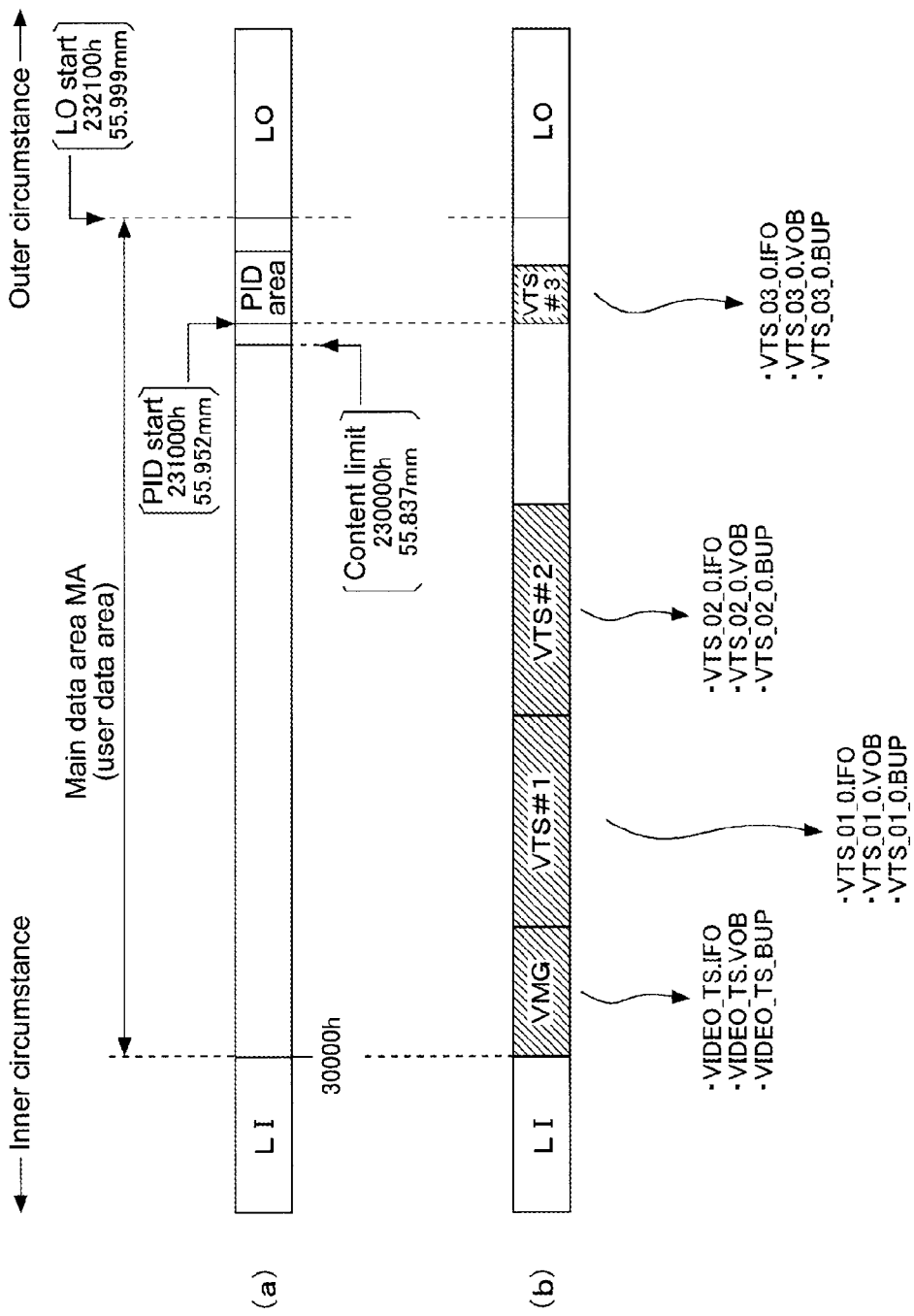
FIG. 26 Diagrams for explanation of a PID area on a DVD of an embodiment.
Figure 27:
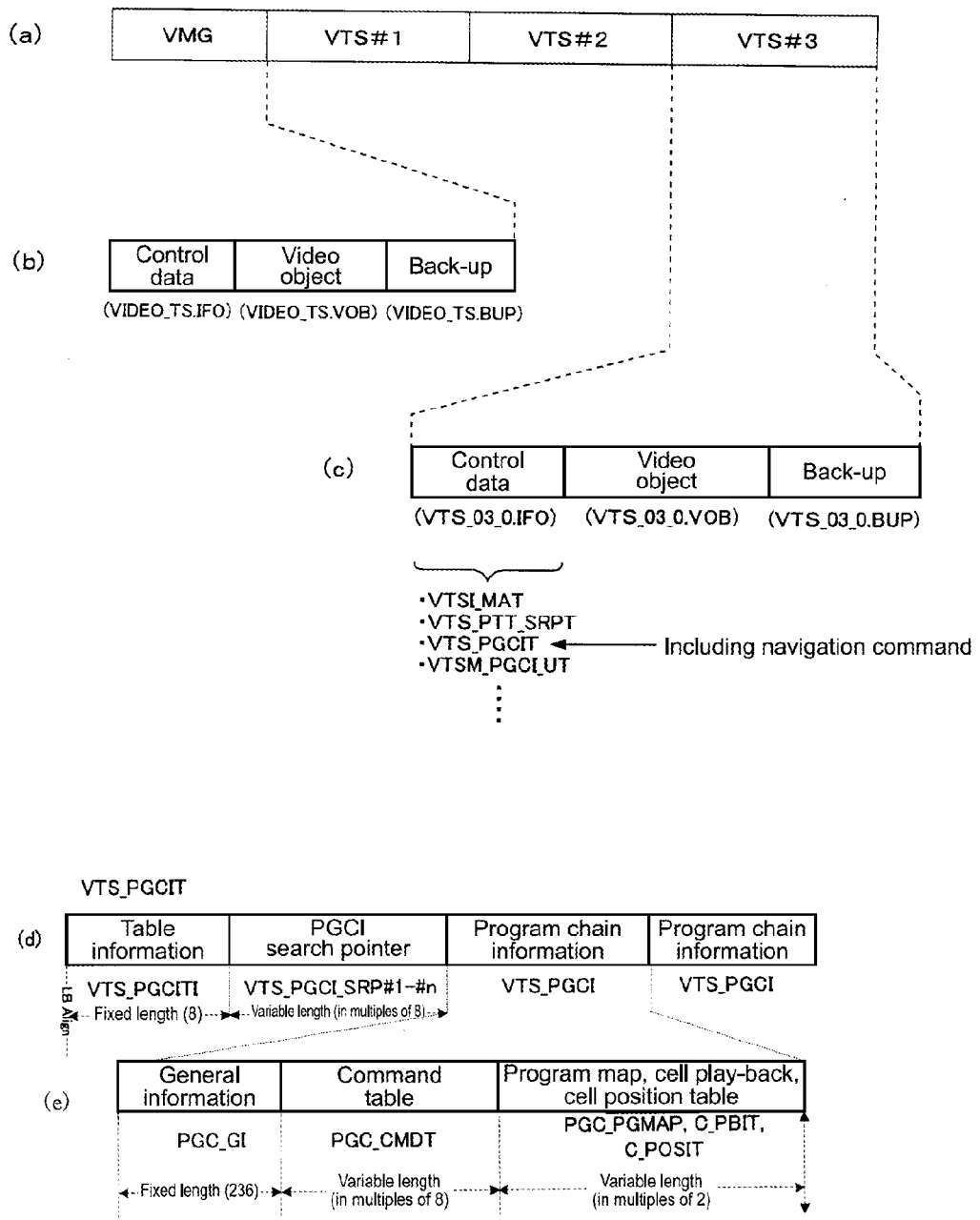
FIG. 27 Diagrams for explanation of a file example to be recorded on a DVD.

With reference to FIGS. 26 and 27, an example of a file structure to be recorded on the DVD as the read-only optical disc of this embodiment will be explained.

FIG. 26(*a*) shows the area structure shown in FIG. 2 in a radial direction. As described above with reference to FIG. 2, a lead-in area LI, a main data area MA, and a lead-out area LO are formed from the inner circumference side.

The main data area MA in which the real content and the like are recorded as user data starts from the sector number of "30000*h*."

In the disc of this example, the file constituting the real content is recorded in a range up to the sector number of "230000*h*" (the radial position of 55.837 mm).

Further, a PID area is formed between the radial position as this content limit and the starting position of the lead-out area LO. The starting position of the lead-out area LO is the sector number of "232100*h*" (the radial position of 55.999 mm).

The PID area mentioned herein is an area in which the file including the ECC block recording the additional supplementary information is recorded. This PID area has a sector number of "231000*h*" (the radial position 55.952 mm), as a starting position, for example.

It should be noted that in a predetermined position within the lead-out area LO, a trial writing area for additional recording in the PID area may be provided.

FIG. 27 show a file structure example as content recorded on the DVD.

In the main data area MA of the DVD, as shown in FIG. 27(*a*), VMG including a file group as management information and VTS (Video Title Set) including a file group constituting the real content are recorded.

In the case of this example, for example, VTS#1 and VTS#2 are set as file groups of the real content, and VTS#3 is set to be used for recording the PID.

The VMG as the management information includes, for example, files of "VIDEO_TS.IFO," "VIDEO_TS.VOB," and "VIDEO_TS.BUP" as control data, a video object, and a back-up as shown in FIG. 27(*b*).

In the control data file of "VIDEO_TS.IFO," management and reproduction control information for each VTS and the like are recorded.

In the video object file of "VIDEO_TS.VOB," the video object including a main menu display in reproduction and the like is recorded.

In the back-up file of "VIDEO_TS.BUP," the same content is recorded as the back-up for the control data file of "VIDEO_TS.IFO."

The VTS (video title set) includes the files as the control data, the video object, and the back-up as shown in FIG. 27(*c*).

In the control data file, the reproduction and management information for the video title set and the like are recorded.

The video object is a file constituting real content images and the like. In addition to the content images and the like, image files of a title menu and the like may be added.

In the back-up file, the same content is recorded as the back-up for the control data.

For convenience of explanation, it is assumed that the VTS#3 includes, as its files, the control data file of "VTS_03_0.IFO," the video object file of "VTS_03_0.VOB," and the back-up file of "VTS_03_0.BUP." Although not shown in the drawing, if two video object files exist, "VTS_03_1.VOB" or the like is also included.

Further, it is assumed that the VTS#1 includes, as its files, as shown in FIG. 26(*b*), the control data file of "VTS_01_0.IFO," the video object file of "VTS_01_0.VOB," and the back-up file of "VTS_01_0.BUP." Similarly, it is assumed that the VTS#2 includes the control data file of "VTS_02_0.IFO," the video object file of "VTS_02_0.VOB," and the back-up file of "VTS_02_0.BUP." Regarding both of the VTS#1 and VTS #2, a plurality of files of the video object may be provided, including the image files of the title menu and the like.

The control data in those VTSs includes, as illustrated in FIG. 27(*c*), information of "VTSI_MAT," "VTS_PTT_SRPT," "VTS_PGCIT," "VTSM_PGCI_UT" . . .

For example, "VTSI_MAT" is an information management table of the video title set, "VTS_PTT_SRPT" is a search pointer table of the video title set, and "VTS_PGCIT" is a program chain information table of the video title set.

Here, the above-mentioned navigation command is described in the program chain information.

FIG. 27(*d*) shows a structure of "VTS_PGCIT." "VTS_PGCIT" includes eight-byte fixed-length table information of "VTS_PGCITI," PGCI search pointer of "VTS_PGCI_SRP#1-#n," which has a length variable in multiples of eight bytes, and a desired number of program chain information of "VTS_PGCI."

The program chain information "VTS_PGCI" includes, as shown in FIG. 27(*e*), general information of "PGC_GI," command table of "PGC_CMDT," program map of "PGC_PGMAP," and cell playback of "C_PBIT," cell position table of "C_POSIT."

In the disc of this example, for example, assumed that as shown in FIG. 27(*a*), the VMG and the VTS#1 to VTS#3 are recorded and the VTS#3 is used for recording the PID, each file is physically recorded on the disc as shown in FIG. 26(*b*).

In the main data area MA, the respective files of the VMG, VTS#1, and VTS#2 are continuously recorded from the inner circumference side.

On the other side, the respective files constituting the VTS#3 are recorded in the PID area.

The VTS#3 is one that forms the additional recording area 10 in "VTS_03_0.IFO" being its control data so as to enable the PID to be additionally recorded in a navigation command format.

It is for the following reasons that the VTS#3 is used for additionally recording the PID and the like and allocated in the PID area.

First, one of the reasons for setting the video title set as the VTS#3, which is different from the VTS#1 and the VTS#2 as the real content, is a necessity for recording the above-mentioned PO compensation symbols.

Since the polarity control symbols for additionally recording the additional information are allocated with the embossed pit rows, the PO compensation symbols "X" have to be allocated in predetermined positions within the ECC block (see FIGS. 20 to 25). Accordingly, it is preferable that the space within the sector can be used freely to some extent. On the other hand, in the VTS#1 and the VTS#2 constituted of the files as the real content, it is difficult to allocate the PO compensation symbols "X" in predetermined positions corresponding to the setting of the additional recording area and the allocation of the polarity control symbols "54." That is because the content data can be damaged.

In view of those circumstances, the provision of the VTS#3 for additionally recording the PID other than the VTS#1 and the VTS#2 as the real content is considered proper.

As a matter of course, the number of VTSs to be recorded for each DVD title is indefinite. For example, when the VTS#1 to the VTS#4 are recorded as the real content, it is sufficient that VTS for additionally recording the PID is provided as VTS#5. Meanwhile when only the VTS#1 is recorded as the real content, it is sufficient that VTS for additionally recording the PID is provided as VTS#2.

It should be noted that although which VTS among a plurality of VTSs is used is arbitrary, the last VTS is desirably set as the VTS for additionally recording the PID.

Further, another reason why the VTS is used for additionally recording the PID is that the VTS is constituted of the files managed by the VMG. In other words, in the files that the generally-used DVD player can access, additional recording of the PID is performed.

For example, when additional recording of the PID is set to be performed in files that are not managed by the VMG, the generally-used DVD player cannot access it.

In order to access such files, a dedicated program allowing access to these files being unmanaged areas has to be implemented in the DVD player, which is not realistic.

Here, in reproduction operation when the disc is inserted into the normal DVD player, the normal DVD player reads information of the lead-in area LI, and then, reads the VMG so as to perform content reproduction operation such as display reproduction of a main menu. Further, the normal DVD player reproduces desired content (VTS#1 and the like) according to operation by the user.

In the VMG, the management information for reproducing each VTS and reproduction control information including a first play instruction (instruction about a file to be first accessed in reproduction) and the like are described.

Then, even if special control software is not implemented in the DVD player, the DVD player can access the VTS#3 constituted of the files under control of the VMG. For example, when the file of the VTS#3 is set to be specified as a file to be "first played" in the VMG, the DVD player can access the VTS#3 immediately after reading the VMG, to thereby read a navigation command described therein.

Although the navigation command will be described later, the DVD player can read the navigation command and execute its command content, to thereby read additionally recorded PID.

That is, in this embodiment, for the purpose of enabling the generally-used DVD player to read the additional supplementary information such as the PID, the VTS to be placed under control of the file system on the DVD is used for additionally recording the PID.

For the above-mentioned reasons, a certain VTS (e.g., the VTS#3) is used for additionally recording the PID. Then, the VTS#3 is recorded in the PID area.

One of the reasons for fixedly allocating the PID area, for example, in a radial position of 55.952 mm is due to a disc manufacturing matter.

The additional recording marks 6 are, as described above with respect to FIGS. 4 to 6, formed by eliminating or reducing the reflecting film 4 in the additional recording area 10 in which the embossed pit row is not formed. Then, forming the additional recording marks 6 having high quality largely depends on a film thickness of the reflecting film 4.

Here, the reflecting film is formed by the film forming device 130 in the molding and film-forming step shown in FIG. 1. If an area (the radial position) in which the additional recording area 10 is formed is fixedly predetermined, it becomes relatively easy to control the film thickness of the reflecting film 4 to be constant in the radial position. Although the film thickness of the reflecting film 4 is formed to be uniform over the entire surface of the disc, it is difficult to obtain perfect uniformity and thickness error occurs. It should be noted that the thickness only in a particular radial position can be controlled with relatively high accuracy.

In view of this, it is proper that the PID area is fixed in advance so that the accuracy of the film thickness of the reflecting film 4 is increased in the PID area during manufacturing the disk.

It should be noted that it is sufficient to fix the PID area for achieving such a thing, and the PID area does not necessarily need to be fixed in the position shown in FIG. 26.

On the other hand, when the PID area is fixed, its position also needs to be set not to be used for recording as the files (the VTS#1, the VTS#2, and the like) as the original content. In view of this, as shown in FIG. 26, it is proper to set a content limit and provide such a rule that the original content files are recorded in a region up to 55.837 mm in the radial direction, for example.

Another reason for fixing the PID area as in FIG. 26 and setting the VTS#3 additionally recording the PID to be recorded in a position physically spaced from the last real content (the VTS#2 in the case of FIG. 26) will be explained with reference to FIG. 28.

Figure 28:
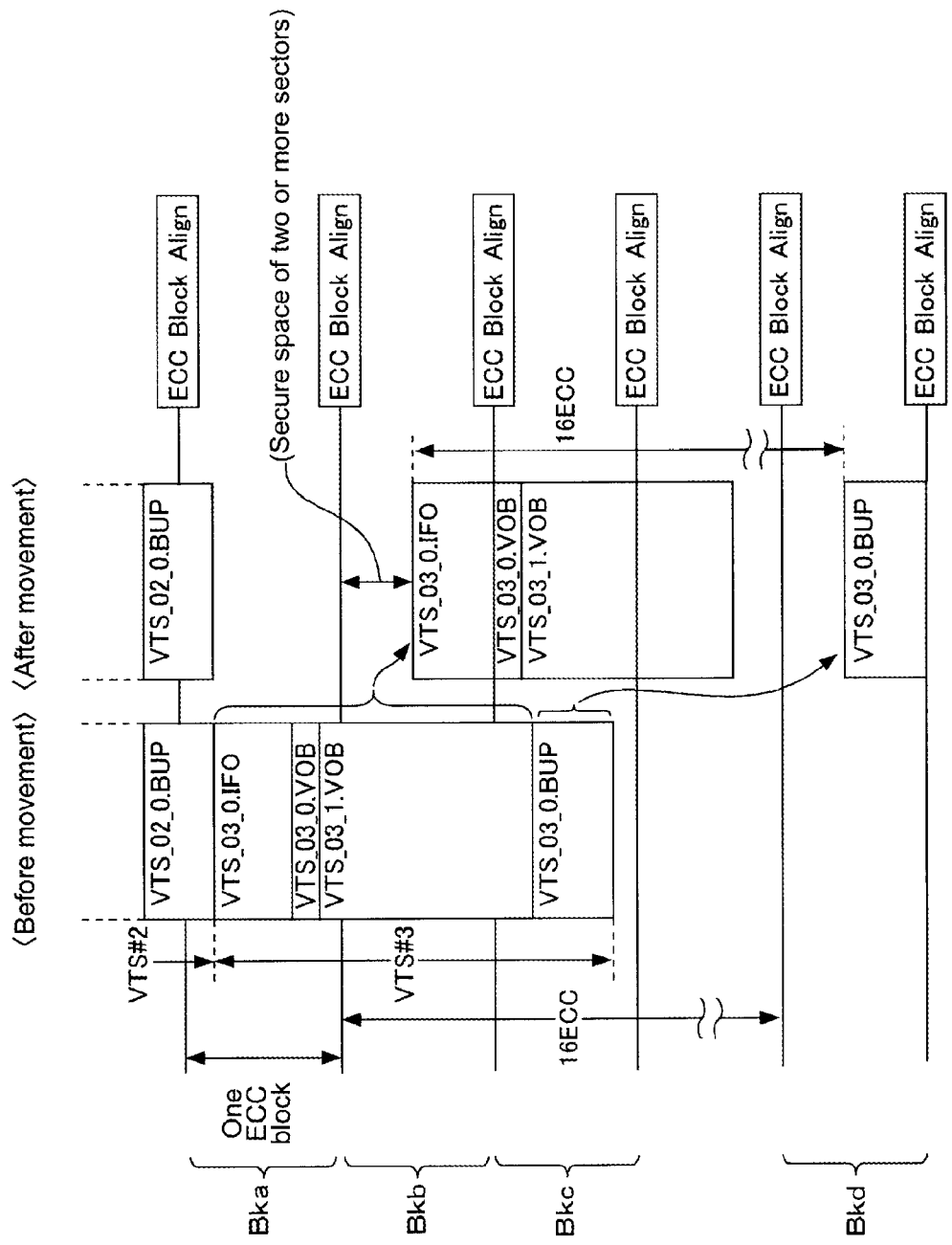
FIG. 28 A diagram for explanation of file allocation of an embodiment.

FIG. 28 schematically shows physical allocation for each ECC block.

Shown as <Before movement> is the case where files of "VTS_03_0.IFO," "VTS_03_0.VOB," "VTS_03_1.VOB," and "VTS_03_0.BUP," which constitute the VTS#3, are recorded in ECC blocks physically continuous from the last file of "VTS_02_0.BUP" of the VTS#2.

Typically, in the read-only optical disc, the files do not need to be dispersedly recorded, and the files are recorded physically continuously, considering also recording capacity.

Therefore, when manufacturing a DVD in which the VTS#1 to the VTS#3 are recorded, it is typical that the files of the VTS#3 are continuously recorded following the file of the VTS#2 as described above.

Further, although in the same ECC block, the control data file and the back-up file (e.g., "VTS_03_0.IFO" and "VTS_03_0.BUP"), which belong to the same VTS, has not to be allocated, files of different VTSs may exist within one ECC block. Therefore, as in the ECC block Bka in the drawing, within one ECC block, data of the ending part of "VTS_02_0.BUP," "VTS_03_0.VOB," and the head part of "VTS_03_1.VOB" can be included.

Here, in this embodiment, additional recording of the PID is performed within the control data file of "VTS_03_0.IFO" in the VTS#3.

As shown in FIG. 20, the PO compensation symbols "X" are allocated in the row direction from the head sector SC0 to the sector SC1 of the ECC block.

However, in this <Before movement>, the head sector of the ECC block Bka including the control data file of "VTS_03_0.IFO" is the back-up file of "VTS_02_0.BUP" of the VTS#2.

Accordingly, if the PO compensation symbols "X" are allocated from the sector SC0 to the sector SC1 of the ECC block BKa, it is not proper because the back-up file of "VTS_02_0.BUP" of the VTS#2 is damaged.

Thus, it is proper that the control data file of "VTS_03_0.IFO" that additionally records the PID is recorded in the ECC block physically spaced from the VTS#2. In addition, it is necessary to form, within its ECC block, the PO compensation symbols "X" so that the control data file itself of "VTS_03_0.IFO" is also not damaged.

For the above-mentioned reasons, as shown as <After movement>, the VTS#3 is allocated to be physically spaced from the VTS#2 so that the files constituting the VTS#3 constitute the ECC blocks different from the ECC block including the file of the VTS#2.

Figure 31:
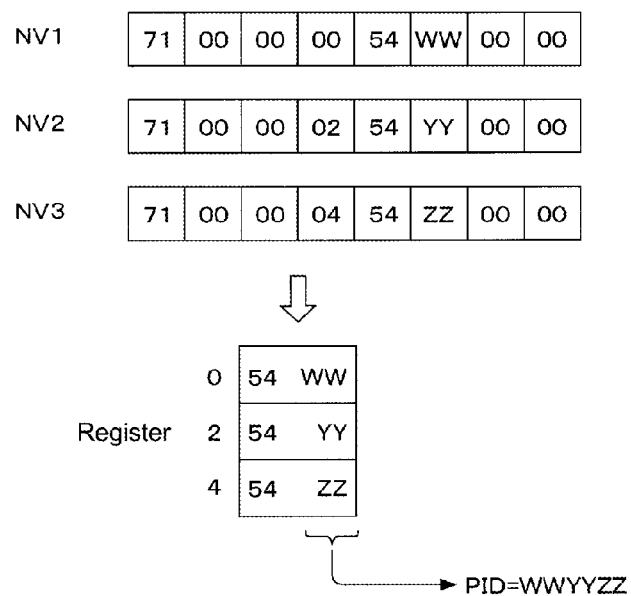
FIG. 31 A diagram for explanation of PID loading by the reproduction device with respect to a disc of an embodiment.

In <After movement> of FIG. 31, for example, following the ECC block BKb, the files of the VTS#3 of "VTS_03_0.IFO," "VTS_03_0.VOB," "VTS_03_1.VOB," and "VTS_03_0.BUP" are set to be allocated.

First, the control data file of "VTS_03_0.IFO" is set to be included in the ECC block BKb. At this time, space of two or more sectors is secured at the head of the ECC block BKb. Those two sectors are secured as sectors in which the PO compensation symbols "X" are allocated as shown in FIG. 20.

When as described above, "VTS_03_0.IFO" is moved to a certain ECC block BKb and allocated while space of two or more sectors are secured, the data of the preceding VTS#2 and "VTS_03_0.IFO" itself can be prevented from being damaged due to the PO compensation symbols "X."

It is sufficient that the video object files of "VTS_03_0.VOB" and "VTS_03_1.VOB," which follow the control data file of "VTS_03_0.IFO," for example, are continuously allocated as in the ECC block BKc and the following.

It should be noted that the back-up file of "VTS_03_0.BUP" is allocated in the further spaced ECC block BKd, for example.

The back-up file is required to have data content completely identical to that of the control data file.

Therefore, when the PID is additionally recorded in the control data file of "VTS_03_0.IFO," additional recording of the PID of the same value is performed in the back-up file of "VTS_03_0.BUP." Further, in the ECC block including the back-up file of "VTS_03_0.BUP," the polarity control symbol "54" is recorded.

Here, in the scramble system of the DVD, one rotation is constituted of 16 ECC blocks. This means that if the back-up file is allocated away from the control data file by 16 ECC, the value of the polarity control symbol "54" before scrambling is kept even after scrambling.

In other words, without spacing by 16 ECC blocks, the value of the polarity control symbol "54" before scrambling becomes different between the control data file of "VTS_03_0.IFO" and the back-up file of "VTS_03_0.BUP," which does not satisfy the back-up file rule.

In view of this, as shown in the drawing, the back-up file of "VTS_03_0.BUP" is allocated to be spaced from the control data file of "VTS_03_0.IFO" by 16 ECC blocks.

It should be noted that although for the sake of illustration, continuous ECC blocks Bka and BKb are shown, they do not need to be physically continuous in <After movement>.

The above-mentioned circumstances are one of the reasons for allocating the VTS#3 in the position physically spaced from the VTS#2, that is, one of the reasons for recording the VTS#3 in the PID area as in FIG. 26. Therefore, the ECC blocks BKb to BKd in <After movement> in FIG. 28 can be considered as certain ECC blocks in the PID area of FIG. 26.

Using the VTS#3 for additionally recording the PID and the like and allocating the VTS#3 in the PID area is for the above-mentioned reasons.

Figure 29:
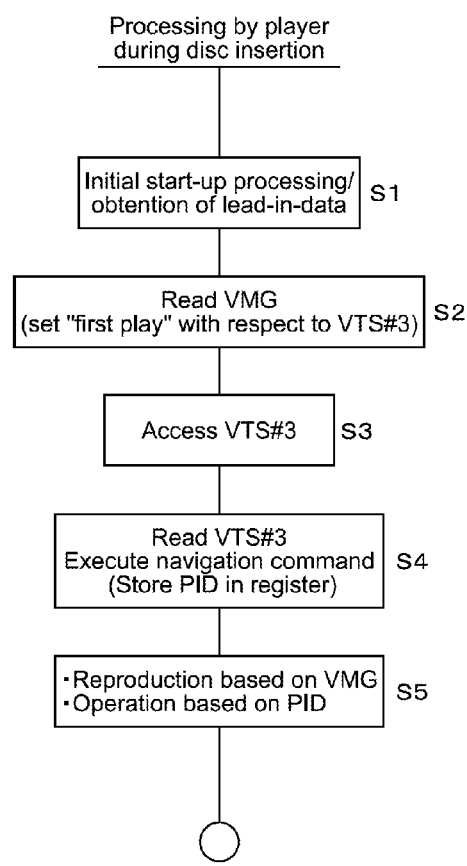
FIG. 29 A flowchart of processing of a reproduction device that reproduces a disc of an embodiment.

By the navigation command in the VTS#3 recorded in the PID area, the generally-used DVD player can read the additional supplementary information such as the PID, and in this case, processing by the DVD player is as shown in FIG. 29.

In the DVD player into which the read-only optical disc (DVD) of this embodiment is inserted, initial start-up processing is first performed as Step S1 of FIG. 29. Specifically, spindle motor driving, focus search/focus servo pull-in, tracking servo ON, and the like are performed, to thereby place the DVD player in a state in which the DVD player can read information from the disc. Thus, when the initial start-up processing is completed, information in the lead-in area LI is first read.

Subsequently, in Step S2, VMG reading is performed. As mentioned above, if the VTS#3 is specified to be first played in the VMG, as Step S3, the DVD player accesses the VTS#3 recorded in the PID area.

In Step S4, the DVD player reads the VTS#3. In the control data file of "VTS_03_0.IFO" of this VTS#3, a navigation command including the PID additionally recorded has been recorded as will be described later.

When the navigation command is read, the DVD player performs operation of loading the PID into the inside register.

After that, as Step S5, the DVD player performs reproduction operation according to the reproduction management of the VMG, and various processing using the read PID is also enabled.

A specific example in which the PID is additionally recorded in the navigation command format in order to realize such operation will be described in the following.

Figure 30:
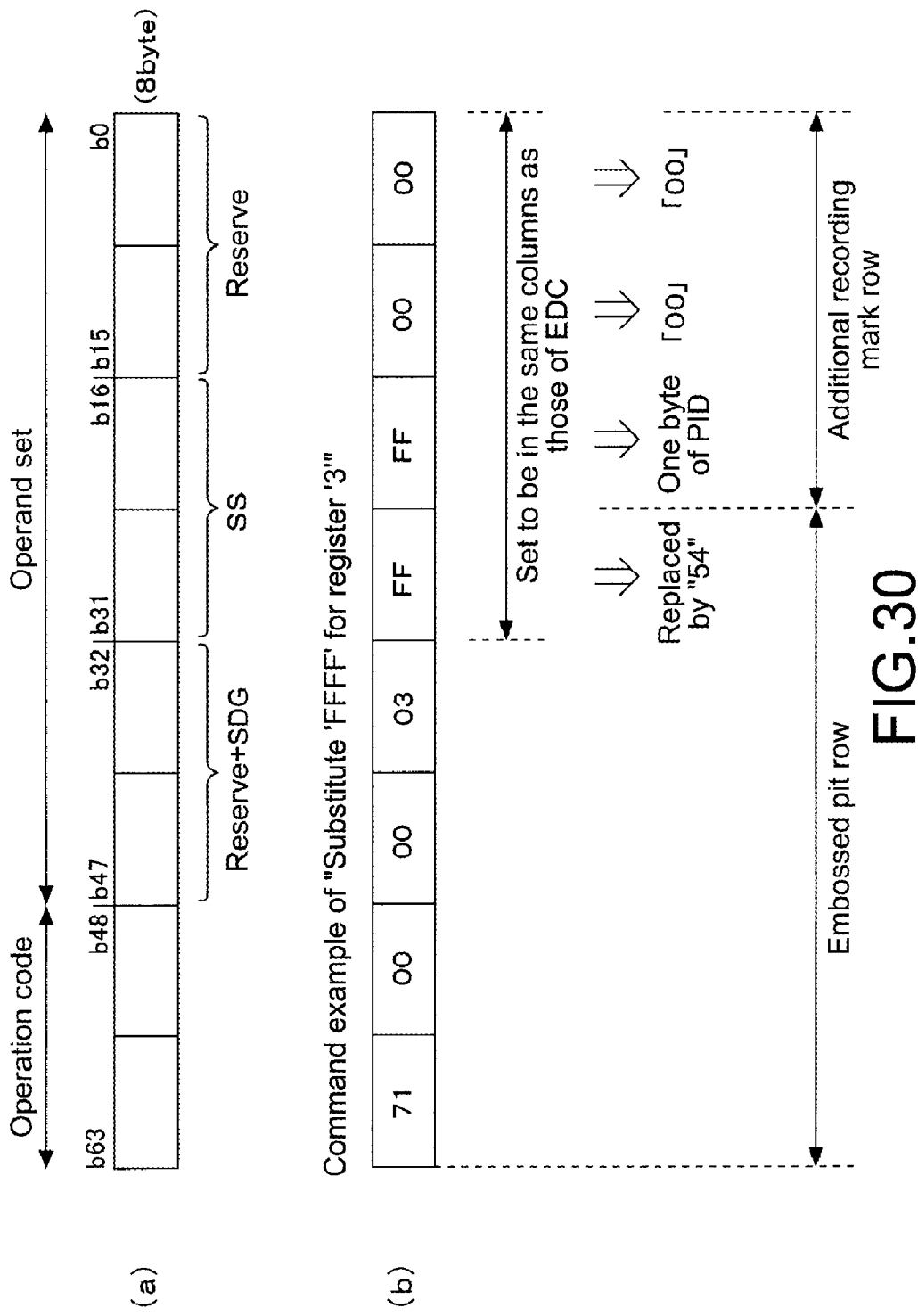
FIG. 30 Diagrams for explanation of a navigation command of a DVD used in an embodiment.

FIG. 30(*a*) shows a structure of a navigation command. The navigation command is set to have a fixed length of eight bytes (bits b0 to B63), and is constituted of an operation code of 2 bytes and an operand set of 6 bytes.

It should be noted that although in the DVD format, the structure of the navigation command is variously defined, here, only a navigation command (set command) for loading the PID into the register of the DVD player is described.

In this case, in the operand set, 2 bytes of from b0 to b15 are reserved.

Two bytes of from b16 to b31 are set to SS indicating a substitution value.

Two bytes of from b32 to b47 are set to SDG indicating a register number and to a reserve bit.

In the case where the navigation command of eight bytes is "71 00 00 03 FF FF 00 00" as shown in FIG. 30(b), it has the following meanings.

When the operation code of 2 bytes is "71 00," it means a substitution instruction.

When the SDG is "03," it means "register number 3."

"FF FF" of the SS is a substitution value.

Therefore, this navigation command in FIG. 30(b) is a code having a meaning of "substitute 'FF FF' for the register number '3'."

By utilizing such a navigation command, one byte constituting the PID can be loaded into a predetermined register of the DVD player.

For example, in "71 00 00 03 FF FF 00 00," the lower four-byte part is set to be in the same columns as those of the EDC in the ECC block.

Then, the lower 3-byte part of "FF 00 00" is recorded with the additional recording marks 6. At this time, "FF" part is converted into a certain value of one byte actually constituting the PID and additionally recorded.

The upper 5 bytes of "71 00 00 03 FF" of the navigation command are recorded with the embossed pit row. It should be noted that since the last "FF" is a symbol immediately preceding the additional recording area 10, it is replaced by the polarity control symbol "54" and mastering (pit column formation) is performed.

It should be noted that the value of the polarity control symbol "54" replaced by "FF" in a recording signal as master data before mastering and set is a value to be "54" after scrambling. That is, on the optical disc master 192, "54" pattern is obtained.

Incidentally, in both of scrambling and releasing scrambling, a certain value is EX-OR operated by the same calculation.

Figure 32:
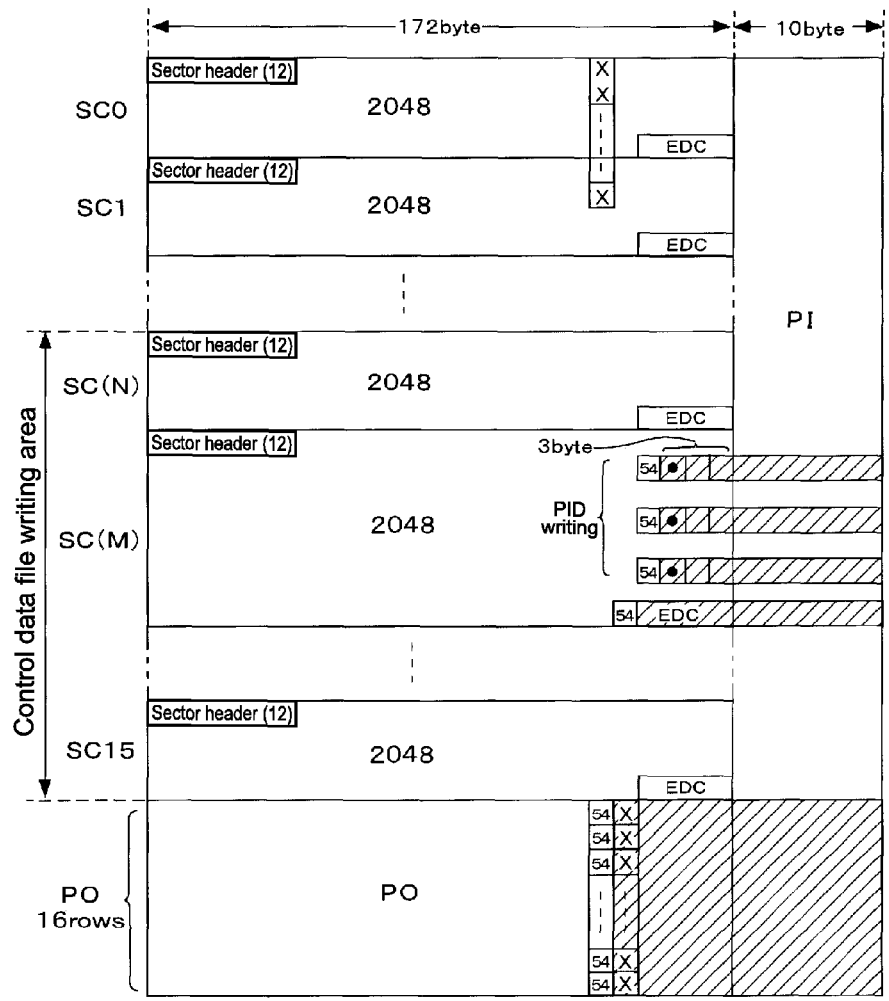
FIG. 32 A diagram for explanation of a PID writing disc of an embodiment.

Specifically, recording as in FIG. 32 is performed.

It is assumed that FIG. 32 complies with an example in which the PO compensation symbols "X" are allocated in the format shown in FIG. 20.

It is assumed that this ECC block is, for example, a block corresponding to the ECC block BKb in <After movement> of FIG. 31, and the control data file of "VTS_03_0.IFO" is, for example, recorded in the sectors SC(N) to SC15.

Further, it is assumed that additional recording of the PID is performed in the sector SC(M).

The shaded parts are parts in which the additional information such as the PID, EDC, PI parity, PO parity, and the like is recorded.

The bytes constituting the PID additionally recorded in the sector SC(M) are denoted by "●." This is one example in the case where the PID constituted of 3 bytes is additionally recorded in the navigation command format. It should be noted that for the sake of illustration, only the sector SC(M) is shown in enlarged state compared to other sectors.

In each row in the sector SC(M), in which additional recording is performed, 13 bytes of 3 bytes in the same columns as those of the EDC and 10 bytes of the PI parity are additionally recorded.

That is, the lower four-byte part of "FF FF 00 00" of the navigation command is set to be in the same columns as those of the EDC as shown in FIG. 30(b), and this is recorded as "54 ● 00 00," which is as shown in FIG. 32. Regarding the four bytes in the same columns as those of the EDC, its head is formed with the embossed pit row as the polarity control symbol "54" and the PID constituting value is additionally recorded in the following byte as "●." Since the following two bytes are reserve bits on the navigation command and replacement of the values is not proper considering a use in future, "00 00" is additionally recorded as it is.

Further, the upper four bytes in the navigation command, for example, "71 00 00 03" in FIG. 30(b) are formed in four bytes before "54" with the embossed pit row.

In this manner, within the sector SC(M), the PID of one byte per one row can be recorded in the navigation command format. Therefore, as shown in the drawing, if three rows are used, the PID of 3 bytes can be additionally recorded.

In order to write the PID of 3 bytes, for example, it is sufficient that three navigation commands NV1, NV2, and NV3 as in FIG. 31 are recorded in respective rows in FIG. 32.

The navigation command NV1 is set to "71 00 00 00 54 WW 00 00."

The navigation command NV2 is set to "71 00 00 02 54 YY 00 00."

The navigation command NV3 is set to "71 00 00 04 54 ZZ 00 00."

It should be noted that WW, YY, and ZZ are set to respective values of the PID of 3 bytes.

For example, assumed that such navigation commands NV1, NV2, and NV3 are recorded in three rows of the sector SC(M) of FIG. 32, the DVD player reads those navigation commands, to thereby load the values into the registers as shown in FIG. 31.

Since the navigation command NV1 is a command for instructing to set "54 WW" in the register number "0," "54 WW" is loaded into the register 0 of the DVD player. (It should be noted that "54" is a value descrambled in this stage, as the case may be.)

Since the navigation command NV2 is a command for instructing to set "54 YY" in the register number "2," "54 YY" is loaded into the register 2 of the DVD player.

Since the navigation command NV3 is a command for instructing to set "54 ZZ" in the register number "4," "54 ZZ" is loaded into the register 4 of the DVD player.

In this case, on the DVD player side, by taking the lower byte from each register, 3-byte PID="WW YY ZZ" can be recognized.

As described above, for example, recording on the disk can be performed including the PID value in the navigation command in the format shown in FIG. 32.

Then, the DVD player, which has accessed the control data file, can load the PID value with the result that processing using the PID can be realized.

[7. Processing at Disc Manufacturing Stage Regarding Additional Recording]

For example, processing in the stage of manufacturing the optical disc of this example in which the PID is set to be recorded in the navigation command format within a control data file recorded in a certain ECC block as in FIG. 32 will be described.

As described above with reference to FIG. 27, in the control data file (e.g., "VTS_03_0.IFO" of the VTS#3) of the VTS, various information including "VTSI_MAT," "VTS_PTT_SRPT," "VTS_PGCIT," "VTSM_PGCI_UT" . . . is described. Such information is allocated in logical block align. Then, the navigation command is recorded to "VTS_PGCI" within "VTS_PGCIT" being the program chain information table. Here, as shown in FIG. 27(d), the number of "VTS_PGCI_SRP" positioned immediately before "VTS_PGCI" depends on the number of "VTS_PGCI" included in the VTS. Further, existence or absence and the number of "PGC_PGMAP," "C_PBIT," and "C_POSIT" shown in FIG. 27(e) in each "VTS_PGCI" depends on how to create a title.

This means that the starting position of "VTS_PGCI" including the command group of "PGC_CMDT" of eight bytes constituting the navigation command is unfixed for each DVD title.

Here, as in FIG. 32, when the control data file of "VTS_03_0.IFO" is set to be recorded in a certain sector range (e.g., the sectors SC(N) to SC15) in a certain ECC block, the position of the navigation command within the file, which additionally records the PID, is important.

That is, one byte into which the PID value is inserted in the navigation command (the position of "FF" of the 3rd byte from the bottom in FIG. 30(b)) has to be at least in the same column as that of the EDC.

In order to do so, a device is needed from the authoring stage.

The navigation command is constituted of eight bytes, and 1 row of the ECC block is constituted of 172 bytes except the PI parity.

Assumed that the navigation command of eight bytes is repeatedly described within the ECC block, patterns of the navigation command allocated in the last eight bytes of 1 row, that is, the 165th byte to the 172nd byte are the following eight patterns PT1 to PT8.

For example, assumed that the navigation command is "71 00 00 01 FF FF 00 00,"

Pattern PT1: "71 00 00 01 FF FF 00 00"
Pattern PT2: "00 71 00 00 01 FF FF 00"
Pattern PT3: "00 00 71 00 00 01 FF FF"
Pattern PT4: "FF 00 00 71 00 00 01 FF"
Pattern PT5: "FF FF 00 00 71 00 00 01"
Pattern PT6: "01 FF FF 00 00 71 00 00"
Pattern PT7: "00 01 FF FF 00 00 71 00" and
Pattern PT8: "00 00 01 FF FF 00 00 71" are obtained.

It should be noted that due to the standard, the structure of data constituting "VTS_PGCIT" is all defined by multiples of 2 (when the number of elements is odd in 1-byte data as in "PGC_PGMAP", padding is perform to make it even), and the navigation command never takes patterns PT2 (PT6) and PT8 (PT4). However, here, for showing flexibility of this system, all patterns are verified.

Four bytes of from the 169th byte to the 172nd byte are to be in the same columns as those of the EDC. In the case of pattern PT1, they correspond to the part of "FF FF 00 00."

As described above, when the part of "FF FF" is set to "54" with the embossed pit row and to the PID value with the additional recording marks, "FF" of the 3rd byte from the bottom has to be at least in the same column as that of the EDC.

Then, four patterns PT1, PT2, PT3, and PT8 meet such a condition.

As described above, the starting position of "VTS_PGCI" including the navigation command is unfixed. Thus, which byte in a certain row of the ECC block the navigation command of "PGC_CMDT" is described from is indefinite. However, since 1 row is constituted of 172 bytes, the position in which additional recording can be performed appears for every 172 bytes, and the navigation command is constituted of eight bytes, 172/8=21.5 is established. Thus, when forty-three navigation commands are described, the EDC column part takes any one of the above-mentioned patterns PT1, PT2, PT3, and PT8 in every second row.

Figure 33:
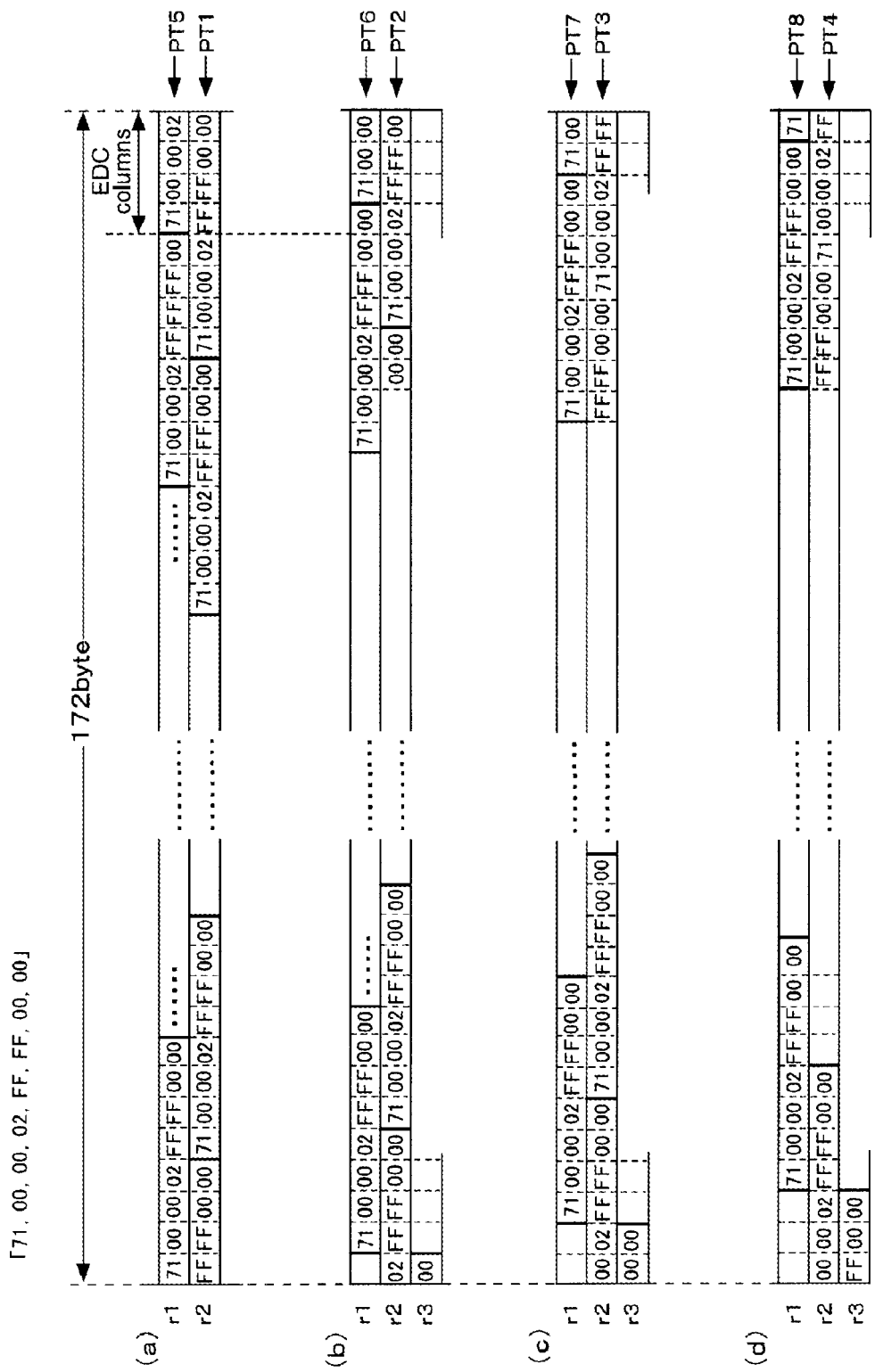
FIG. 33 Diagrams for explanation of navigation command patterns in a disc manufacturing stage of an embodiment.

This will be described with reference to FIG. 33.

FIG. 33(a) shows the case where in a certain row r1 within the ECC block, forty-three navigation commands are continuously described from the 1st byte. Since in one row of 172 bytes, 21.5 navigation commands are described, forty-three navigation commands are allocated in two rows of the rows r1 and r2.

Here, referring to the last 8-byte part including four bytes in the same columns as those of the EDC in each row, the row r1 takes the pattern PT5, and the row r2 takes the pattern PT1.

Then, in this case, the last 8-byte part of the row r2 in the pattern PT1 can be used for additionally recording the PID.

It should be noted that although not shown, also in the case where the navigation commands are continuously described from the 9th byte, the 17th byte, the 25th byte . . . in the row r1, the last eight bytes in the row r2 take the pattern PT1.

FIG. 33(b) shows the case where forty-three navigation commands are continuously described from the 2nd byte in a certain row r1 within the ECC block. Forty-three navigation commands are allocated in the rows r1, r2, and r3.

Here, referring to the last 8-byte part including four bytes in the same columns as those of the EDC, the row r1 takes the pattern PT6, and the row r2 takes the pattern PT2.

Then, in this case, the last 8-byte part of the row r2 in the pattern PT2 can be used for additionally recording the PID.

It should be noted that the same is applied also in the case where the navigation commands are continuously described from the 10th byte, the 18th byte, the 26th byte . . . in the row r1.

FIG. 33(c) shows the case where in a certain row r1 within the ECC block, forty-three navigation commands are continuously described from the 3rd byte. Forty-three navigation commands are allocated in the rows r1, r2, and r3.

Here, referring to the last 8-byte part including four bytes in the same columns as those of the EDC, the row r1 takes the pattern PT7, and the row r2 takes the pattern PT3.

Then, in this case, the last 8-byte part of the row r2 in the pattern PT3 can be used for additionally recording the PID.

It should be noted that the same is applied also in the case where the navigation commands are continuously described from the 11th byte, the 19th bytes, the 27th byte . . . in the row r1.

FIG. 33(d) shows the case where in a certain row r1 within the ECC block, forty-three navigation commands are continuously described from the 4th byte. Forty-three navigation commands are allocated in the rows r1, r2, and r3.

Here, referring to the last 8-byte part including four bytes in the same columns as those of the EDC, the row r1 takes the pattern PT8, and the row r2 takes the pattern PT4.

Then, in this case, the last 8-byte part of the row r1 in the pattern PT8 can be used for additionally recording the PID.

It should be noted that the same is applied also in the case where the navigation commands are continuously described from the 12th byte, the 20th byte, the 28th byte . . . in the row r1.

For example, as described above, even when the navigation commands are described from any byte position in a certain row, as long as forty-three navigation commands are continuously described, the last eight bytes in that row take any one of the patterns PT1, PT2, PT3, and PT8 in every second row.

It should be noted that the above-mentioned FIG. 32 shows an example in the case where additional recording of the PID is performed in a row that will take the pattern PT1. That is, it is an example in the case where "FF FF" of "71 00 00 01 FF FF 00 00" in the pattern PT1 is set to "54" and "● (the PID value)" and "● (the PID value) 00 00" is additionally recorded in 3 bytes in the same columns as those of the EDC.

From the above, when the PID of 3 bytes are additionally recorded, it is sufficient that in the authoring stage, three kinds of forty-three navigation commands are set to be continuously described in the control data file of "VTS_03_0.IFO."

Then, in the mastering stage, the same column as that of the EDC in a particular row is set as the additional recording area 10, and the PID value can be additionally recorded in the additional recording step.

This will be explained with reference a specific example. In the authoring stage, three kinds of navigation commands nv1, nv2, and nv3 described in the control data file of "VTS_03_0.IFO" are set as follows.

nv1: "71 00 00 00 FF FF 00 00" . . . ("FF FF" is substituted into the register 0)

nv2: "71 00 00 02 FF FF 00 00" ("FF FF" is substituted into the register 2)

nv3: "71 00 00 04 FF FF 00 00" ("FF FF" is substituted into the register 4)

Figure 34:
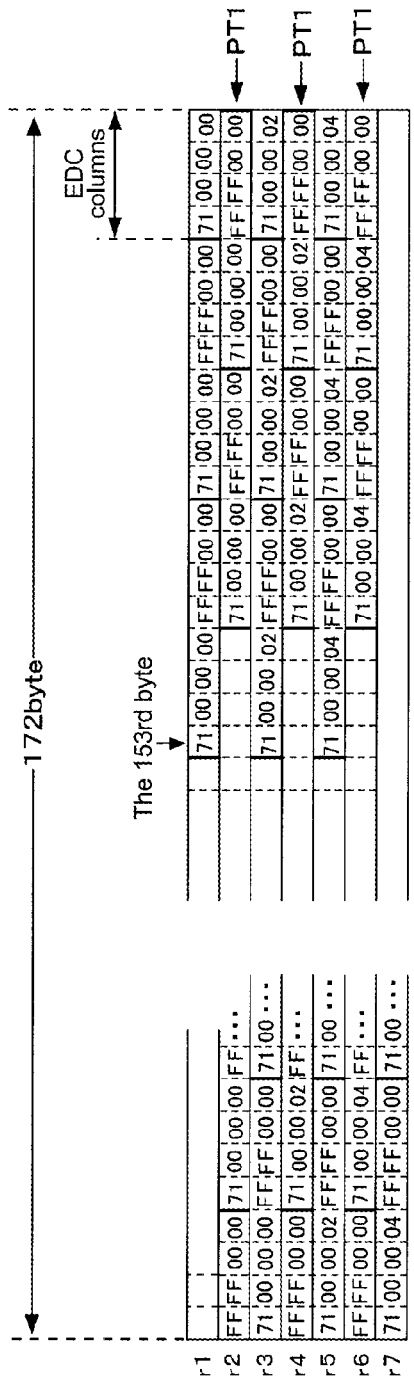
FIG. 34 A diagram for explanation of a navigation command insertion example in an authoring stage of an embodiment.

Then, in a certain ECC block, as in FIG. 34, the navigation commands are set to be described from a middle point of the row r1 (e.g., the 153rd byte).

First, forty-three navigation commands nv1 are continuously allocated. Subsequently, forty-three navigation commands nv2 are continuously allocated. Still subsequently, forty-three navigation commands nv3 are continuously allocated.

This state is as shown in FIG. 34. In this case, the last eight bytes of the row r2 take the pattern PT1 with respect to the navigation command nv1.

Further, the last eight bytes of the row r4 take the pattern PT1 with respect to the navigation command nv2.

In addition, the last eight bytes of the row r6 take the pattern PT1 with respect to the navigation command nv3.

In the authoring stage, for example, master data is created under such a state. The master data is supplied to the mastering step of FIG. 1 for manufacturing the disc.

Here, in order to form the additional recording area 10, a part of the master data is made rewritable.

Figure 35:
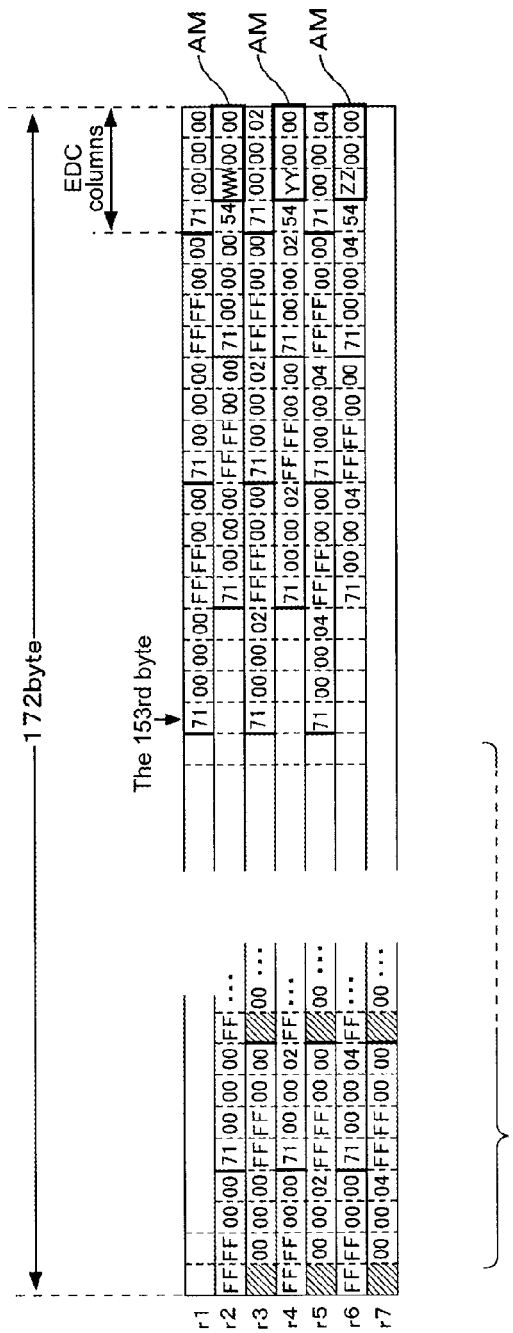
FIG. 35 A diagram for explanation of a navigation command rewriting example in the authoring stage of the embodiment.

In FIG. 35, the AM parts in the rows r2, r4, and r6 are parts as the additional recording areas 10 including the PI parity parts immediately following them. Therefore, the AM parts in FIG. 35 are all converted into unmodulated signal values to be lands.

For example, "FF 00 00" at the time of FIG. 34 is converted into "00 00 00."

Further, "FF" immediately precedes the AM part at the time of FIG. 34, and "FF" is converted into the polarity control symbol of "54." It should be noted that as described above, on the master data, it is converted into the value to be "54" after scrambling.

In addition, in the authoring stage, processing is performed regarding the fact that groups of forty-three navigation commands are continuously allocated.

For example, in FIG. 35, it is assumed that the navigation commands in the AM parts are desired to be read by the DVD player. However, in the master data stage after authoring, the same navigation commands are repeated following such navigation commands. For example, from the 153rd byte of the row r1 in FIG. 34 to the 152nd byte of the row r3, the navigation commands nv1 are allocated. Thus, even if the last navigation command nv1 part in the row r2 is used for reading the PID value into the register "0," due to the navigation command nv1 following the row r3, instruction of substituting "FF FF" for the register "0" is adversely generated again. As a result, the loaded PID value is overwritten in the register.

In view of this, as shown as shaded parts in FIG. 35, rewriting of the following navigation command is performed. For example, although the shaded parts are parts in which "71" is described as the operation code of the navigation command, this is rewritten with a value of an NOP instruction (invalid instruction: command of "do nothing"). Alternatively, a jump instruction may be set. For example, operation by the navigation command nv1 in a row r3 is rewritten with the jump instruction to the recording start position of a navigation command nv2 (e.g., the 153rd byte in the row r3).

As described above, by invalidating continuously allocated navigation commands each following the AM part, the PID value can be placed in a state of being saved in the register after the DVD player reads the navigation commands including the AM parts.

As described above, the processing of making the AM part land, replacing by the polarity control symbol "54" (the value to be "54" after scrambling), and changing the instruction of the following navigation command is performed on the master data before the mastering step described above with reference to FIG. 1 is performed.

Then, through the molding and film-forming step and the bonding step, the disc in which the additional recording areas 10 have been formed is manufactured as described above.

In this stage, the shaded parts in FIG. 32 are the additional recording areas 10.

In the additional recording step, the additional recording marks 6 are recorded in the shaded parts in FIG. 32. That is, for example, in the 170th to 172nd bytes of three rows in the sector SC(M) in FIG. 32, "WW 00 00," "YY 00 00," and "ZZ 00 00" are written. As a matter of course, as this time, the PI parity, the EDC of the sector SC(M), and the PO parity of each of those rows are also additionally recorded.

At this point in time, as shown in FIG. 35, in the AM parts, "WW 00 00," "YY 00 00," and "ZZ 00 00" are written, respectively.

That is, in the data within the ECC block, what is described as the navigation commands nv1, nv2, and nv3 in the authoring stage is as the following navigation commands NV1, NV2, and MV3.

NV1: "71 00 00 00 54 WW 00 00" . . . ("54 WW" is substituted into the register 0)

NV2: "71 00 00 02 54 YY 00 00" . . . ("54 YY" is substituted into the register 2)

NV3: "71 00 00 04 54 ZZ 00 00" . . . ("54 ZZ" is substituted into the register 4)

Therefore, in the DVD player that reproduces the disc (DVD) on which additional recording has been performed in the above-mentioned manner, the operation described above with reference to FIG. 31 is realized with the result that the PID value can be loaded therein.

Figure 36:
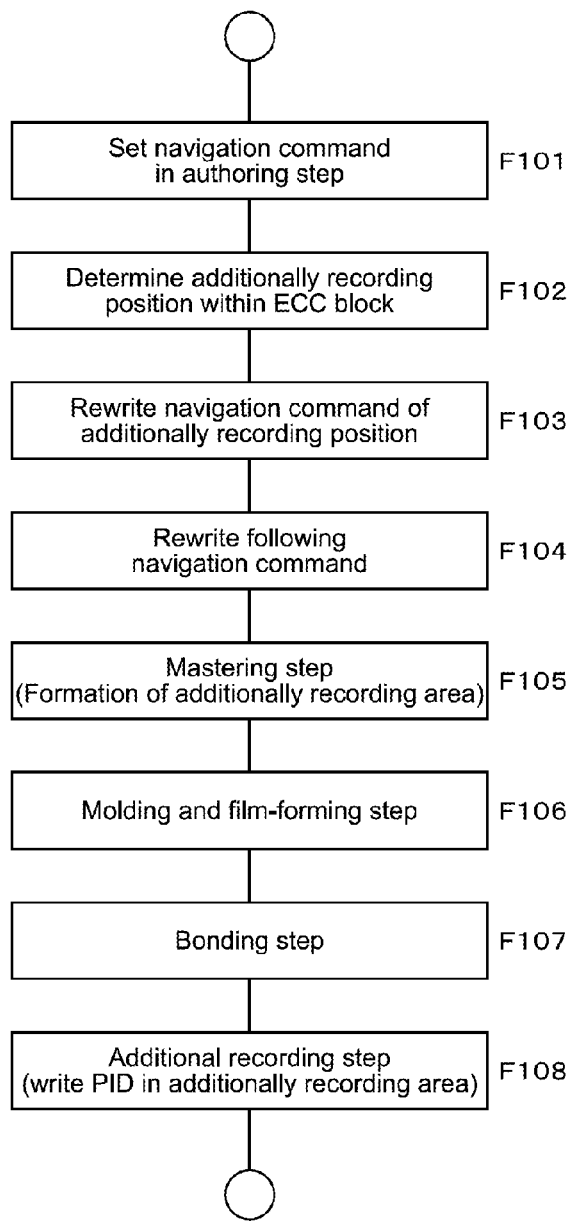
FIG. 36 A flowchart of a manufacturing process regarding additional recording of a disc of an embodiment.

The above-mentioned processing for writing the PID by the navigation commands during disc manufacturing can be summarized as in FIG. 36.

As Step F101, in the authoring stage, the navigation commands nv1, nv2, and nv3 are set so that each of the navigation commands is allocated continuously 43 times, and the control data file of "VTS_03_0.IFO" is created. That is, as the file data for the VTS#3, the master data including such a control data file is created.

As Step F102, in the stage immediately before the mastering step, the additional recording positions within the ECC block are determined. Specifically, a part in which the navigation command takes any one of the above-mentioned patterns PT1, PT2, PT3, and PT8 is set as the PID additional recording position. This is processing of determining the AM parts in FIG. 35.

In Step F103, rewriting of the values of the navigation commands in the additional recording positions (the AM parts) is performed. That is, the AM parts are all set to be unmodulated signal values corresponding to the lands. Further, the bytes immediately preceding them are replaced by the values to be the polarity control symbols "54."

In Step F104, the instruction content of the following navigation commands (following the AM parts) of 43 continuously allocated navigation commands is rewritten. For example, it is rewritten with the NOP instruction or the jump instruction.

For example, the additional recording management unit 160 in FIG. 1 performs the above-mentioned data replacement with respect to the master data provided by the master disc 191.

After that, in Step F105, the mastering step is performed.

Further, the molding and film-forming step is performed in Step F106, and the bonding step is performed in Step F107.

Finally, in Step F108, as the additional recording step, additional recording of the PID value and the additional recording of the PI parity, EDC, and PO parity of the necessary parts are performed.

In the above-mentioned procedure, the read-only optical disc (DVD) of this embodiment is manufactured.

It should be noted that although in FIGS. 32, 34, and 35, taking the case where the navigation command takes the above-mentioned pattern PT1 in the last of a certain row as an example, the description has been made, an example in the case where the navigation commands take the patterns PT2, PT3, and PT8 will be described in the following.

Figure 37:
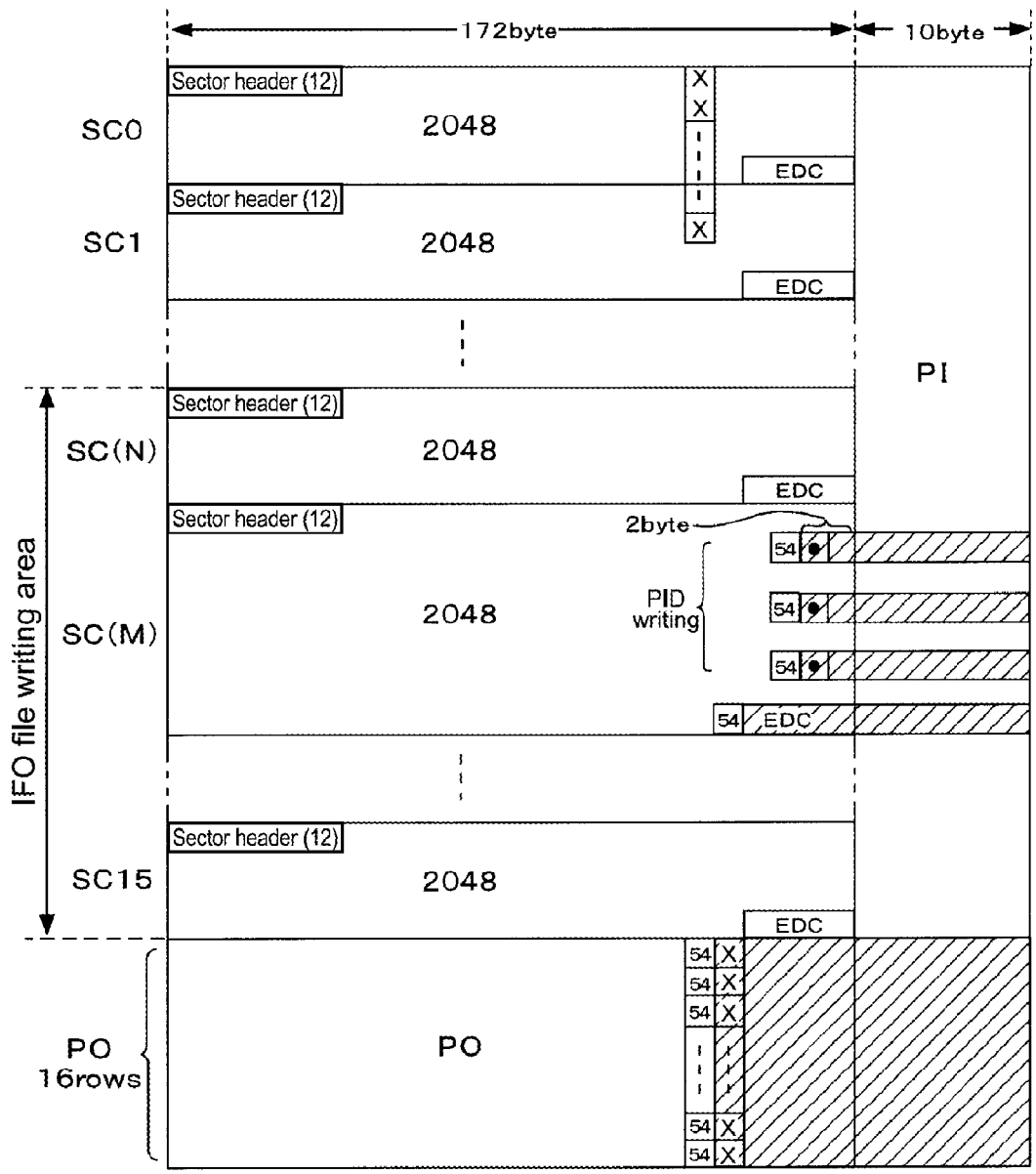
FIG. 37 A diagram for explanation of a PID writing disc of an embodiment.

The case where the last eight bytes of a certain row take the pattern PT2 "00 71 00 00 01 FF FF 00" and additional recording of the PID is performed in that part is shown in FIG. 37.

That is, since "FF FF 00" become the 170th to 172nd bytes, "FF" positioned in the 170th byte is set to be the polarity control symbol "54." Then, "FF 00" positioned in the 171st and 172nd bytes are converted into unmodulated signals so as to form the additional recording area 10.

Therefore, as the additional-recording-mark recording part in a predetermined row of the sector SC(M), 2 bytes+PI parity 10 bytes=12 bytes can be obtained. In the additional recording parts of 2 bytes, for example, the PID values "WW" and "00" or the like are additionally recorded.

Figure 38:
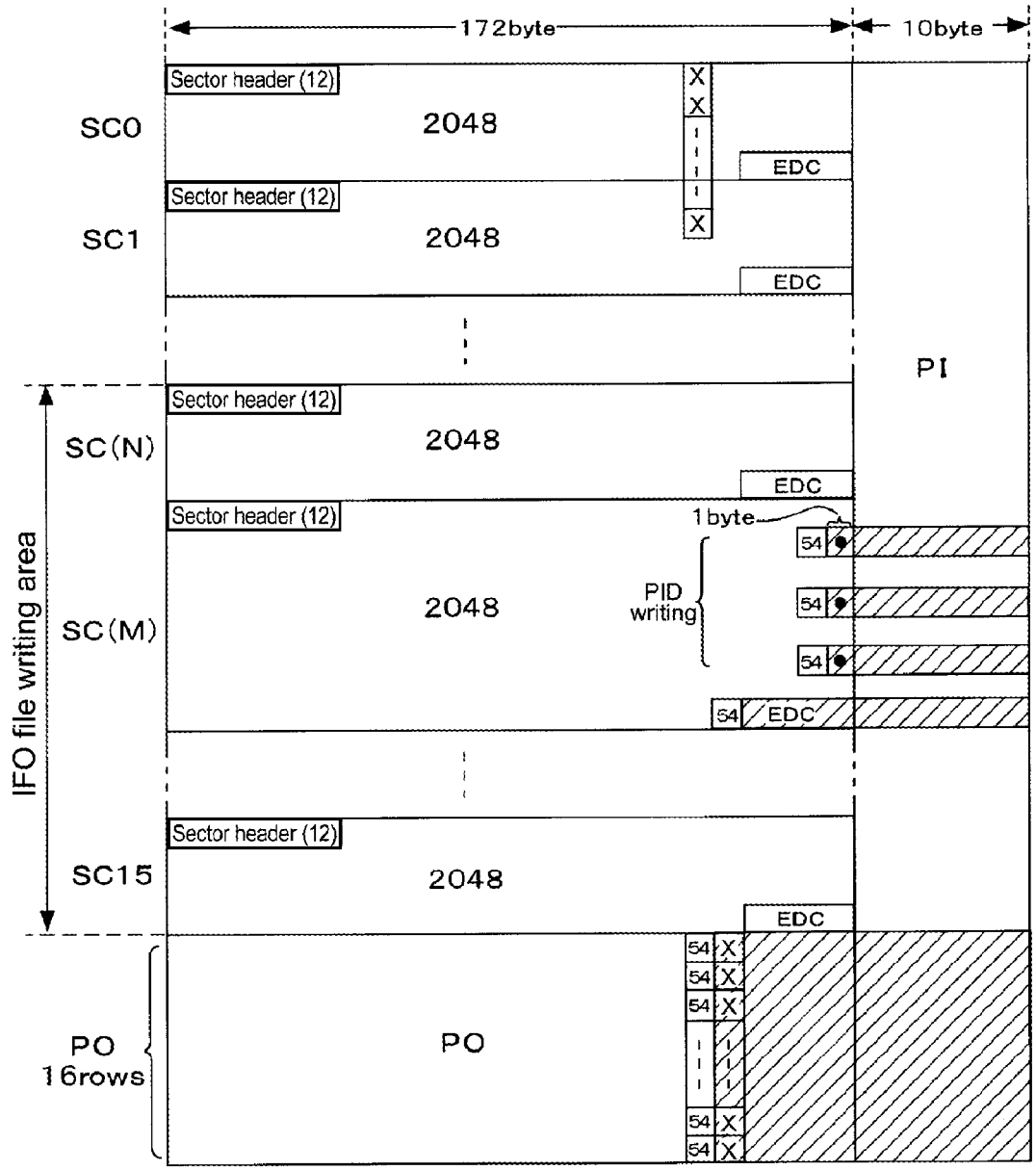
FIG. 38 A diagram for explanation of a PID writing disc of an embodiment.

The case where the last eight bytes of a certain row take the pattern PT3 "00 00 71 00 00 01 FF FF" and additional recording of the PID are performed in that part is shown in FIG. 38.

That is, since "FF FF" become the 171st to 172nd bytes, "FF" positioned in the 171st byte is set to be the polarity control symbol "54." Then, "FF" positioned in the 172nd byte is converted into unmodulated signals so as to form the additional recording area 10.

Therefore, as the additional-recording-mark recording part in a predetermined row of the sector SC(M), 1 byte+PI parity 10 bytes=11 bytes can be obtained. In the additional recording part of one byte, for example, the PID value "WW" or the like is additionally recorded.

Figure 39:
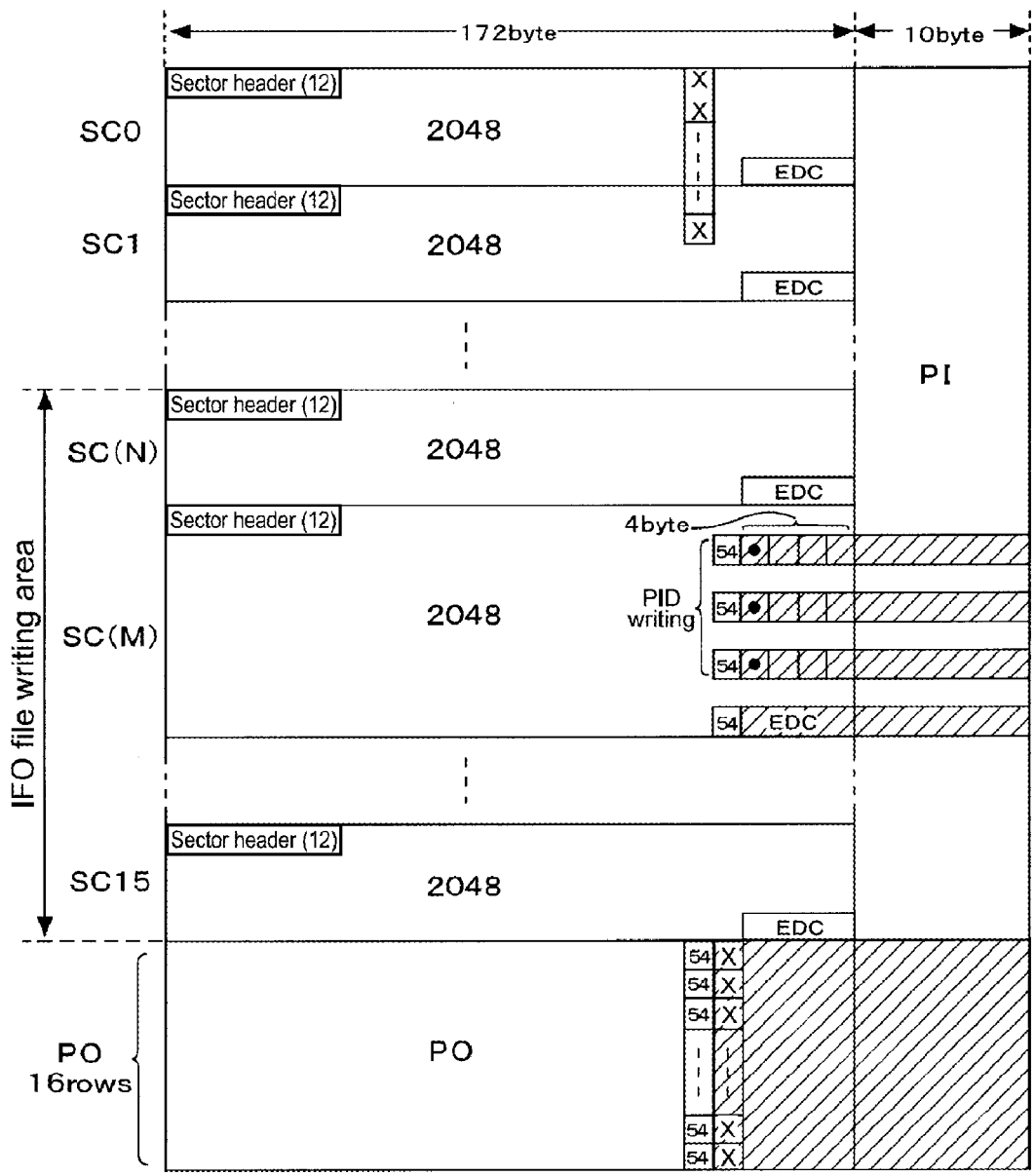
FIG. 39 A diagram for explanation of a PID writing disc of an embodiment.

The case where the last eight bytes of a certain row take the pattern PT8 "00 00 01 FF FF 00 00 71" and additional recording of the PID is performed in that part is shown in FIG. 39.

That is, "FF FF 00 00 71" become the 168th to 172nd bytes. At this time, "FF" positioned in the 168th byte is set to be the polarity control symbol "54." Then, "FF 00 00 71" positioned in the 169th to 172nd bytes are converted into unmodulated signals so as to form the additional recording area 10.

Therefore, as the additional-recording-mark recording part in a predetermined row of the sector SC(M), 4 bytes+PI parity 10 bytes=14 bytes can be obtained. In the additional recording part of 4 bytes, for example, the PID values "WW 00 00 qq" or the like are additionally recorded. Since the qq forms a part of the following navigation command, the NOP instruction value or the like can be additionally recorded, for example.

As described above, according to this embodiment, for example, the normal DVD player is enabled to read the additional supplementary information such as the PID.

Further, it is possible to manufacture an optical disc in which the PID and the like are additionally recorded utilizing the navigation commands readily and properly by the above-mentioned manufacturing method.

It should be noted that although in the example of FIG. 32 and the like, the case where the PID of 3 bytes is recorded has been taken as an example, it is needless to say that additional supplementary information of four or more bytes can be also recorded by using a plurality of "VTS_PGCI."

Further, although in the embodiment, an example embodying the present invention has been described as the read-only optical disc 90 of the DVD system, the concept of the present invention is applicable to read-only optical disc media of other disc systems and the manufacturing methods according to the data formats thereof.

In addition, the present invention is preferable in recording additional information including additional supplementary information not only in the read-only optical disc media but also in write-once optical discs in which pigment films are formed and data is recorded with pigment change mark rows and rewritable optical discs in which phase-change films are formed and data is recorded with phase-change marks.

DESCRIPTION OF REFERENCE NUMERALS 2 pit
3 land
4 reflecting film
5 adhesive
6 additional recording mark
10 additional recording area
90 read-only optical disc
150 additional information recording device
197 bonded optical disc

The invention claimed is:
1. A read-only optical disc comprising a pit row including embossed pits and lands with which information is recorded, wherein,
regarding recording data in a data format in which error correction blocks with n rows and m columns including at least main data, an error detection code, and an error correction parity are formed, in a certain error correction block, the pit row is formed based on the recording data in which an allocated location of additional supplementary information is set in a location in the same column as an allocated location of the error detection code as a location within the error correction block,
in an area in which the pit row is not formed, additional information including at least the additional supplementary information and the error detection code and the error correction parity, which need to be recorded according to the recording of the additional supplementary information, is recorded with an additional recording mark row including additional recording marks and lands, and
in addition, with the additional recording mark row and the pit row, command information for instructing a reproduction device to read the additional supplementary information recorded with the additional recording mark row is recorded.
2. The read-only optical disc according to claim 1, wherein the data format is a data format of a read-only optical disc of a DVD system, and the command information is a navigation command for instructing a DVD reproduction device to read the additional supplementary information.

3. The read-only optical disc according to claim 1, wherein the error correction block in which the additional recording mark row is formed is an error correction block included in a data file to be recorded at a fixed radial position on the disc.

4. A method of manufacturing a read-only optical disc comprising a pit row including embossed pits and lands with which information is recorded, the method comprising:
   a disc-before-additional-recording manufacturing step of setting, within a certain error correction block in a data format in which error correction blocks with n rows and m columns including at least main data, an error detection code, and an error correction parity are formed, an allocated location of additional supplementary information in a location in the same column as an allocated location of the error detection code, and manufacturing a disc before additional recording in which a pit row is formed in such a state that an additional recording area for recording additional information including the additional supplementary information and an error detection code and an error correction parity, which need to be recorded according to the recording of the additional supplementary information, is formed; and
   an additional recording step of recording the additional information with an additional recording mark row including additional recording marks and lands in the additional recording area in the disc before additional recording, which is manufactured at the disc-before-additional-recording manufacturing step, and manufacturing the read-only optical disc on which with the additional recording mark row and the pit row, command information for instructing a reproduction device to read the additional supplementary information recorded with the additional recording mark row is recorded.

5. The method of manufacturing a read-only optical disc, according to claim 4, wherein
   in the disc-before-additional-recording manufacturing step, a part of the command information is formed with the pit row so that when the additional supplementary information is recorded in the additional recording area, a recording data row of the command information is formed.

6. The method of manufacturing a read-only optical disc, according to claim 4, wherein
   in the disc-before-additional-recording manufacturing step, the pit row is formed to have a concavo-concave shape coated with a reflecting film on the optical disc, and the additional recording area is formed as a flat shape area coated with a reflecting film, and
   in the additional recording step, the additional information is recorded with the additional recording mark row of additional recording marks formed by eliminating or reducing the reflecting film in the additional recording area and of lands as flat portions coated with the reflecting film.

* * * * *